(12) United States Patent
Saito

(10) Patent No.: US 7,426,054 B1
(45) Date of Patent: Sep. 16, 2008

(54) IMAGE PROCESSING APPARATUS, IMAGE REPRODUCTION APPARATUS, SYSTEM, METHOD AND STORAGE MEDIUM FOR IMAGE PROCESSING AND IMAGE REPRODUCTION

(75) Inventor: Kazuyuki Saito, Machida (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/570,611

(22) Filed: May 12, 2000

(30) Foreign Application Priority Data

May 13, 1999 (JP) .................................. 11-133068
May 14, 1999 (JP) .................................. 11-134825

(51) Int. Cl.
*G06F 15/00* (2006.01)
*G06K 1/00* (2006.01)
*G06K 15/00* (2006.01)

(52) U.S. Cl. .................................. 358/1.16; 358/1.17

(58) Field of Classification Search ....... 358/1.16–1.18, 358/1.9, 426.01–426.05, 450, 452–453, 462, 358/537–540, 1.1, 1.6, 2.1, 2.99, 3.21, 3.23, 358/3.24, 401, 403, 449, 3.01; 382/171, 382/173, 180–182, 176, 177, 229, 282
See application file for complete search history.

(56) References Cited

U.S. PATENT DOCUMENTS

| 4,180,798 A | * | 12/1979 | Komori et al. .............. 382/181 |
| 4,208,739 A | * | 6/1980 | Lu et al. ...................... 380/28 |
| 4,443,856 A | * | 4/1984 | Hashimoto et al. .......... 704/277 |
| 5,274,474 A | * | 12/1993 | Medina ...................... 358/462 |
| 5,502,576 A | * | 3/1996 | Ramsay et al. .............. 358/444 |
| 5,570,432 A | * | 10/1996 | Kojima ........................ 382/254 |
| 5,793,870 A | * | 8/1998 | Conley ........................ 380/54 |
| 5,966,455 A | | 10/1999 | Saito |
| 5,999,664 A | * | 12/1999 | Mahoney et al. ............. 382/305 |
| 6,163,625 A | * | 12/2000 | Ng et al. ..................... 382/239 |
| 6,353,840 B2 | | 3/2002 | Saito et al. |
| 6,562,077 B2 | * | 5/2003 | Bobrow et al. .............. 715/517 |

FOREIGN PATENT DOCUMENTS

| JP | 07-160801 | 6/1995 |
| JP | 08-335248 | 12/1996 |
| JP | 11-066196 | 3/1999 |

* cited by examiner

*Primary Examiner*—Edward L. Coles, Sr.
*Assistant Examiner*—James A Thompson
(74) *Attorney, Agent, or Firm*—Fitzpatrick, Cella, Harper & Scinto

(57) ABSTRACT

The present invention enables reduction in the amount of data of a document image while maintaining a layout of the document image, and enables suppression of image quality deterioration when reproducing the document image. An original document image is inputted as multivalued image data (original image data) from an image input unit. The multivalued image data is binarized by a binary image output unit. Then, layout analysis is performed based on the binary image data. With respect to text areas, character recognition is performed on the binary image, then the recognition data is outputted. With respect to non-text areas, the binary image data is used without further processing. With respect to a multivalued image, e.g., photographs or the like, the image data is compressed with an appropriate condition and stored.

16 Claims, 56 Drawing Sheets

| ATTRIBUTE | IDENTIFICATION NUMBER |
|---|---|
| TEXTS | 1 |
| LINE DRAWINGS | 2 |
| PICTURES, PHOTOGRAPHS | 3 |
| CHARTS | 4 |

| TYPE OF IMAGE | IDENTIFICATION NUMBER |
|---|---|
| BINARY IMAGE | 1 |
| 24-BIT MULTIVALUED IMAGE | 2 |

| COMPRESSION METHOD | IDENTIFICATION NUMBER |
|---|---|
| MMR | 1 |
| JPEG | 2 |

| TYPE OF IMAGE | IDENTIFICATION NUMBER |
|---|---|
| BINARY IMAGE | 1 |
| 24-BIT MULTIVALUED IMAGE | 2 |

| COMPRESSION METHOD | IDENTIFICATION NUMBER |
|---|---|
| MMR | 1 |
| JPEG | 2 |

| ENCRYPTION FLAG | IDENTIFICATION NUMBER |
|---|---|
| INVALID | 0 |
| VALID | 1 |

FIG. 49A

| TYPE OF IMAGE | IDENTIFICATION NUMBER |
|---|---|
| BINARY IMAGE | 1 |
| 24-BIT MULTIVALUED IMAGE | 2 |

FIG. 49B

| COMPRESSION METHOD | IDENTIFICATION NUMBER |
|---|---|
| MMR | 1 |
| JPEG | 2 |

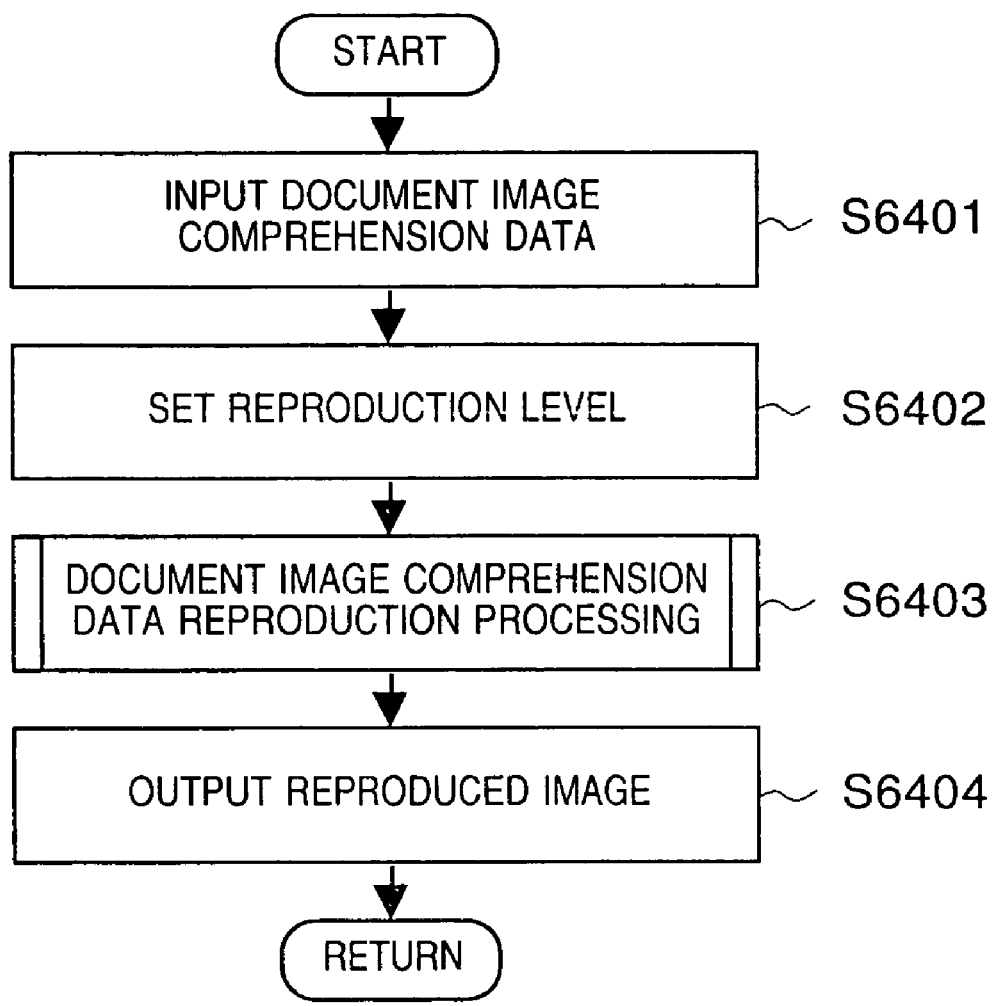

IMAGE PROCESSING APPARATUS, IMAGE REPRODUCTION APPARATUS, SYSTEM, METHOD AND STORAGE MEDIUM FOR IMAGE PROCESSING AND IMAGE REPRODUCTION

FIELD OF THE INVENTION

The present invention relates to an image processing apparatus, image reproduction apparatus, system, method and storage medium for image processing and image reproduction, and more specifically, to an image processing apparatus, image reproduction apparatus, system, method and storage medium for reading a document image, performing image processing, and reproducing the document image.

BACKGROUND OF THE INVENTION

Conventional techniques related to document image processing include: copy machines for optically inputting a document image and outputting it by printing the entire image; document database systems for optically inputting document data and storing the document data; facsimile apparatuses for optically inputting a document image and outputting the document image via a network or communication line; optical character readers (OCR) for optically inputting a document image and outputting text codes by recognizing characters; and so on.

However, the conventional techniques are no longer applicable to digitized or networked machines. More specifically, because of the fact that a network is employed for connecting an input apparatus with an output apparatus and that color documents are handled by these apparatuses, the following problems arise:

(1) The amount of data is too large when an inputted document image is stored or transmitted without any processing;

(2) Image quality suitable for reuse cannot be maintained if a document image is uniformly compressed;

(3) Quality of an output image may deteriorate depending on whether the output device is a black-and-white printer or a color printer;

(4) If texts only are transmitted after performing optical character recognition (OCR) processing, data such as drawings or photographs is lost; and (5) If erroneous recognition is made by an optical character reader (OCR), the document may not make sense.

SUMMARY OF THE INVENTION

The present invention has been proposed to solve the above-described conventional problems, and has as its object to provide an image processing apparatus, image reproduction apparatus, system, method, and storage medium which can reduce the amount of data of a document image while maintaining a document's layout, and which can suppress image quality deterioration when reproducing the image.

Furthermore, another object of the present invention is to provide an image processing apparatus, image reproduction apparatus, system, method, and storage medium which can provide a high level of security.

Furthermore, another object of the present invention is to provide an image processing apparatus, image reproduction apparatus, system, method and storage medium which can accommodate natural language discrepancies in the texts of an image.

Furthermore, another object of the present invention is to provide an image processing apparatus and method thereof for storing inputted document image data with a reduced amount of data, and reproducing the document image with high quality by reading the stored data.

In order to solve the above-described problems and achieve the objects, the image processing apparatus according to the present invention has the following configuration.

More specifically, the image processing apparatus comprises: input means for inputting a document image; analysis means for analyzing an image attribute of each area and layout of each area, said each area constructing the inputted document image; setting means for setting a storage condition of each area based on an analysis result of the analysis means; and storage means for storing data for each area based on the storage condition set by the setting means.

Furthermore, according to a preferred embodiment of the present invention, the image processing apparatus of the present invention has the following configuration.

More specifically, the image processing apparatus comprises: input means for inputting an original document as multivalued image data; binary image generation means for generating binary image data from the inputted multivalued image data; layout analysis means for analyzing for each image attribute a layout of a partial image based on the generated binary image data, and generating layout data; character recognition means for performing character recognition with respect to the partial image of a text area based on an analysis result of the layout analysis means; storage means for adaptively changing a storage condition of each partial image based on the analysis result of the layout analysis means, and storing, as image comprehension data, recognition data of the text area upon which character recognition is performed by the character recognition means, image data of an area not subjected to character recognition, and layout analysis data obtained by the layout analysis means; and output means for outputting the image comprehension data, stored by the storage means, to another apparatus.

Furthermore, according to a preferred embodiment of the present invention, the image processing apparatus of the present invention has the following configuration.

More specifically, the image processing apparatus comprises: image input means for inputting a document image; binary image generation means for generating binary image data from the document image inputted by the image input means; layout analysis means for generating layout analysis data corresponding to an image attribute included in the document image, based on the binary image data generated by the binary image generation means; storage-level setting means for setting a storage level of the document image inputted by the image input means; analysis means for generating and storing analysis data indicative of a result of analyzing the document image based on the layout analysis data and the storage level set by the storage-level setting means; reproduction-level setting means for setting a reproduction parameter for reproducing the document image based on the analysis data generated and stored by the analysis means; and document image reproduction means for reproducing the document image in accordance with the analysis data based on the reproduction parameter set by the reproduction-level setting means.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIGS. 49A and 49B are tables showing identification numbers for the type of document images and identification numbers for compression methods;

FIG. 50 is a flowchart showing the processing steps from inputting document image comprehension data to outputting a reproduced image according to the thirteenth embodiment;

DETAILED DESCRIPTION OF THE PREFERRED EMBODIMENTS

Preferred embodiments of the present invention will now be described in detail in accordance with the accompanying drawings.

First Embodiment

Figure 1:
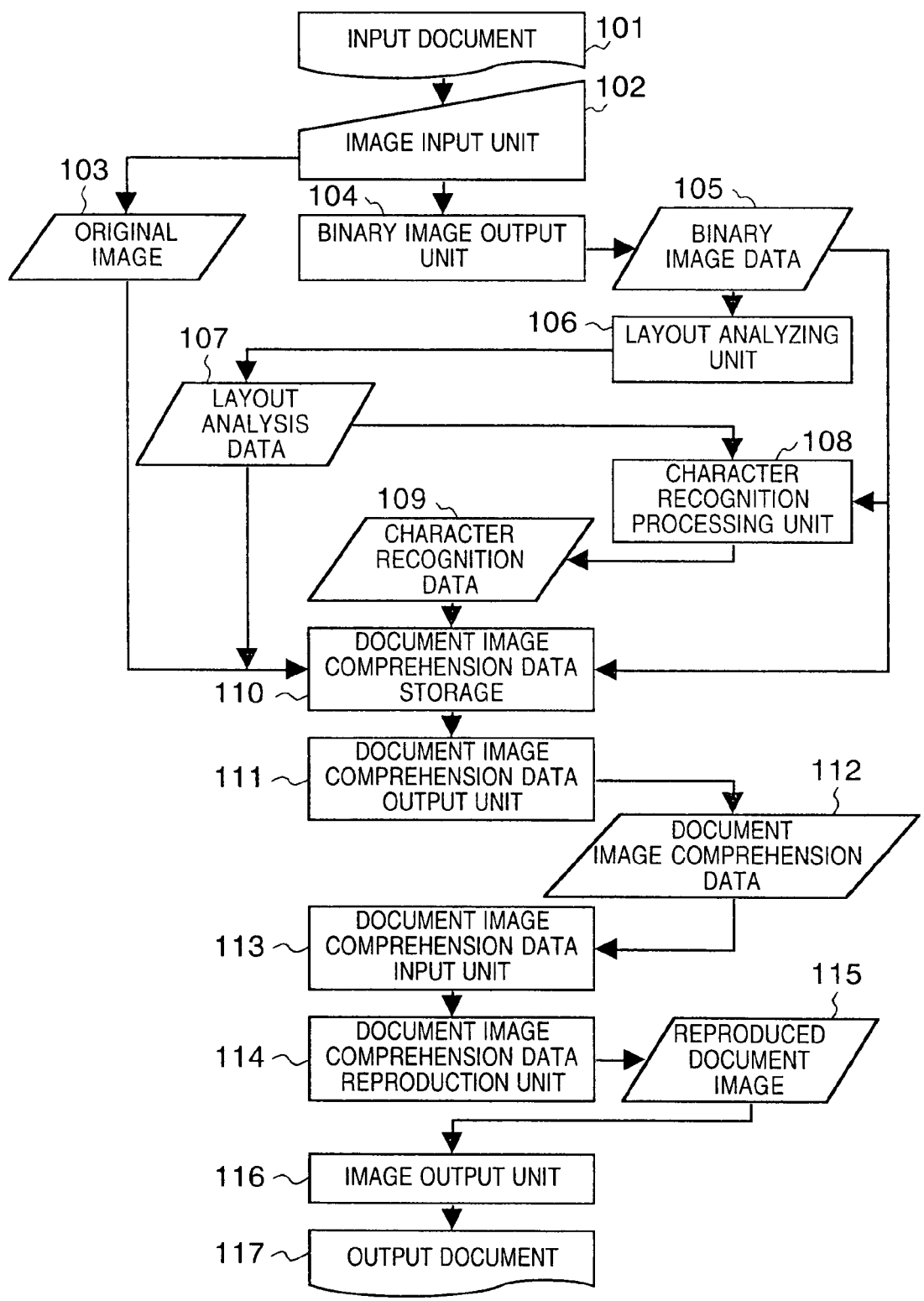
FIG. 1 is a block diagram showing data flow according to a first embodiment of the present invention.

FIG. 1 is a block diagram showing the structural concept and data flow according to the first embodiment.

In FIG. 1, reference numeral 101 denotes an input document including printing materials subjected to be inputted or image data processed by a computer; 102, an image input unit (e.g., image scanner) for inputting a document as image data; 103, original image data inputted from the image input unit 102 (and stored in a predetermined memory); 104, a binary image output unit for generating a binary image from the inputted document image; 105, generated binary image data; 106, a layout analyzing unit for generating and outputting layout analysis data, obtained by dividing the document image into areas having various attributes, such as drawings, texts, charts or the like, based on the binary image data 105; and 107, layout analysis data.

Further, reference numeral 108 denotes a character recognition processing unit for recognizing characters in an arbitrary area of the binary image data based on the layout analysis data and outputting code data as character recognition data; 109, character recognition data; 110, a document image comprehension data storage for storing image data and character recognition data as document image comprehension data, generated from the inputted original document image and binary image based on the layout analysis data while adaptively changing the storage condition; 111, a document image comprehension data output unit for outputting document image comprehension data; 112, document image comprehension data; 113, a document image comprehension data input unit for inputting the document image comprehension data; 114, a document image comprehension data reproduction unit for generating a reproduced document image from the document image comprehension data while adaptively changing the reproduction condition; 115, a reproduced document image; 116, an image output unit for outputting the reproduced document image; and 117, an output document.

Figure 2:
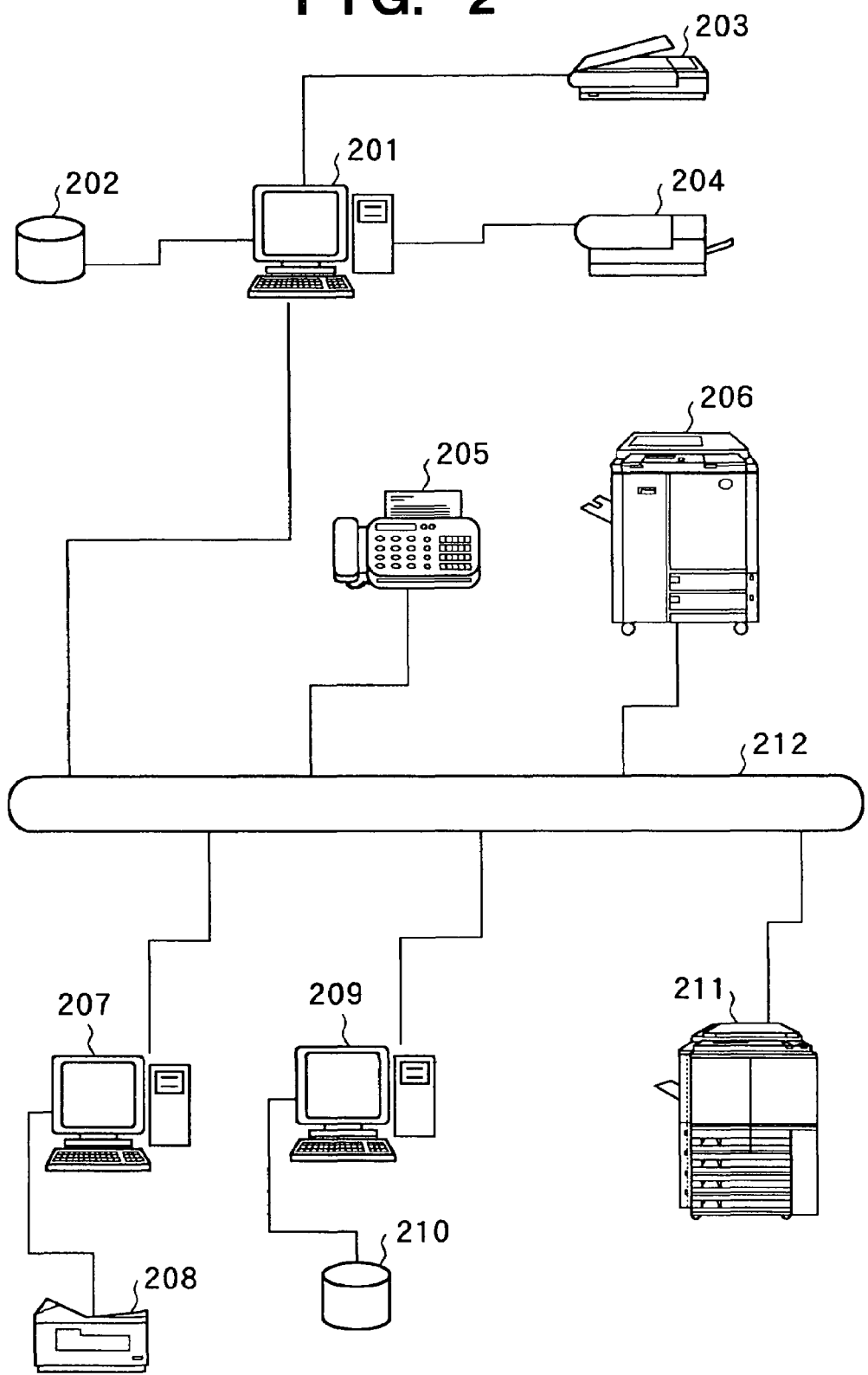
FIG. 2 shows a system construction according to the first embodiment.

FIG. 2 shows a system construction according to the first embodiment.

In FIG. 2, reference numeral 201 denotes a computer for performing document image comprehension processing (e.g., processing up to the point of the document image comprehension data output unit 111 in FIG. 1); 202, memory where data is stored; 203, a scanner exclusively performing image input; 204, a color printer; 205, a facsimile apparatus; 206, a digital color copy machine (serving as a color scanner and color printer) for performing a combination of inputting and printing color images; 207, a printer server for managing printers; 208, a monochrome printer; 209, a file server for managing database; 210, database; 211, a digital copy machine for performing a combination of inputting and printing monochrome images; and 212, a network which connects digital devices.

Next, the processing flow is described with reference to the flowcharts in FIGS. 3 to 10, and FIGS. 1, 2 and 14 to 17.

The first embodiment describes an image comprehension data processing system in which an original document image is inputted as 24-bit multivalued image data (R, G and B each having 8 bits) by a scanner (203 or 206), transmitted through a network, and outputted to a monochrome printer (208, 211, 205) at the transmitted destination.

Figure 3:
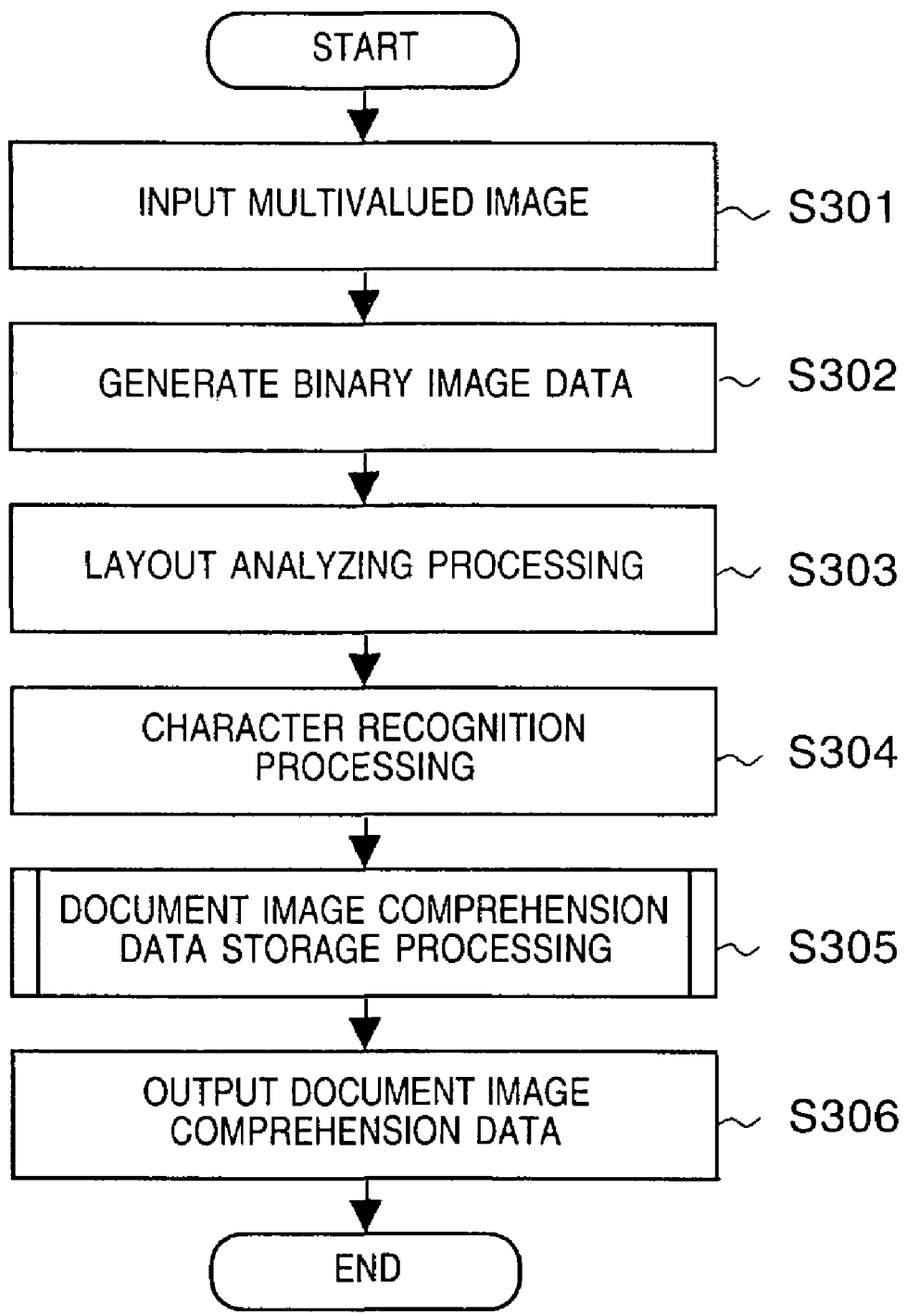
FIG. 3 is a flowchart showing the processing steps from inputting an image to outputting document image comprehension data according to the first embodiment.

First in step S301 in FIG. 3, the computer 201 inputs from the image input unit 102 (scanner 203 in FIG. 2) a document image as a multivalued image.

In step S302, a binary image is generated by the binary image output unit 104. To obtain binary image data, luminance components are calculated from the read image data R, G and B (each having 8 bits), and each of the calculated luminance is compared with a predetermined threshold value.

Figures 16A, 16B, 16C:
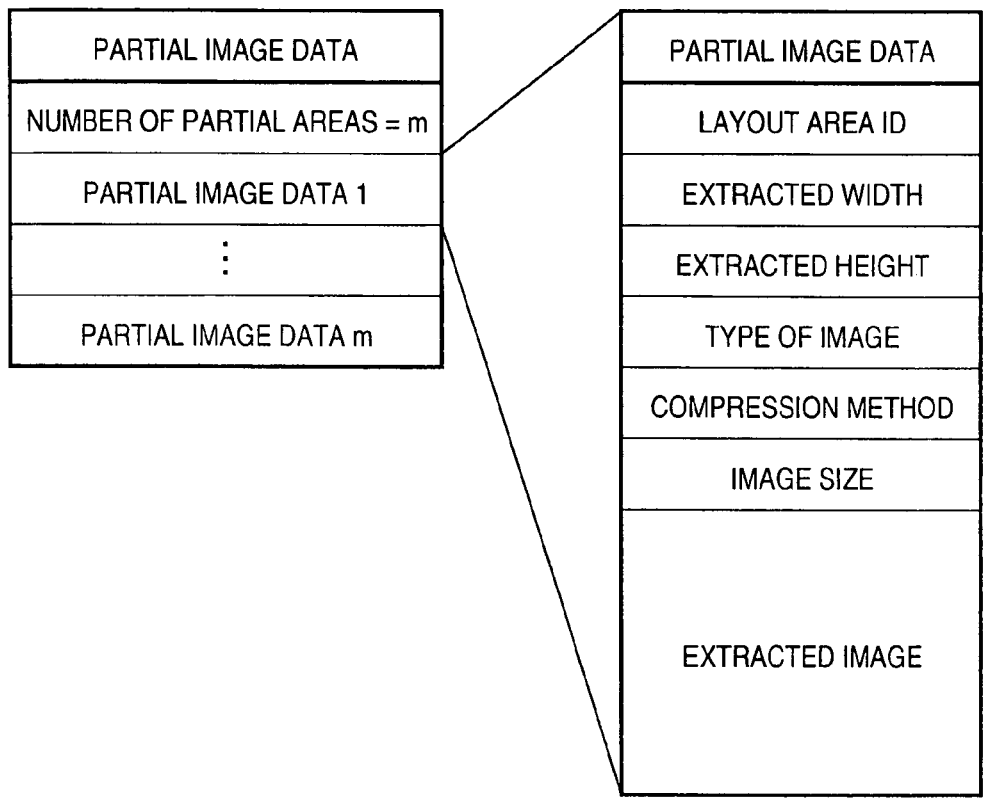
FIGS. 16A to 16C show a data structure of image data according to the first embodiment.

In step S303, based on the binary image generated in the foregoing manner, the layout analyzing unit 106 divides the document image into areas having various attributes, such as drawings, texts, charts or the like, and outputs layout data (FIGS. 16A to 16C). As shown in FIG. 16A, a plurality of rectangular areas (partial images) are set for a page of original document image, and data corresponding to the number of partial images is stored. Each partial image data consists of identification information (layout area ID), the width of the extracted area, height of the extracted area, type of image, compression method, image size, and image data of the extracted area. The type of image identifies whether the partial image is a binary image or 24-bit multivalued image as shown in FIG. 16B. The compression method includes MMR, JPEG or the like as shown in FIG. 16C. Note that the types and number of images and compression methods are not limited to these mentioned above.

In step S304, character recognition processing is performed on a character image in the area including characters such as texts or charts or the like. In step S305, based on the layout analysis data, document image comprehension data is generated from the character recognition data, multivalued image, representing the inputted original document image, and binary image, while adaptively changing the storage condition, and the generated data is stored in the document image comprehension data storage 110.

Herein, a specific example of document image comprehension data storage processing is described with reference to the flowcharts in FIGS. 5 to 8.

According to the first embodiment, when the document image comprehension data storage processing (step S305 in FIG. 3) is started, the layout analysis data of each area is analyzed in step S501 to categorize the area attribute and document layout type.

Figure 6:
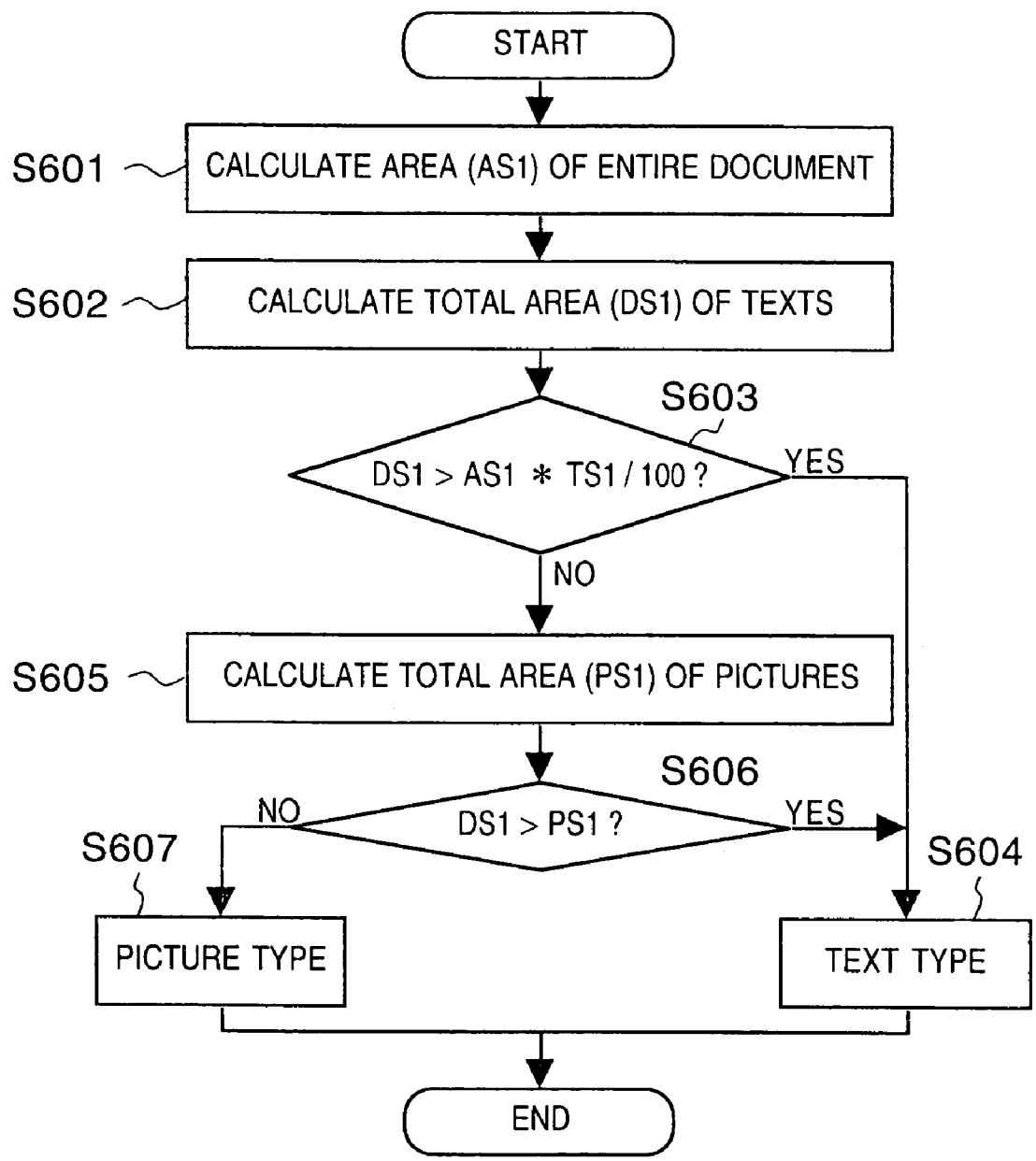
FIG. 6 is a flowchart showing text determination processing according to the first embodiment.

Categorizing the document types is described in FIG. 6.

In step S601, an area (AS1) of the entire document is calculated.

In step S602, the sum total (DS1) of areas representing the attributes "texts" and "charts" is calculated. In step S603, it is determined whether or not the calculated total area (DS1) accounts for a predetermined ratio (TS1 [%]) with respect to the area (AS1) of the entire document. More specifically, whether or not the following condition is satisfied is determined:

$$DS1 > AS1 \times TS1/100$$

If this condition is satisfied, it is determined that the document is a "text-type" layout document (step S604).

Meanwhile in step S603, if it is determined that the document is not the "text-type", the sum total (PS1) of areas representing the attributes "line drawings" and "pictures and photographs" is calculated (step S605). In step S606, it is determined whether or not the total area (DS1) calculated for the areas indicative of "texts" and "charts" is larger than the total area (PS1) for the areas indicative of "line drawings" and "pictures and photographs". More specifically, it is determined if DS1>PS1 is satisfied. If YES, it is determined that the document is a "text-type" layout document (step S604).

If NO in step S606, it is determined in step S607 that the document is a "picture-type" layout document.

Referring back to FIG. 5, when the document layout type is determined in the foregoing manner, the control proceeds to step S502 where the control branches according to the document's layout type. If the document's layout type is the "picture-type", picture-type document image comprehension data storage processing is performed in step S503.

The picture-type document image comprehension data storage processing is described in detail with reference to FIG. 7.

When executing the picture-type document image comprehension data storage processing, layout analysis data of each area is again analyzed in step S701. If the area attribute is "texts" in step S702, a binary image is selected in step S703 as the entire image to be extracted, and the partial image is extracted in step S705 by using coordinate data of the area represented by the layout analysis data.

If the area attribute is not "texts" in step S702, a multivalued image is selected in step S704 as the entire image to be extracted, and the multivalued image, serving as the partial image, is extracted in step S705 by using coordinate data of the area represented by the layout analysis data.

Next, the type of extracted partial image is determined in step S706. If it is a binary image type, compression processing for binary images (e.g., MMR or the like) is performed in step S707. The compressed partial image is stored as document image comprehension data (FIG. 14) in step S709.

At this step, by embedding information indicative of the compression method in the document image comprehension data, the compressed image can be decompressed in the document image comprehension data reproduction processing.

Meanwhile, if the extracted partial image is a multivalued image type in step S706, compression processing for multivalued images (e.g., JPEG or the like) is performed in step S708. The compressed partial image is stored as document image comprehension data (FIG. 14) in step S709.

Figure 14:
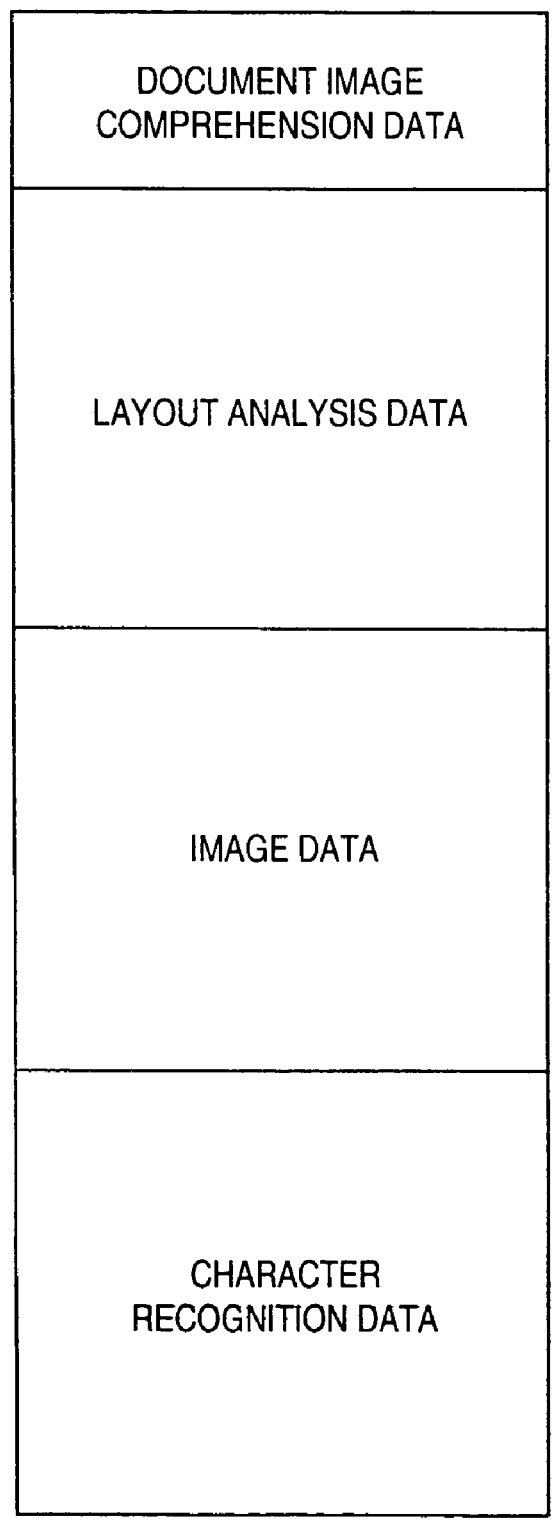
FIG. 14 shows a data structure of document image comprehension data according to the first embodiment.

As exemplified in FIGS. 14 to 16, the document image comprehension data for an area includes partial image data comprising: an ID uniquely assigned to the area, the width of the extracted area, height of the extracted area, type of image, compression method employed, image size, and compressed extracted image. Herein, the assigned ID corresponds to the sequence of area extraction performed by the layout analyzing unit 106.

In step S710, it is determined whether or not there is a remaining area to be processed. If there is a remaining area, the control returns to step S701 for repeating the above-described processing with respect to the remaining area, whereas if there is no remaining area, the document image comprehension data storage processing ends.

Referring back to FIG. 5, in step S502, when it is determined that the document's layout type is the "text type", the control proceeds to step S504 where text-type document image comprehension data storage processing is performed.

Figure 8:
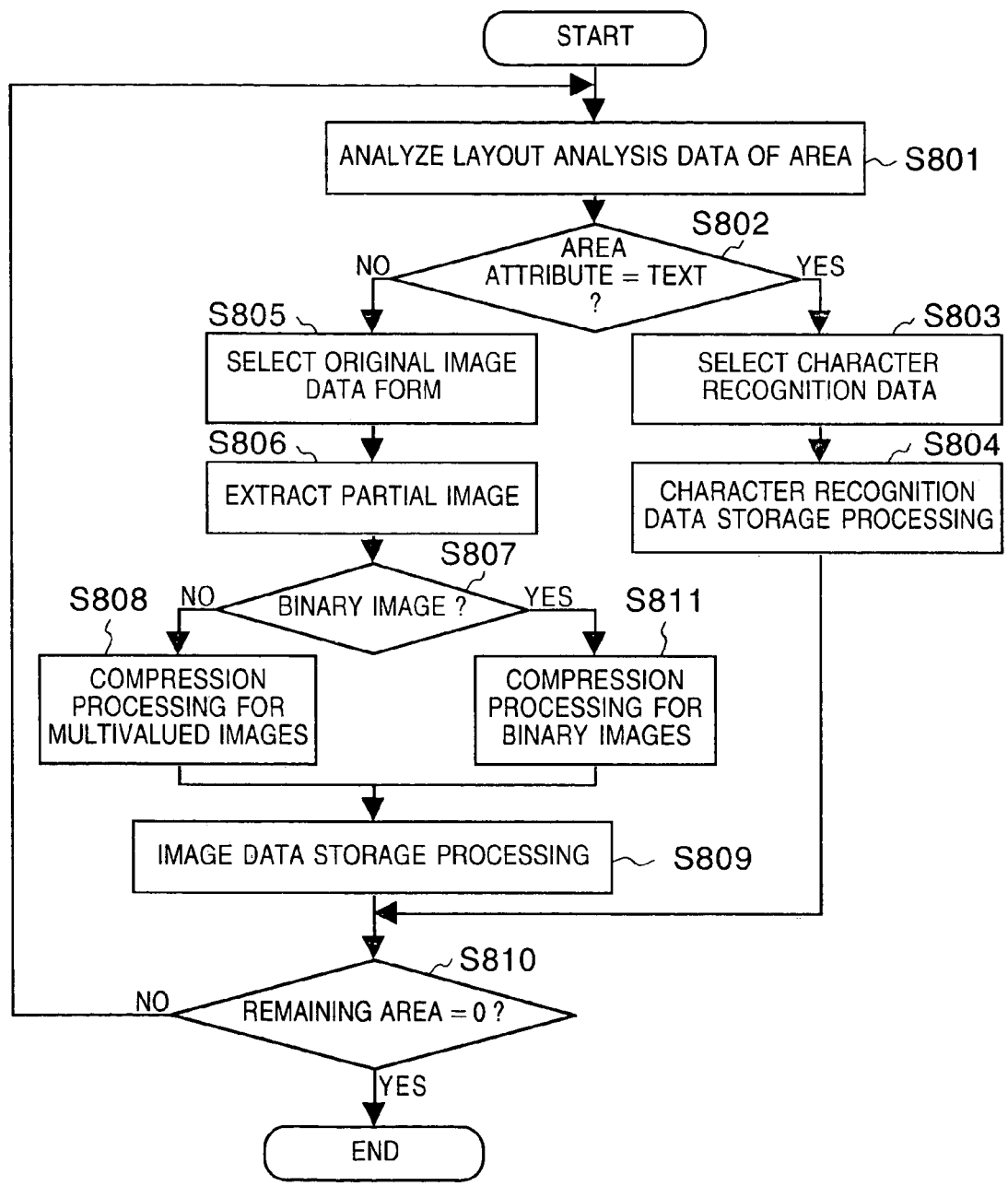
FIG. 8 is a flowchart showing document image comprehension data storage processing according to the first embodiment.
Figure 13:
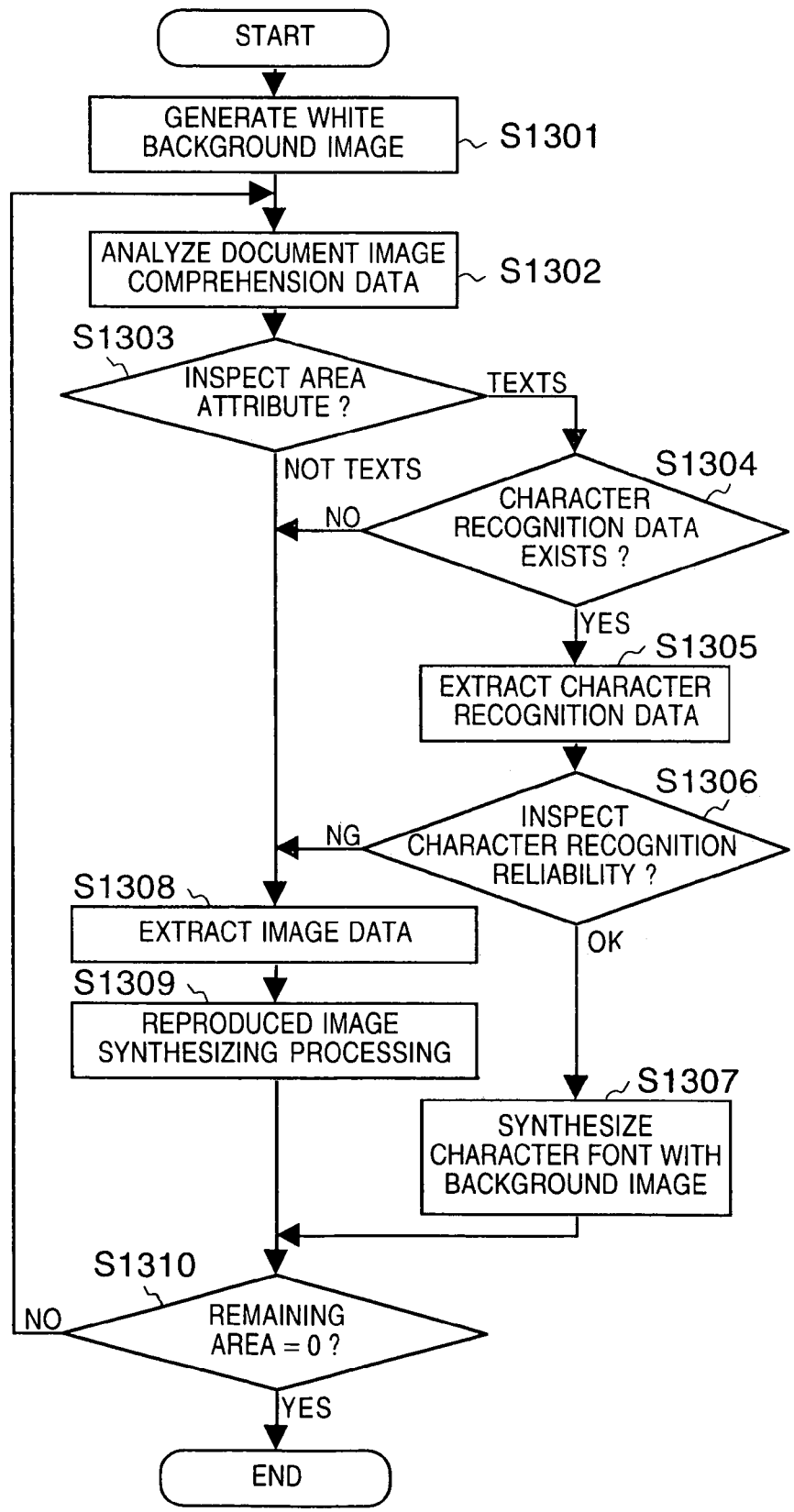
FIG. 13 is a flowchart showing document image comprehension data reproduction processing according to third and fourth embodiments of the present invention.

The text-type document image comprehension data storage processing is described with reference to the flowchart in FIG. 8, and FIGS. 13 and 15.

According to the first embodiment, when the document image comprehension data storage processing (step S305 in FIG. 3) is started, the layout analysis data of each area is analyzed again in step S801 to obtain an area attribute.

If the area attribute is "texts" in step S802, character recognition data of the area is selected in step S803, and the character recognition data is stored as document image comprehension data (FIG. 14) in step S804.

Figure 17:
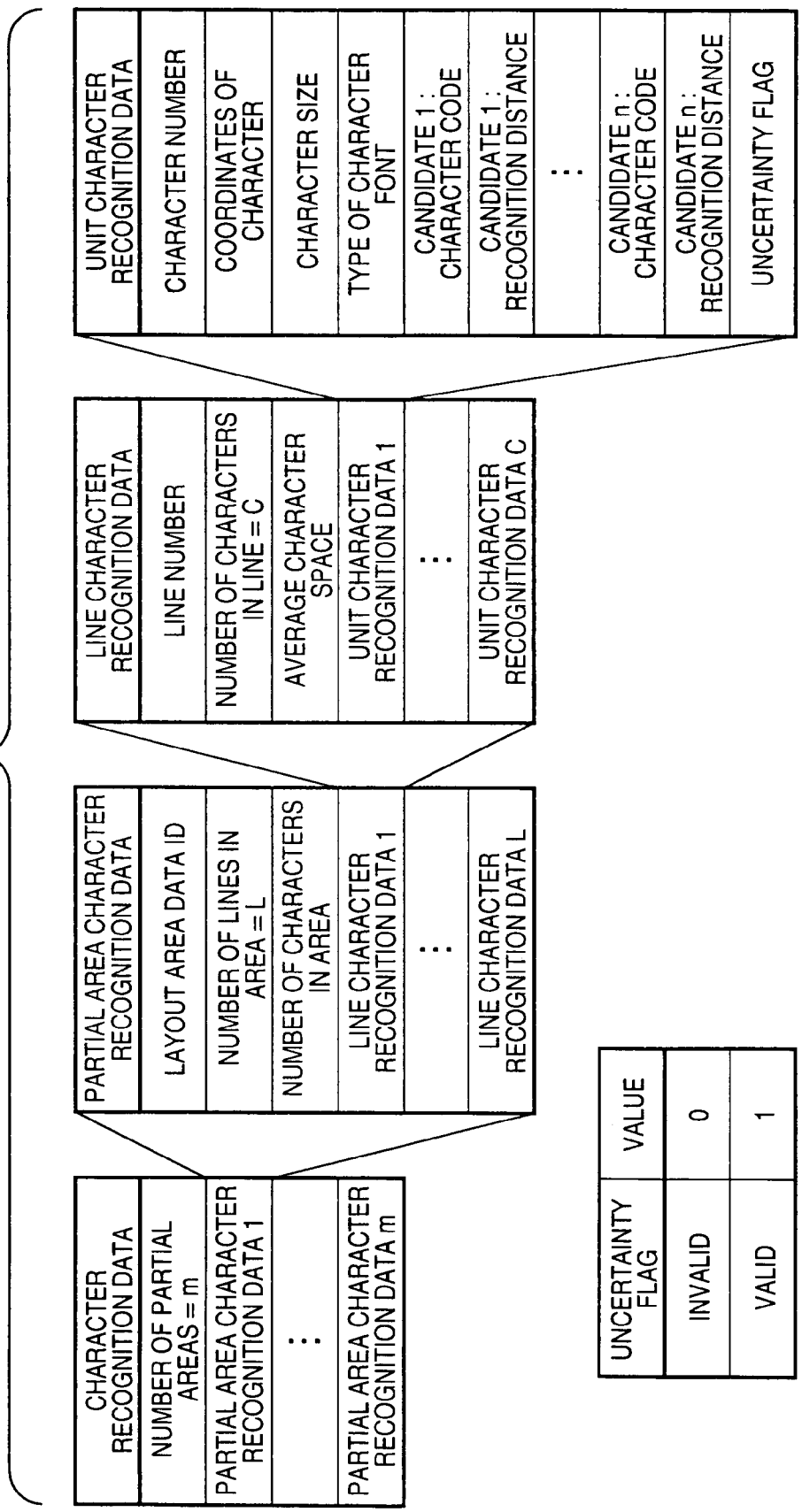
FIG. 17 shows a data structure of character recognition data according to the first embodiment.

As exemplified in FIG. 17, the document image comprehension data according to the above example includes character recognition data comprising: an ID uniquely assigned to the area, the number of lines, line space, 1st to n-th character code candidates for one character, character recognition distance from a standard character to the 1st to n-th candidate characters, type of character font, size of the character, coordinates of the character position, uncertainty flag and so on. Herein, the assigned ID corresponds to the sequence of area extraction performed by the layout analyzing unit 106.

If the area attribute is not "texts" in step S802, the original image is selected in step S805 as the entire image to be extracted, and the partial image is extracted in step S806 by using coordinate data of the area represented by the layout analysis data.

In step S807, since the original image is determined as a multivalued image in this example, compression processing for multivalued images (e.g., JPEG or the like) is performed in step S808. The compressed partial image is stored as document image comprehension data (FIG. 14) in step S809.

At this step, by embedding information indicative of the compression method in the document image comprehension data, the compressed image can be decompressed in the document image comprehension data reproduction processing.

As exemplified in FIGS. 16A to 16C, the document image comprehension data for an area includes partial image data comprising: an ID uniquely assigned to the area, the width of the extracted area, height of the extracted area, type of image, compression method employed, image size, and compressed extracted image. Herein, the assigned ID corresponds to the sequence of area extraction performed by the layout analyzing unit 106.

In step S810, it is determined whether or not there is a remaining area to be processed. If there is a remaining area, the control returns to step S801 for repeating the above-described processing with respect to the remaining area, whereas if there is no remaining area, the document image comprehension data storage processing ends.

Referring back to FIG. 5, when the document image comprehension data for each layout type is stored in the above-described manner (step S503 or S504), the control proceeds to step S505 in FIG. 5 for outputting the stored document image comprehension data.

According to the first embodiment, the document image comprehension data, generated and stored by the document image comprehension data storage (110), is outputted to a network and transmitted to users through the network.

Figure 4:
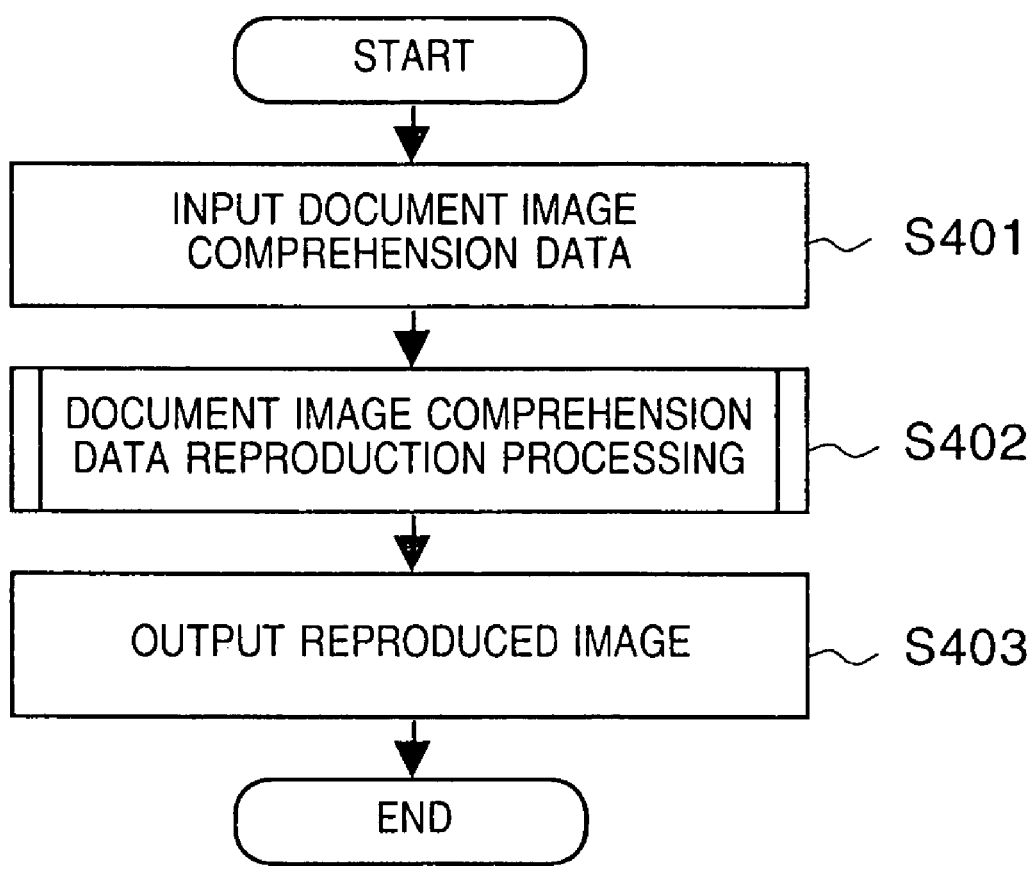
FIG. 4 is a flowchart showing the processing steps from inputting document image comprehension data to outputting a reproduced image according to each embodiment of the present invention.

In the user side (clients), as shown in FIG. 4, document image comprehension data is inputted by the document image comprehension data input unit (113) in step S401. Then, the document image is reproduced in step S402 from the document image comprehension data while adaptively changing a reproduction condition.

Figure 9:
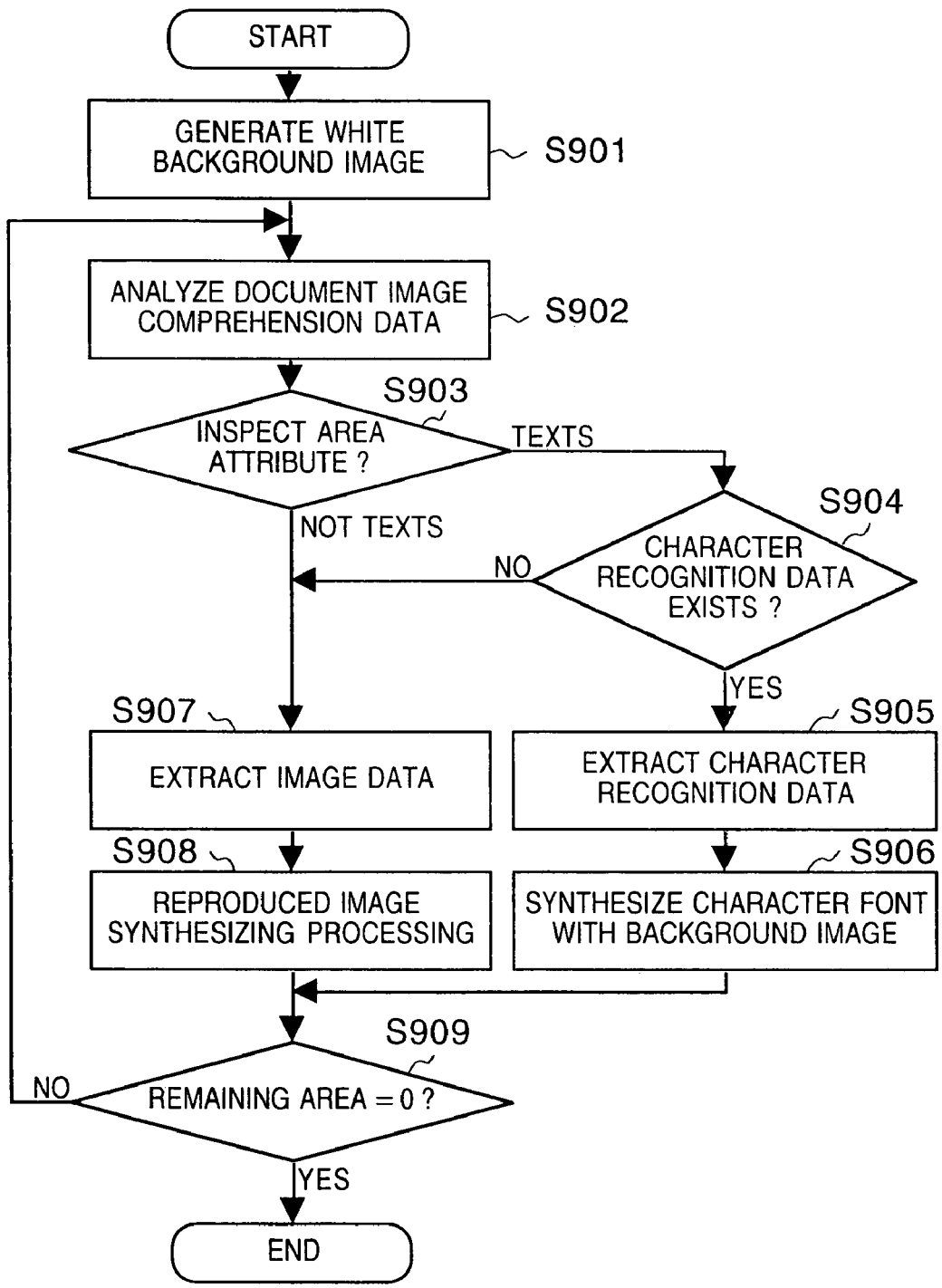
FIG. 9 is a flowchart showing document image comprehension data reproduction processing according to the first embodiment.

The document image comprehension data reproduction processing is described in detail with reference to FIG. 9.

In step S901, a white background image is generated to be used as a background of the reproduced document image.

In step S902, document image comprehension data for one partial area is analyzed. In step S903, the partial area attribute is inspected, and if the attribute is "texts", it is determined in step S904 whether or not character recognition data exists in the document image comprehension data.

If character recognition data exists, the character recognition data (including character codes) is extracted from the document image comprehension data in step S905. In step S906, a reproduction image is generated by synthesizing the character font with the white background image based on the extracted character recognition data.

Meanwhile, if the attribute is "non-texts" in step S903 or if there is no character recognition data exists in step S904, image data of the partial area is extracted from the document image comprehension data in step S907. Based on the extracted partial image data and coordinate data thereof, in step S908, the partial image is synthesized with the white background image, thereby reproducing the image.

Figure 10:
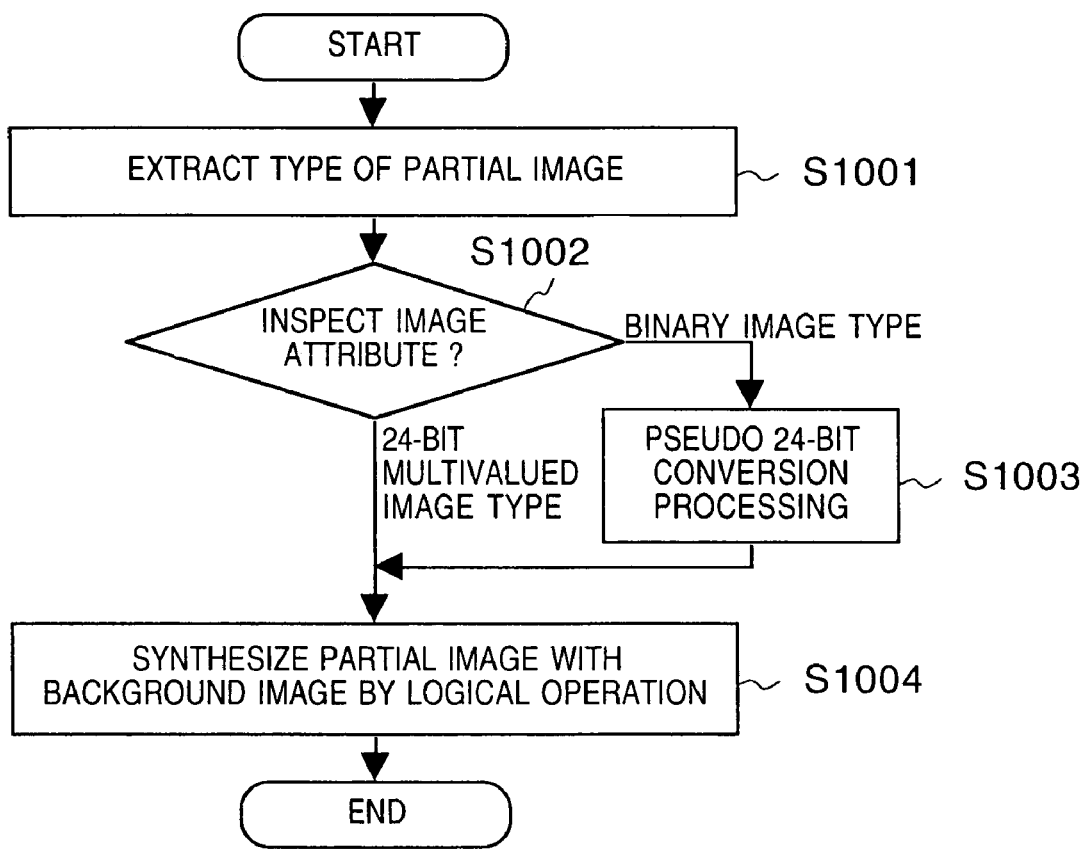
FIG. 10 is a flowchart showing reproduction image synthesizing processing according to the first embodiment.

An example of reproduction image synthesizing processing (step S908) is described. As shown in FIG. 10, the type of partial image is extracted from the document image comprehension data in step S1001. If it is determined in step S1002 that the type of image is the "binary image type", pseudo 24-bit conversion is performed in step S1003 by respectively converting black and white pixels of the binary image to black and white pixels of a 24-bit multivalued image.

In the first embodiment, assume that a black pixel of the binary image is expressed by 1, and a white pixel of the binary image is expressed by 0. A black pixel of the 24-bit multivalued image is expressed by R=0, G=0, B=0, and a white pixel of the 24-bit multivalued image is expressed by R=255, G=255, B=255 (R: red component; G: green component; B: blue component, each having 8-bit value).

In step S1002, if it is determined that the type of image is the "24-bit multivalued image type", the partial image without being processed is used for synthesizing processing.

In step S1004, logical operation is performed on each pixel of the partial image with respect to the background image and partial image so as to generate a synthesized image.

In the first embodiment, logical operation is performed such that a white pixel (R=255, G=255, B=255) of the background image, which is synthesized with a black pixel of the partial image (R=0, G=0, B=0), forms a black pixel (R=0, G=0, B=0).

When the reproduction image synthesizing processing (step S908) for one partial image is completed in the foregoing manner, whether or not there is a remaining area is determined in step S909. If there is a remaining area, the control returns to step S902 for repeating the above-described processing with respect to the remaining area, whereas if there is no remaining area, the document image comprehension data reproduction processing ends.

Referring back to FIG. 4, after reproduction processing is performed in the above-described manner, the reproduced image is outputted as an output document in step S403 by a monochrome printer serving as the image output unit 116.

Second Embodiment

In a case where an image condition of a document, having an area attribute of texts as a result of layout analysis, is inappropriate (existence of noise, low resolution or the like) for character recognition processing, it is possible to store certain image data instead of uncertain character recognition data in the document image comprehension data storage processing (step S305 in FIG. 3).

Figure 11:
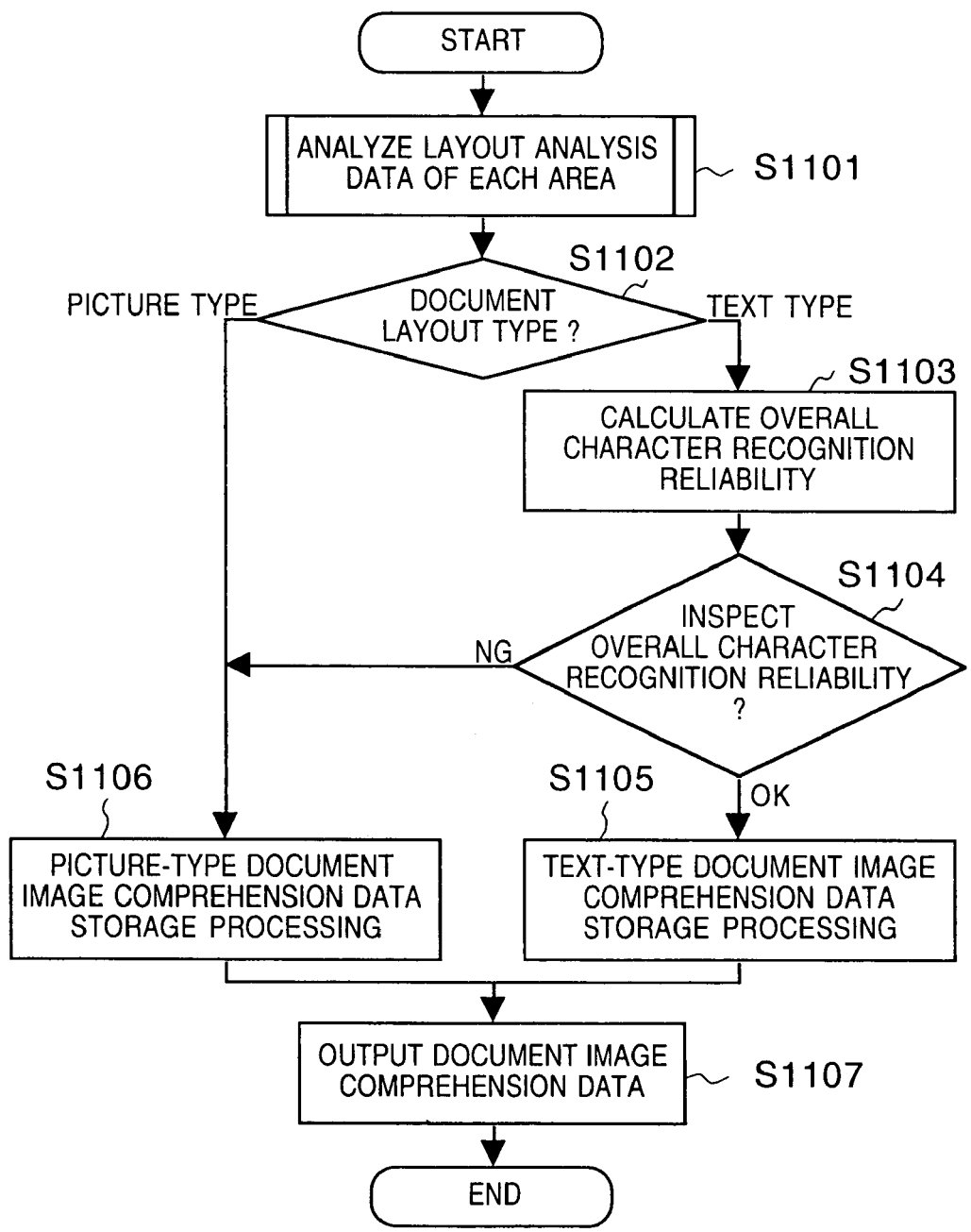
FIG. 11 is a flowchart showing document image comprehension data storage processing according to a second embodiment of the present invention.

Hereinafter, another specific example of document image comprehension data storage processing is described with reference to the flowchart in FIG. 11.

According to the second embodiment, when the document image comprehension data storage processing (step S305 in FIG. 3) is started, the layout analysis data of each area is analyzed in step S1101 to categorize the area attribute and document layout type (FIG. 6).

When it is determined in step S1102 that the document's layout type is the "picture type", the control proceeds to step S1106 where picture-type document image comprehension data storage processing (FIG. 7) is performed.

Meanwhile, when it is determined in step S1102 that the document's layout type is the "text type", an overall character recognition reliability (ZNr) is calculated in step S1103.

An example of calculating the overall character recognition reliability is described. In a case where a recognition distance value (D) of the first character candidate, which is obtained by recognition calculation performed on each character, is equal to or larger than a predetermined threshold value (Td), that is, in a case where $$D \geq Td$$

is satisfied, an uncertainty flag of the character recognition data is validated (=1) to indicate that the first character candidate is an uncertain character. Then, the total number (n) of characters having an invalidated uncertainty flag (=0) is obtained. The ratio (n/N) of the obtained number (n) to the entire number of characters (N) is calculated as an overall character recognition reliability (ZNr). In other words, the overall character recognition reliability is obtained as follows:

$$ZNr = n/N$$

Note that a low value of recognition distance (D) indicates that the distance between the character subjected to character recognition and a character recognition candidate is small, i.e., they are similar.

In step S1104, the overall character recognition reliability (ZNr) is inspected. If the overall character recognition reliability is larger than a predetermined threshold value (Tr), in other words, if $$ZNr > Tr$$

is satisfied, the inspection result is determined to be OK, and the control proceeds to step S1105 where text-type document image comprehension data storage processing (FIG. 8) is performed.

Figure 7:
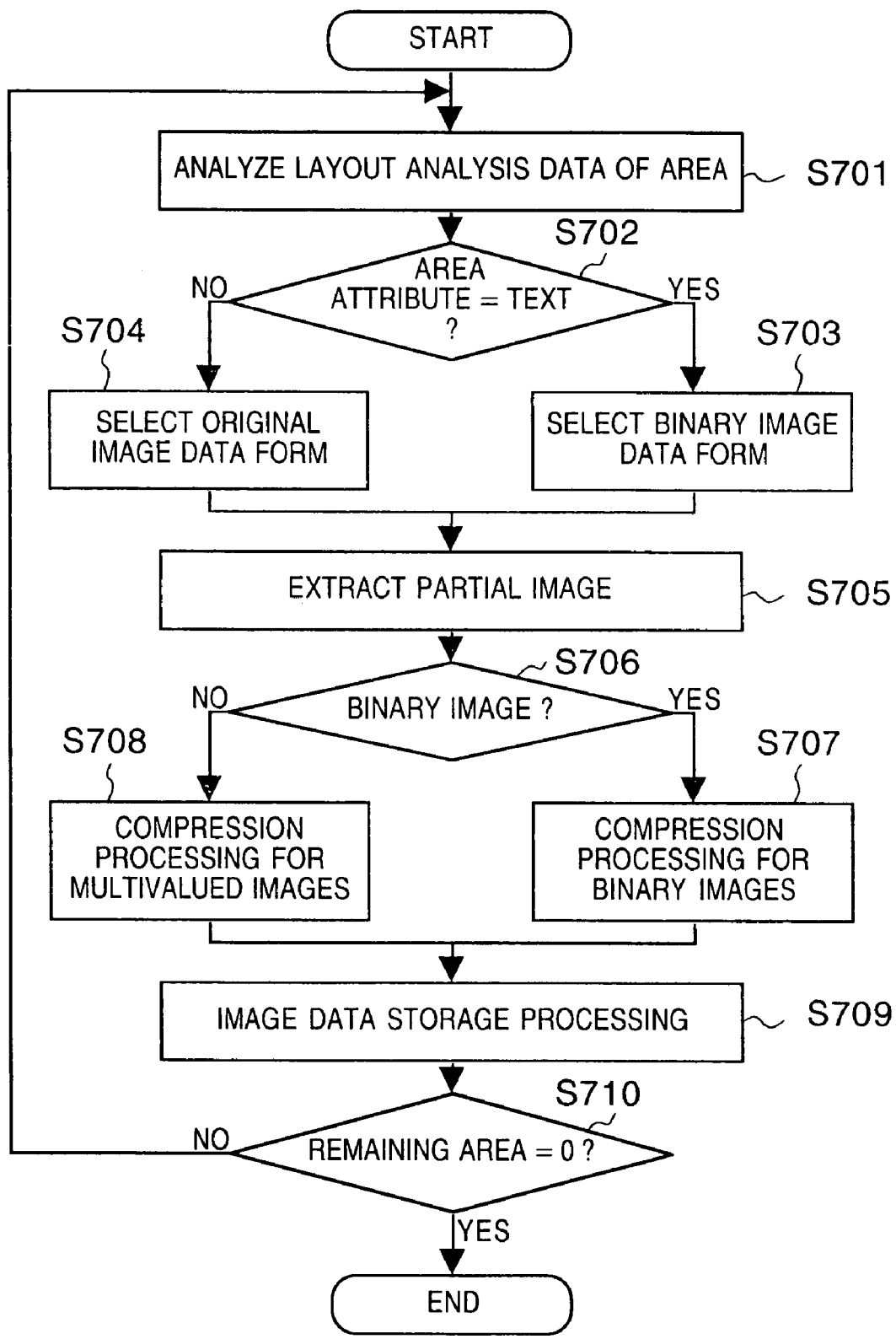
FIG. 7 is a flowchart showing document image comprehension data storage processing according to the first embodiment.

If $ZNr \leq Tr$ in step S1104, the inspection result is determined to be NG, and the control branches to step S1106 to perform picture-type document image comprehension data storage processing (FIG. 7).

When the quality of an original document is low or quality of characters printed is low, it is highly likely that erroneous character recognition is made.

According to the above-described second embodiment, in such case, the recognition result is not stored, but the document image is stored as a picture-type document. By virtue of this, when the document image is reproduced by the client side, high-fidelity reproduction to the original document image is possible.

Third Embodiment

In the document image comprehension data storage processing (step S305), a particular area of a document, having a "text" attribute as a result of layout analysis, may be subjected to determination of whether or not the image condition is appropriate for character recognition (existence of noise, low resolution or the like). In a case where it is determined that the document image is inappropriate for character recognition processing (i.e., character recognition reliability is low), it is possible to store not only character recognition data, but also image data.

Figure 12:
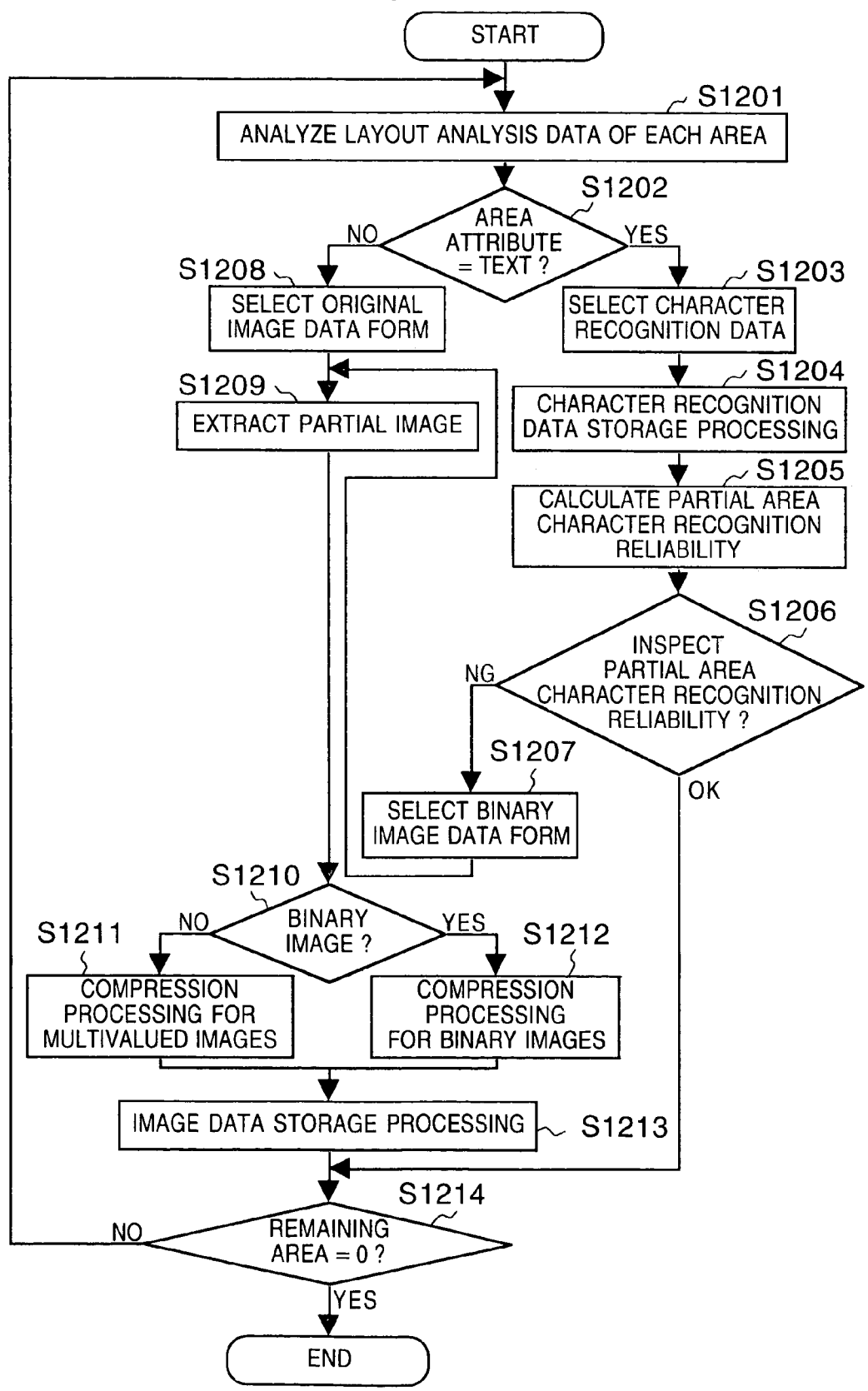
FIG. 12 is a flowchart showing document image comprehension data storage processing according to a third embodiment of the present invention.

Hereinafter, a specific example of document image comprehension data storage processing is described with reference to the flowchart in FIG. 12.

Figure 5:
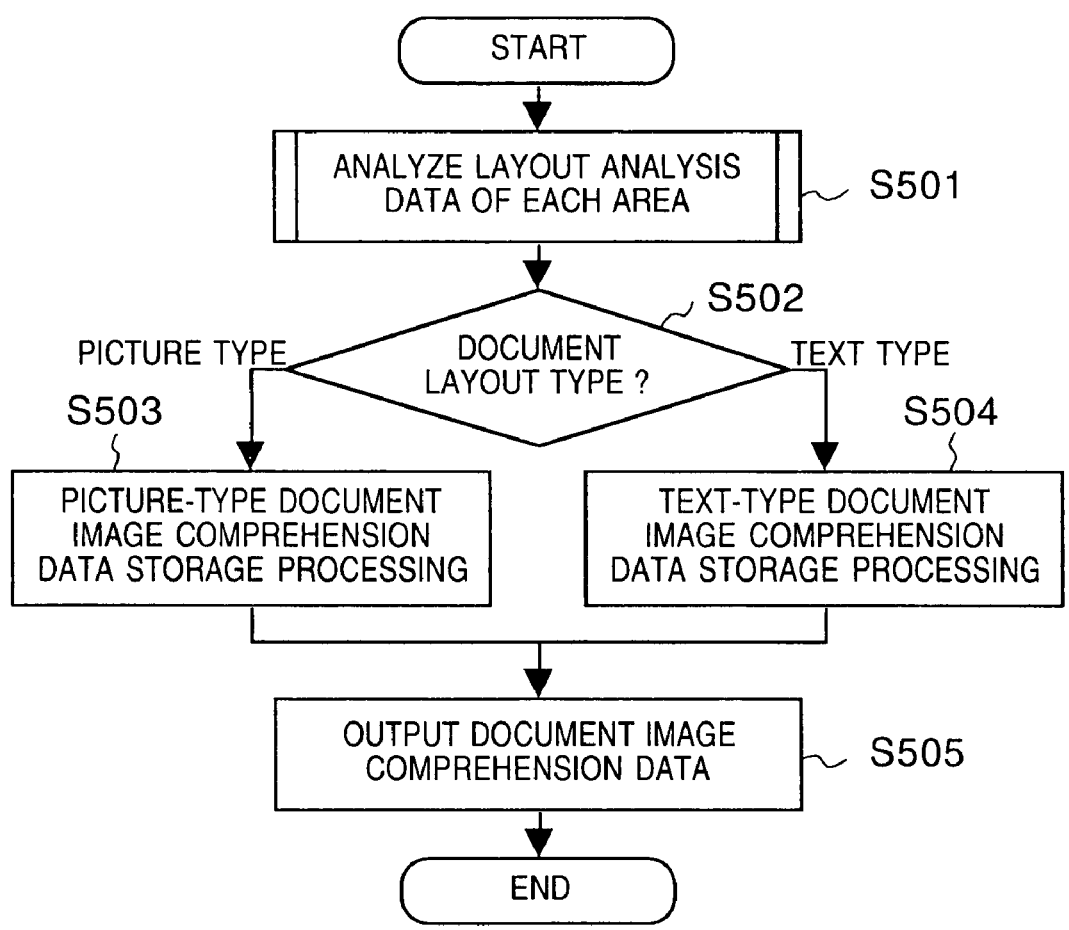
FIG. 5 is a flowchart showing document image comprehension data storage processing according to the first embodiment.

According to the third embodiment, when the document image comprehension data storage processing (step S305 in FIG. 3) is started, the layout analysis data of each area is analyzed as in FIG. 5 to categorize the area attribute and document layout type.

When it is determined as a text-type document layout, the layout analysis data is analyzed again in step S1201. In step S1202, the partial area attribute is inspected. If the attribute is "texts", character recognition data is selected in step S1203, then character recognition data storage processing is performed in step S1204, and a character recognition reliability (ZMr) of the partial area is calculated in step S1205.

An example of calculating the partial area character recognition reliability is described. In a case where a recognition distance value (D), which is obtained by recognition calculation performed on each character, is equal to or larger than a predetermined threshold value (Td), in other words, in a case where $$D \geq Td$$

is satisfied, an uncertainty flag of the character recognition data is validated (=1) to indicate that the character candidate is an uncertain character. Then, the total number (m) of characters having an invalidated uncertainty flag (=0) in the partial area is obtained. The ratio (m/M) of the obtained number (m) to the total number of characters (M) in the partial area is calculated as a partial area character recognition reliability (ZMr). In other words, the partial area character recognition reliability is obtained as follows:

$$ZMr = m/M$$

In step S1206, the partial area character recognition reliability (ZMr) is inspected. If the partial area character recognition reliability is larger than a predetermined threshold value (Tr), more specifically, if $$ZMr > Tr$$

is satisfied, the inspection result is determined to be OK, and the image data storage processing is not executed. Instead, whether or not there is a remaining area is determined in step S1214. If there is a remaining area, the control returns to step S1201 for repeating the above-described processing with respect to the remaining area.

If there is no remaining area, the document image comprehension data reproduction processing ends.

Meanwhile, if $ZMr \leq Tr$ is satisfied in step S1206, the inspection result is determined to be NG, and the image data storage processing (steps S1207 and S1209-S1213) is performed. In other words, the recognition result and image data are both stored. Note that the processing of steps S1208-S1213 is similar to steps S805-S809.

Fourth Embodiment

In the document image comprehension data reproduction processing, it is also possible to select either synthesizing character fonts or synthesizing an image of the area, in accordance with the reliability of character recognition data.

Hereinafter, this processing is described with reference to the flowchart in FIGS. 4 and 13.

According to the fourth embodiment, the character recognition reliability is obtained for each partial area, and whether output processing is to be performed with character fonts or with the image of the partial area is selected. Assume that area data of a document image includes both character recognition data and image data.

In the user side of the document image comprehension data, document image comprehension data is inputted by the document image comprehension data input unit (113) in step S401 in FIG. 4. Then, the document image is reproduced in step S402 from the document image comprehension data while adaptively changing a reproduction condition.

The document image comprehension data reproduction processing is described in detail with reference to FIG. 13.

In step S1301, a white background image is generated to be used as a background of the reproduced document image.

In step S1302, document image comprehension data is analyzed. In step S1303, if the attribute of the partial area is "texts", it is determined in step S1304 whether or not character recognition data exists in the document image comprehension data. If character recognition data exists, the character recognition data is extracted from the document image comprehension data in step S1305, and the character recognition reliability is determined in step S1306.

To determine the partial area character recognition reliability in the fourth embodiment, the ratio of the uncertainty flag in the character recognition data of the partial area is used.

More specifically, the total number (m) of characters having an invalidated uncertainty flag (=0) in the partial area is obtained. The ratio (m/M) of the obtained number (m) to the total number of characters (M) in the partial area is calculated as a partial area character recognition reliability (ZMr). In other words, the partial area character recognition reliability is obtained as follows:

$$ZMr = m/M$$

As a result of inspecting the partial area character recognition reliability (ZMr), if the reliability is larger than a predetermined threshold value (Tr2), in other words, if $$ZMr > Tr2$$

is satisfied, then in step S1307, a reproduction image is generated by synthesizing the character font with the white background image based on the extracted character recognition data.

Meanwhile, if the partial area character recognition reliability is equal to or less than the predetermined threshold value in step S1306, partial image data is extracted from the document image comprehension data in step S1308. Based on the extracted partial image and coordinate data thereof, in step S1309, the partial image is synthesized with the white background image, reproducing the image.

In a case where the attribute of the partial area is "non-texts" in step S1303 or a case where character recognition data does not exist in step S1304, partial image data is extracted from the document image comprehension data in step S1308, and based on the extracted partial image and coordinate data thereof, the partial image is synthesized with the white background image, reproducing the image (step S1309).

After completing the reproduction image synthesizing processing (step S1309) for one partial image in the foregoing manner, it is determined in step S1310 whether or not there is a remaining area to be processed. If there is a remaining area, the control returns to step S1302 for repeating the above-described processing with respect to the remaining area.

If there is no remaining area, the document image comprehension data reproduction processing ends.

Then in step S403 in FIG. 4, synthesized one page of reproduced image is outputted as an output document by the image output unit (116).

As has been set forth above, according to the first to fourth embodiments, the following effects are attained:

(1) The amount of data is reduced when a document image is stored;

(2) The load imposed on network traffic is reduced when a document image is transmitted;

(3) High quality of a document image suitable for reuse can be maintained when storing or transmitting the document image;

(4) Image quality deterioration or data omission can be prevented when outputting a document image; and (5) Electronic use of the document, such as desktop publishing (DTP), is facilitated.

Fifth Embodiment

In addition to the above-described embodiments, the fifth embodiment attributes importance to security.

Figure 18:
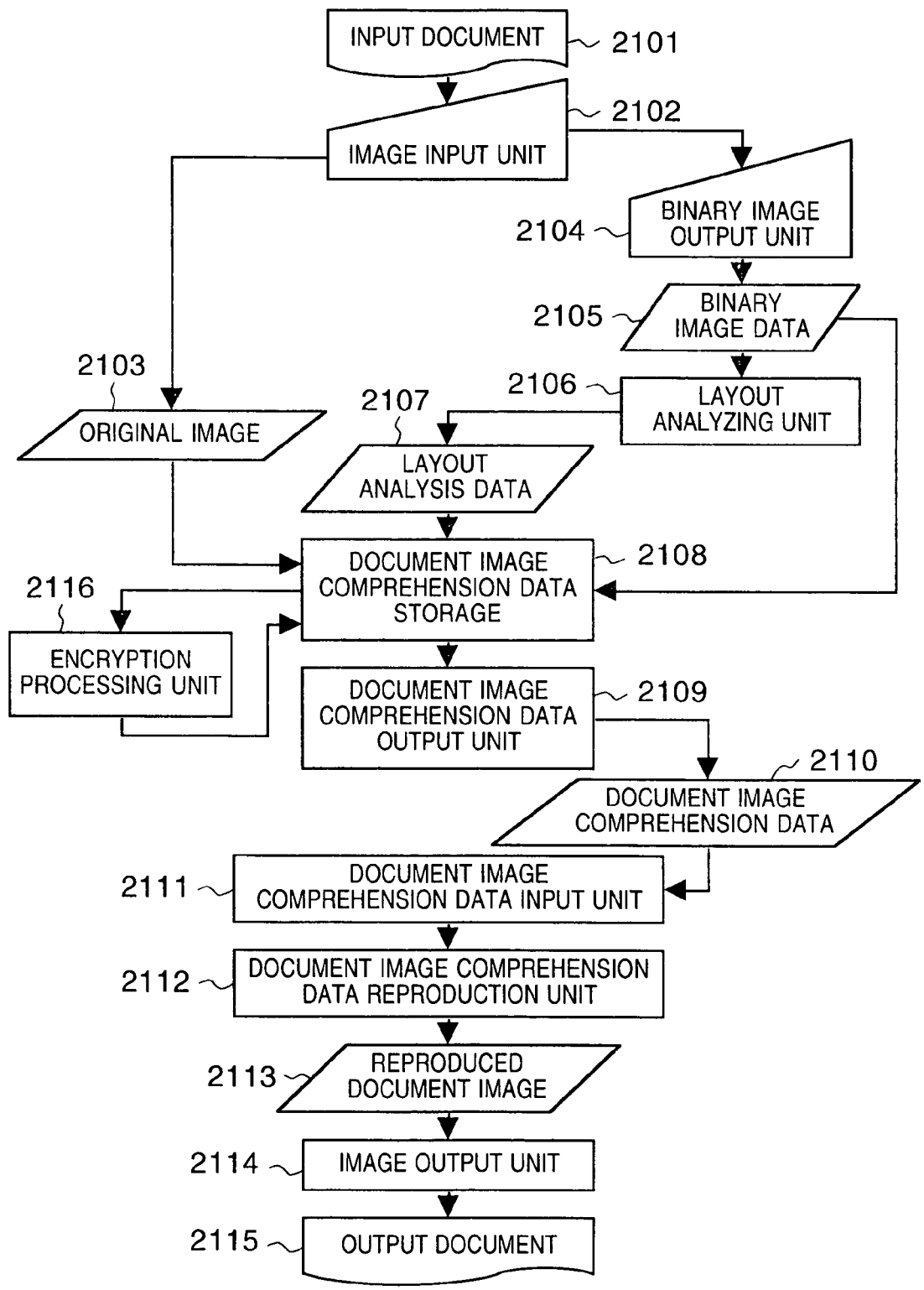
FIG. 18 is a block diagram showing data flow according to a fifth embodiment of the present invention.

FIG. 18 is a block diagram showing the structural concept and data flow according to the fifth embodiment.

In FIG. 18, reference numeral 2101 denotes an input document including printing materials subjected to be inputted or image data processed by a computer; 2102, an image input unit for inputting a document as image data; 2103, original image data inputted from the image input unit 2102; 2104, a binary image output unit for generating a binary image from the inputted document image; 2105, generated binary image data; 2106, a layout analyzing unit for generating and outputting layout analysis data, obtained by dividing the document image into areas having various attributes, such as drawings, texts, charts or the like, based on the binary image data 2105; 2107, layout analysis data; 2108, a document image comprehension data storage for storing image data and encrypted data as document image comprehension data, generated from the inputted original document image and binary image based on the layout analysis data while adaptively changing a storage condition; 2109, a document image comprehension data output unit for outputting document image comprehension data; 2110, document image comprehension data; 2111, document image comprehension data input unit for inputting the document image comprehension data; 2112, a document image comprehension data reproduction unit for generating a reproduced document image from the document image comprehension data while adaptively changing the reproduction condition; 2113, a reproduced document image; 2114, an image output unit for outputting the reproduced document image; 2115, an output document; and 2116, an encryption processing unit characteristic of the fifth embodiment for encrypting character recognition data and image data of an arbitrary area.

The above-described data flow and processing are realized in a system similar to that shown in FIG. 2.

Next, the processing flow is described with reference to the flowcharts in FIGS. 19 to 21, and FIGS. 18, 2, 14, 15, 27 to 29.

The fifth embodiment describes an image comprehension data processing system in which 24-bit multivalued image data is inputted by a scanner (203 or 206), automatic encryption is performed with regard to an area having the "text" attribute, then the encrypted data is stored, transmitted through a network, and outputted to a monochrome printer (208, 211, 205) at the transmitted destination.

Figure 19:
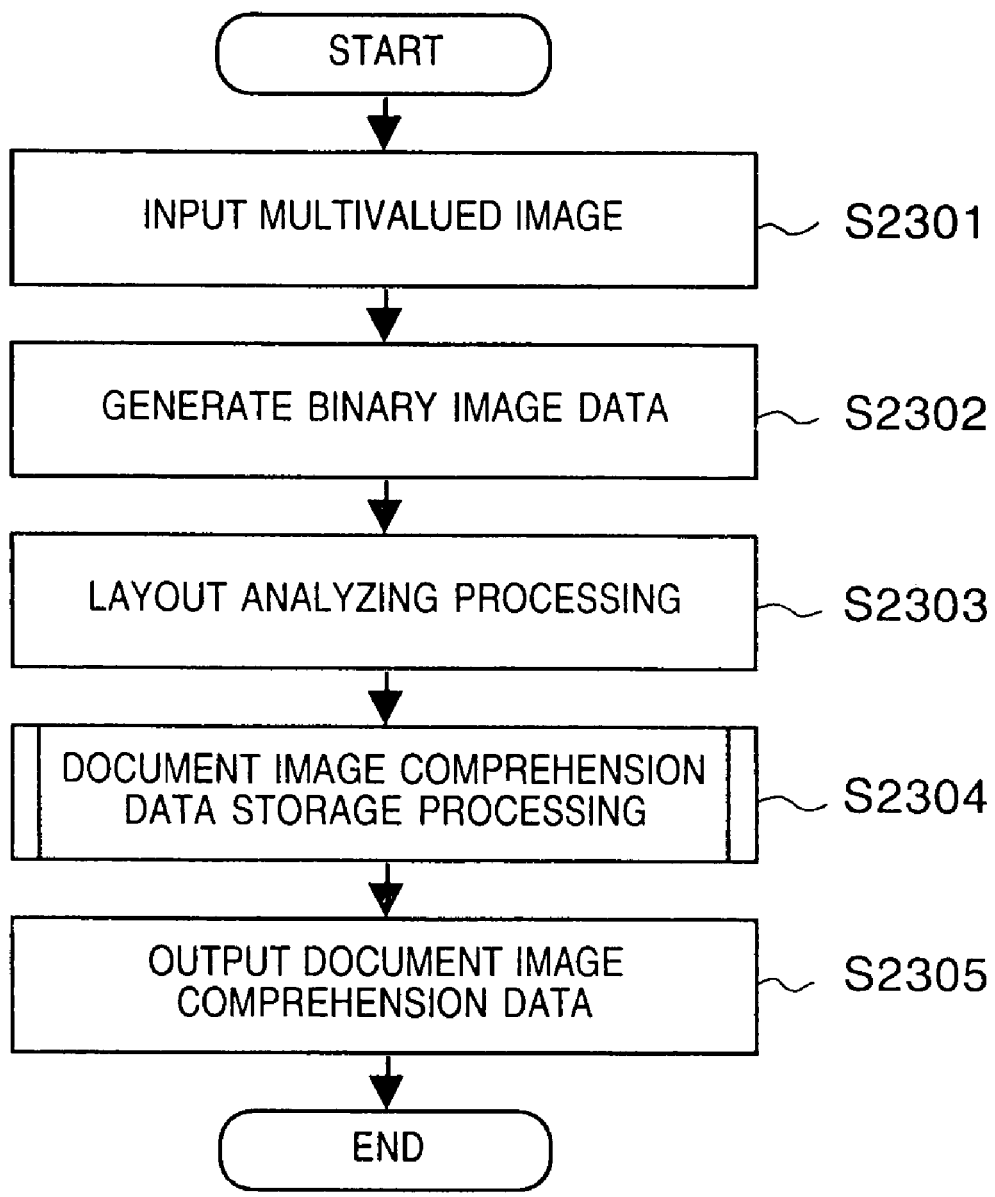
FIG. 19 is a flowchart showing the processing steps from inputting an image to outputting document image comprehension data according to the fifth embodiment.

First in step S2301 in FIG. 19, a document image is inputted as multivalued image data by a scanner serving as the image input unit (2102 in FIG. 18). In step S2302, a binary image is generated by the binary image output unit (2104 in FIG. 18). Based on the generated binary image, the layout analyzing unit (2106 in FIG. 18) divides the document image into various attribute areas, such as drawings, texts, charts or the like, and outputs layout data. The layout data has already been described in the first embodiment with reference to FIGS. 15A and 15B.

In step S2304, based on the layout analysis data, document image comprehension data is generated from the multivalued image, representing the inputted original document image, and binary image, while adaptively changing the storage condition, and the generated data is stored in the document image comprehension data storage (2108 in FIG. 18). At this step, encryption processing for the data in a predetermined specified area is performed.

According to the fifth embodiment, image data in the "text" area is encrypted.

An example of document image comprehension data storage processing is described with reference to the flowchart in FIG. 20, and FIGS. 14, 15 and 27.

Figure 20:
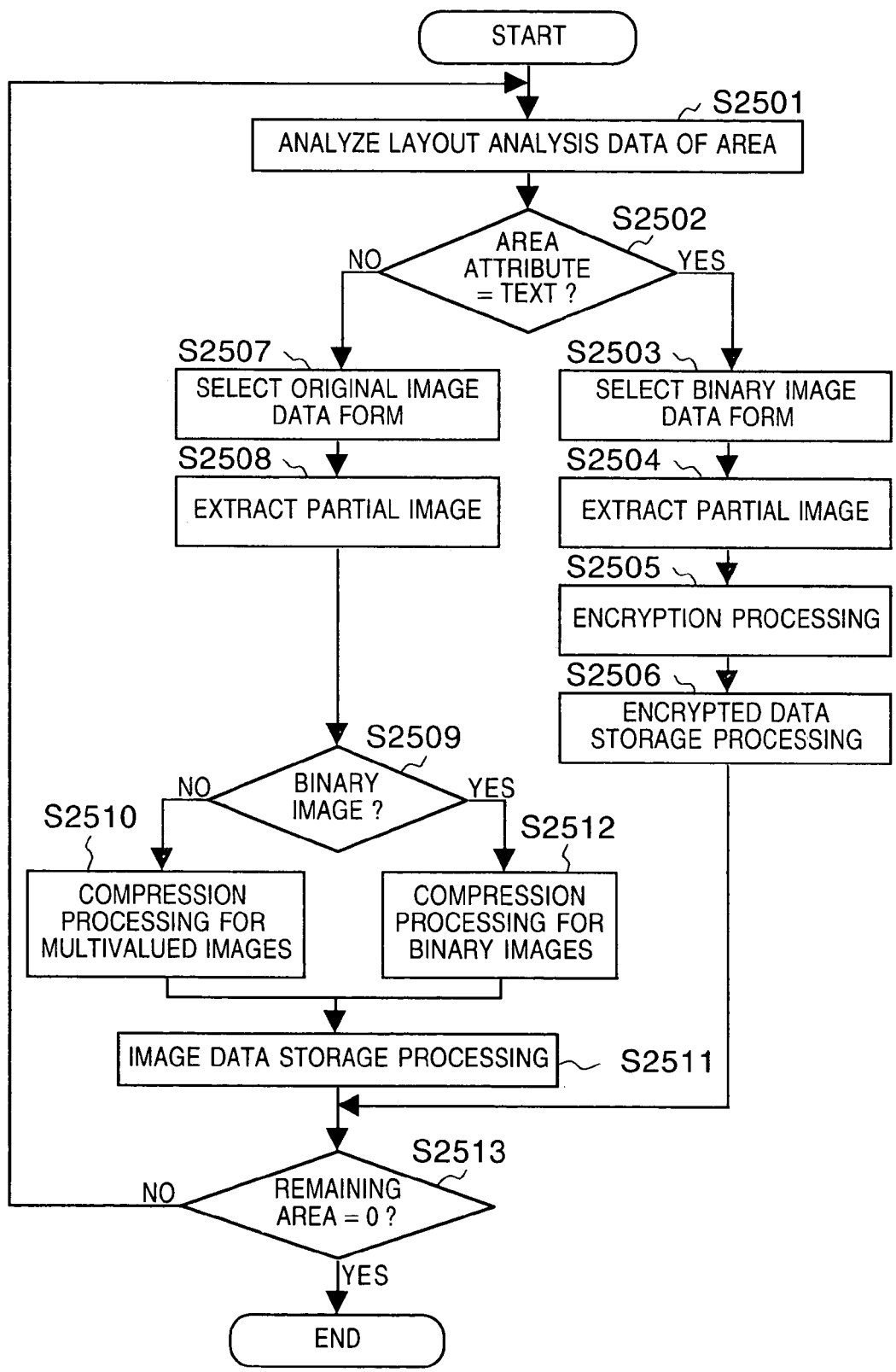
FIG. 20 is a flowchart showing document image comprehension data storage processing according to the fifth embodiment.

According to the fifth embodiment, when the document image comprehension data storage processing (step S2304 in FIG. 19) is started, the layout analysis data of each area is analyzed in step S2501 in FIG. 20 to categorize the area attribute.

In step S2502, if the area attribute is "texts", a binary image is selected to be extracted in step S2503. Then in step S2504, the partial image is extracted by using coordinate data of the area represented by the layout analysis data.

In step S2505, encryption processing is performed on this partial image and encrypted data is generated. In step S2506, the encrypted data is stored as document image comprehension data.

As exemplified in FIGS. 27A to 27D, the document image comprehension data for an area includes partial image data comprising: an ID uniquely assigned to the area, the width of the extracted area, height of the extracted area, type of image, compression method employed, image size, and encrypted extracted image. Herein, the assigned ID corresponds to the sequence of area extraction performed by the layout analyzing unit 2106. At this step, validating (=1) an encryption flag indicates that the data is encrypted.

If the area attribute is not "texts" in step S2502, a multivalued image, i.e., original image, is selected to be extracted in step S2507. Then in step S2508, the partial image is extracted by using coordinate data of the area represented by the layout analysis data.

Next, the type of extracted partial image is determined in step S2509. If it is a binary image type, compression processing for binary images (e.g., MMR or the like) is performed in step S2512. The compressed partial image is stored as document image comprehension data (FIGS. 27A to 27D) in step S2511.

At this step, by embedding information indicative of the compression method in the document image comprehension data, the compressed image can be decompressed in the document image comprehension data reproduction processing.

Meanwhile, if the extracted partial image is a multivalued image type in step S2509, compression processing for multivalued images (e.g., JPEG or the like) is performed in step S2510. The compressed partial image is stored as document image comprehension data (FIGS. 27A to 27D) in step S2511.

As exemplified in FIGS. 27A to 27D, the document image comprehension data for an area includes partial image data comprising: an ID uniquely assigned to the area, the width of the extracted area, height of the extracted area, type of image, compression method employed, image size, and compressed extracted image. Herein, the assigned ID corresponds to the sequence of area extraction performed by the layout analyzing unit 2106.

In step S2513 in FIG. 20, it is determined whether or not there is a remaining area to be processed. If there is a remaining area, the control returns to step S2501 for repeating the above-described processing with respect to the remaining area. If there is no remaining area, the document image comprehension data storage processing ends. Then, the control proceeds to step S2305 in FIG. 19 to output the document image comprehension data.

According to the fifth embodiment, the document image comprehension data, generated and stored by the document image comprehension data storage (2108), is outputted to a network and transmitted to users through the network by the document image comprehension data output unit 2109.

In the user side (clients), as described in the first embodiment, processing is performed according to the flowchart shown in FIG. 4. More specifically, the document image comprehension data is inputted by the document image comprehension data input unit (2111) in step S401, and the document image is reproduced in step S402 from the document image comprehension data while adaptively changing a reproduction condition.

Figure 21:
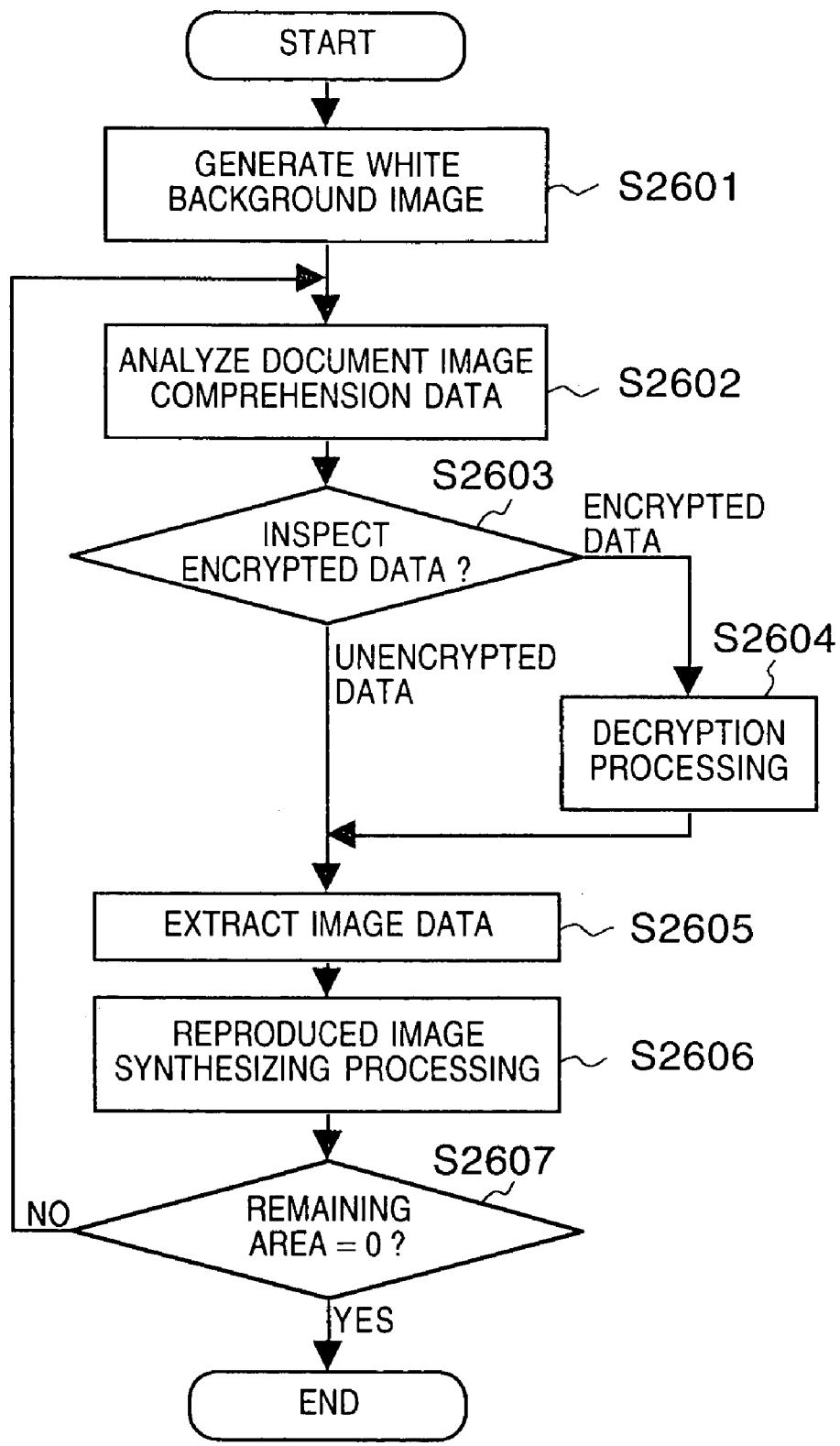
FIG. 21 is a flowchart showing document image comprehension data reproduction processing according to the fifth embodiment.

The document image comprehension data reproduction processing (step S402) according to the fifth embodiment is described with reference to the flowchart in FIG. 21.

In step S2601, a white background image is generated to be used as a background of the reproduced document image. In step S2602, document image comprehension data is analyzed. In step S2603, if an encryption flag for encrypted data of the partial area is validated (=1), the encrypted data is extracted from the document image comprehension data in step S2604 to perform decryption processing, and the partial image is recovered.

If the encryption flag is not validated, image data is extracted from the document image comprehension data in step S2605. Then in step S2606, a reproduction image is generated by synthesizing the extracted partial image with the white background image.

The reproduction image synthesizing processing (step S2606) is performed according to the flowchart in FIG. 10 which is described in the first embodiment.

More specifically, the type of partial image is extracted from the document image comprehension data in step S1001. If it is determined in step S1002 that the type of image is the "binary image type", pseudo 24-bit conversion is performed in step S1003 by respectively converting black and white pixels of the binary image to black and white pixels of a 24-bit multivalued image.

In the fifth embodiment, assume that a black pixel of the binary image is expressed by 1, and a white pixel of the binary image is expressed by 0. A black pixel of the 24-bit multivalued image is expressed by R=0, G=0, B=0, and a white pixel of the 24-bit multivalued image is expressed by R=255, G=255, B=255 (R: red component; G: green component; B: blue component, each having 8-bit value).

In step S1002, if it is determined that the type of image is the "24-bit multivalued image type", the partial image without being processed is used for synthesizing processing. In step S1004, logical operation is performed on each pixel of the partial image with respect to the background image and partial image so as to generate a synthesized image.

In the fifth embodiment, logical operation is performed such that a white pixel (R=255, G=255, B=255) of the background image, which is synthesized with a black pixel of the partial image (R=0, G=0, B=0), forms a black pixel (R=0, G=0, B=0).

When the reproduction image synthesizing processing (step S2606) for one partial image is completed in the foregoing manner, whether or not there is a remaining partial area is determined in step S2607. If there is a remaining area, the control returns to step S2602 for repeating the above-described processing with respect to the remaining area, whereas if there is no remaining area, the document image comprehension data reproduction processing ends.

Then, the reproduced image is outputted as an output document in step S403 in FIG. 4 by a monochrome printer serving as the image output unit (2114).

Sixth Embodiment

In the above-described fifth embodiment, a text area is encrypted. According to the sixth embodiment, it is also possible to encrypt a specified area attribute selected by an operator.

A specific example is described with reference to FIGS. 19, 22 and 23. Note that FIG. 23 is a modification of FIG. 18.

Figure 22:
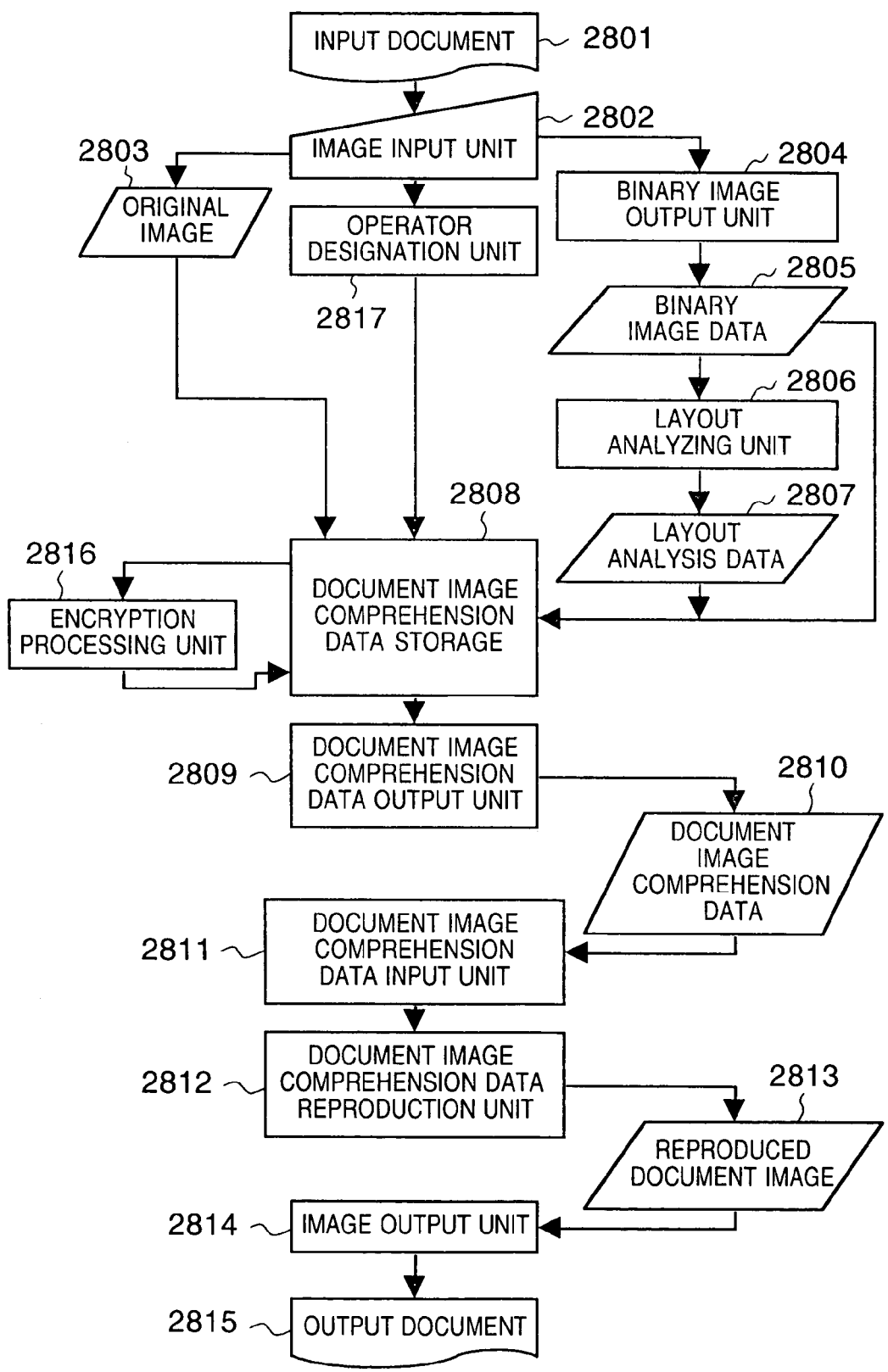
FIG. 22 is a block diagram showing data flow according to a sixth embodiment of the present invention.
Figure 23:
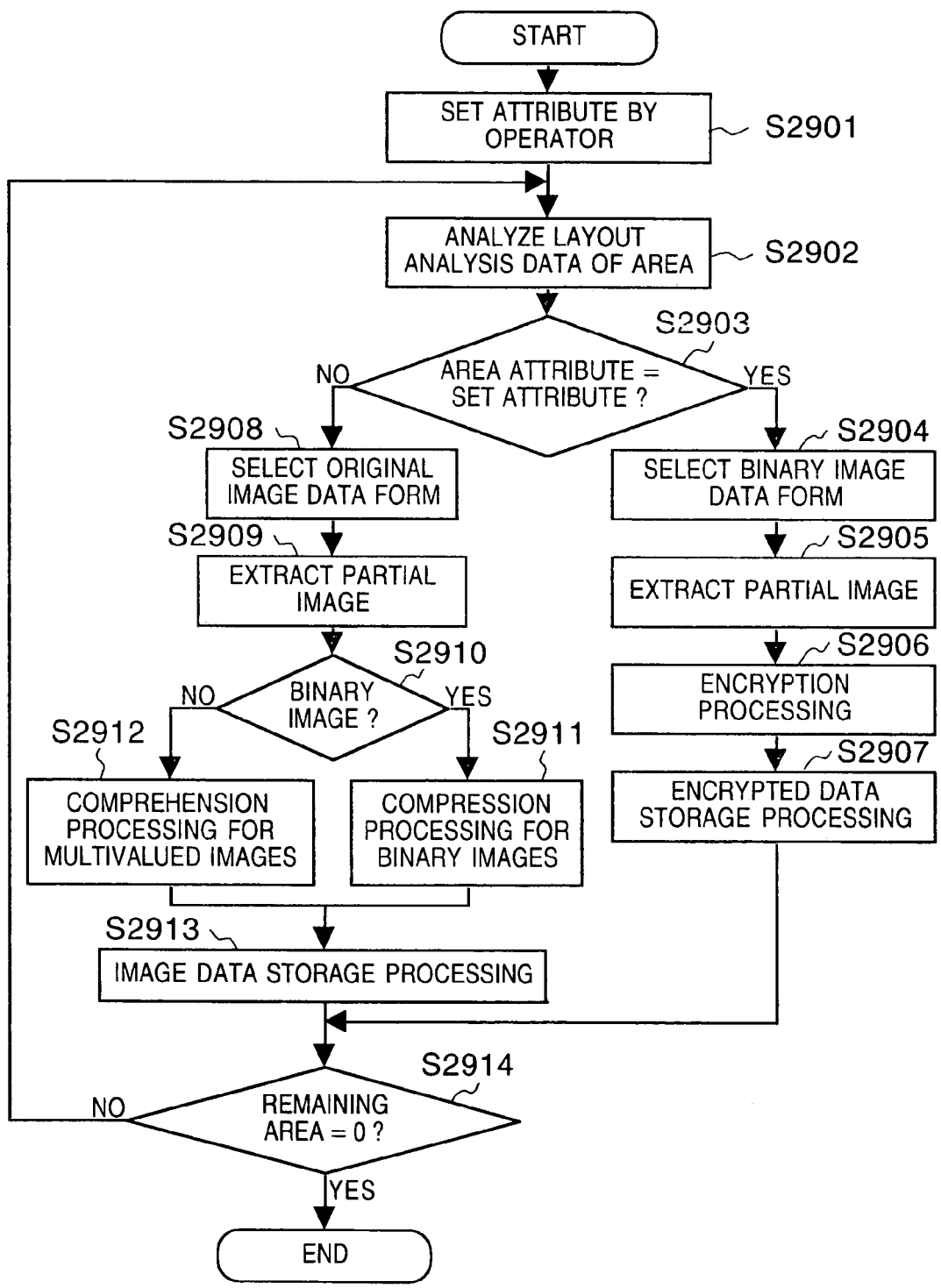
FIG. 23 is a flowchart showing document image comprehension data storage processing according to the sixth embodiment.

In step S2301 in FIG. 19, a document image (2801) is inputted as multivalued image data (2803) by a scanner serving as the image input unit (2802 in FIG. 22).

Next, an area attribute subjected to encryption is designated by an operator designation unit (2817 in FIG. 22). Herein, for instance, an inputted image is displayed, and designation is made to encrypt an area having an attribute "charts."

Figures 15A, 15B:
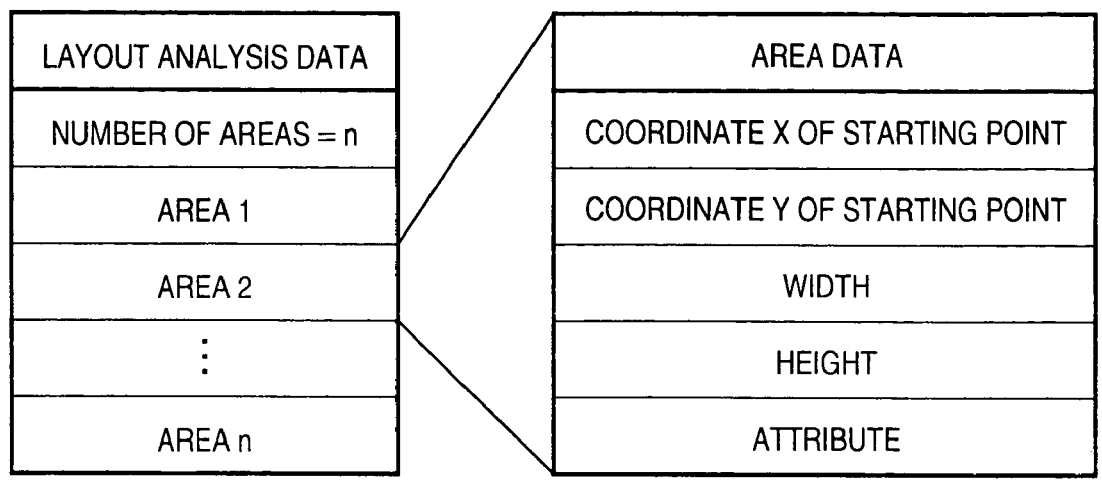
FIGS. 15A and 15B show a data structure of layout analysis data according to the first embodiment.

In step S2302, a binary image (2805) is generated by the binary image output unit (2804 in FIG. 22). Based on the generated binary image (2805), in step S2303, the layout analyzing unit (2806 in FIG. 22) divides the document image into various attribute areas, such as drawings, texts, charts or the like, and outputs layout data (2807. FIGS. 15A and 15B).

In step S2304, based on the layout analysis data (2807) and operator's designation, document image comprehension data is generated from the multivalued image (2803), representing the inputted original document image, and binary image (2805), while adaptively changing the storage condition, and the generated data is stored in the document image comprehension data storage (2808 in FIG. 22).

A specific example of document image comprehension data storage processing is described with reference to the flowchart in FIG. 23, and FIGS. 14, 15 and 27.

Figure 30:
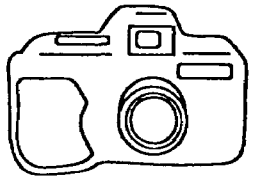
FIG. 30 shows an example of graphic user interface (GUI) according to the sixth embodiment.

According to the sixth embodiment, when the document image comprehension data storage processing (step S2304) is started, an attribute designated by an operator is set in step S2901 in FIG. 23. FIG. 30 shows a display screen at this stage. An operator designates a combination menu box for encryption designation, located in the upper right of the window, and specifies encryption of a desired area attribute. Assume herein that the operator designates "texts". This setting may be performed by pointing at a desired area in the menu with a pointing device or the like.

In step S2902, the layout analysis data of each area is analyzed to categorize the area attribute. In step S2903, if the area attribute is designated to encryption, i.e., if the area attribute is "texts" in this case, a binary image is selected in step S2904 as the entire image to be extracted. In step S2905, the partial image is extracted by using coordinate data of the area represented by the layout analysis data.

In step S2906, encryption processing is performed on the partial image and encrypted data is generated. In step S2907, the encrypted data is stored as document image comprehension data.

Validating (=1) an encryption flag indicates that the data is encrypted.

In step S2903, if the area attribute is not designated to encryption, the original image is selected in step S2908 as the entire image to be extracted, and the partial image is extracted in step S2909 by using coordinate data of the area represented by the layout analysis data.

Next, the type of extracted partial image is determined in step S2910. If it is a binary image type, compression processing for binary images (e.g., MMR or the like) is performed in step S2911. The compressed partial image is stored as document image comprehension data (FIGS. 27A to 27D) in step S2913.

At this step, by embedding information indicative of the compression method in the document image comprehension data, the compressed image can be decompressed in the document image comprehension data reproduction processing.

Meanwhile, if the extracted partial image is a multivalued image type in step S2910, compression processing for multivalued images (e.g., JPEG or the like) is performed in step S2912. The compressed partial image is stored as document image comprehension data (FIGS. 27A to 27D) in step S2913.

As exemplified in FIGS. 27A to 27D, the document image comprehension data for an area includes partial image data comprising: an ID uniquely assigned to the area, the width of the extracted area, height of the extracted area, type of image, compression method employed, image size, and compressed extracted image. Herein, the assigned ID corresponds to the sequence of area extraction performed by the layout analyzing unit 2806.

In step S2914, it is determined whether or not there is a remaining area to be processed. If there is a remaining area, the control returns to step S2902 for repeating the above-described processing with respect to the remaining area, whereas if there is no remaining area, the document image comprehension data storage processing ends. Then, the document image comprehension data is outputted in step S2305 in FIG. 19.

Seventh Embodiment

In the above-described sixth embodiment, encryption/no encryption is designated for each area attribute. According to the seventh embodiment, an operator can confirm an inputted image and layout analysis results, and as a result of analyzing them, the operator can designate encryption of a desired area by specifying the area.

A specific example is described with reference to FIGS. 19, 24 and 25.

Figure 24:
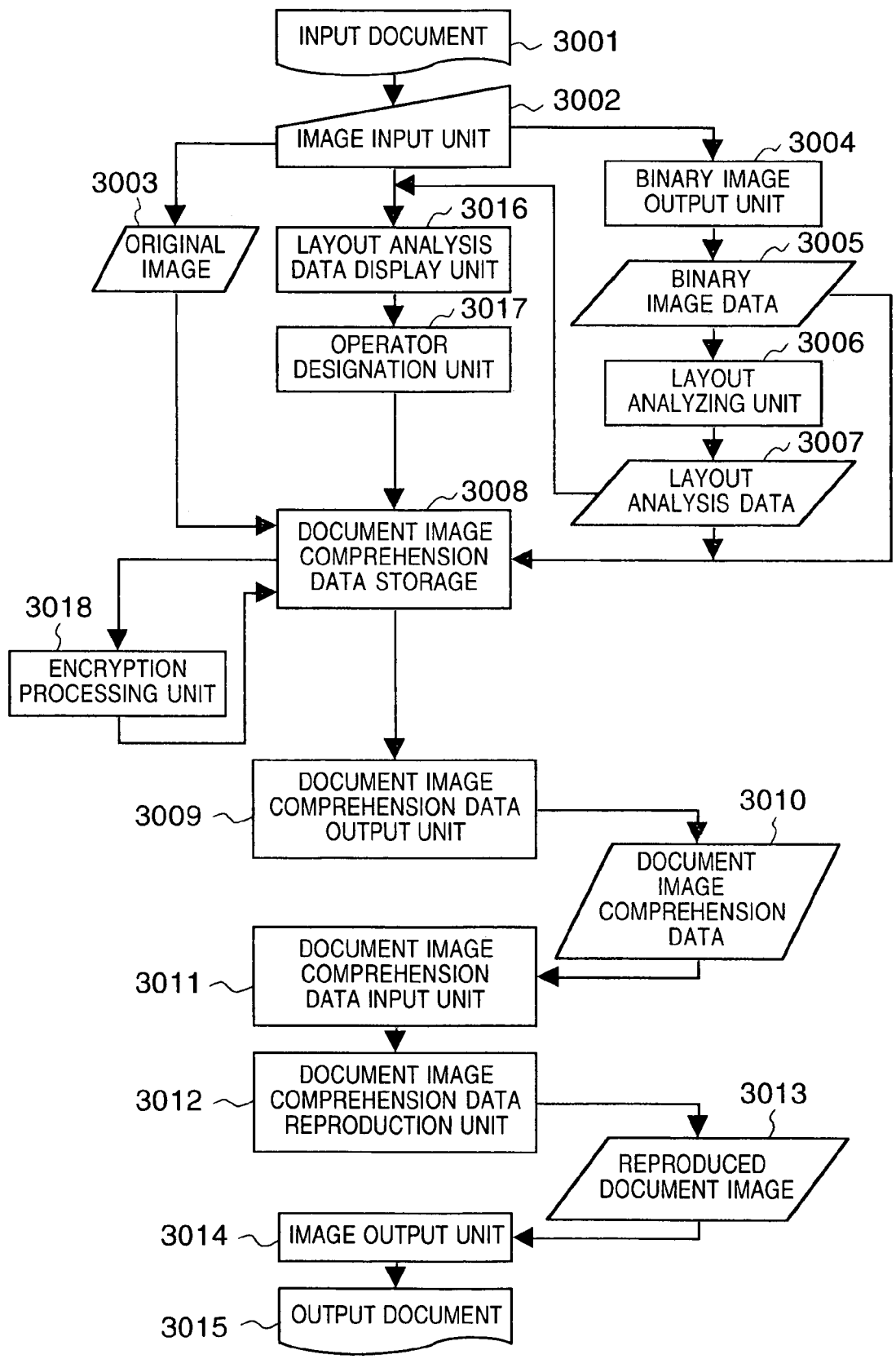
FIG. 24 is a block diagram showing data flow according to a seventh embodiment of the present invention.

In step S2301 in FIG. 19, a document image is inputted as multivalued image data by a scanner serving as the image input unit (3002 in FIG. 24).

In step S2302, a binary image is generated by the binary image output unit (3004 in FIG. 24). Based on the generated binary image, in step S2303, the layout analyzing unit (3006 in FIG. 24) divides the document image into various attribute areas, such as drawings, texts, charts or the like, and outputs layout data (FIGS. 15A and 15B).

Figure 31:
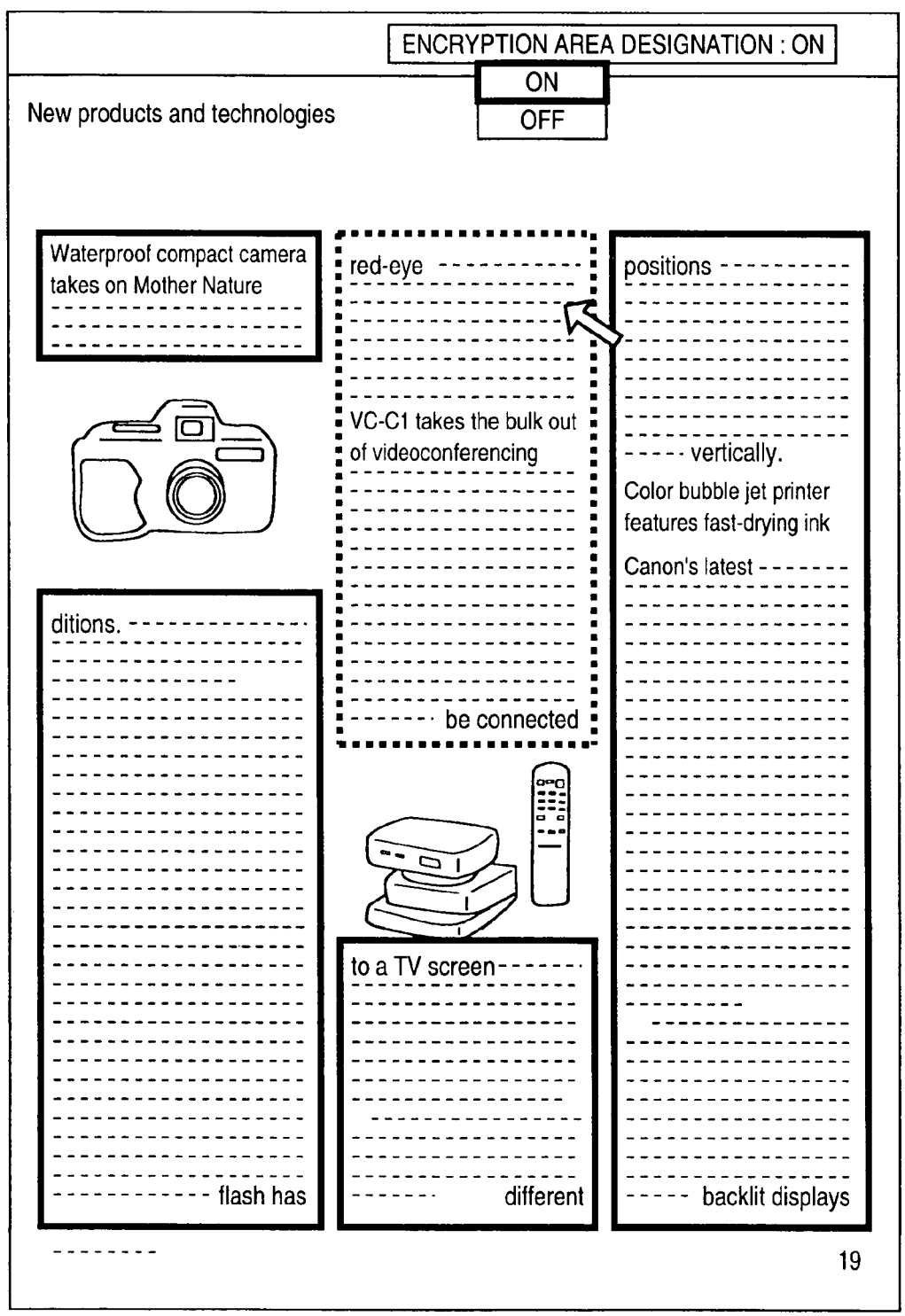
FIG. 31 shows an example of graphic user interface (GUI) according to the seventh embodiment.

The layout data is superimposed with the inputted image and displayed by the layout analysis data display unit (3016 in FIG. 24). By this, an operator is able to designate an area to be encrypted from an operator designation unit (3017 in FIG. 24) with a pointing device or the like. FIG. 31 shows an operation screen at this stage. First, an operator designates a desired area, and then specifies the setting of encryption to "ON" with respect to the designated area. The area designated to encryption (text area in the drawing) is displayed distinguishably from other areas so as to inform the operator that which area is subjected to encryption.

In step S2304, based on the layout analysis data and operator's designation, document image comprehension data is generated from the multivalued image, representing the inputted original document image, and binary image, while adaptively changing the storage condition, and the generated data is stored in the document image comprehension data storage (3008 in FIG. 24).

An example of document image comprehension data storage processing is described with reference to the flowchart in FIG. 25, and FIGS. 14, 15 and 27.

Figure 25:
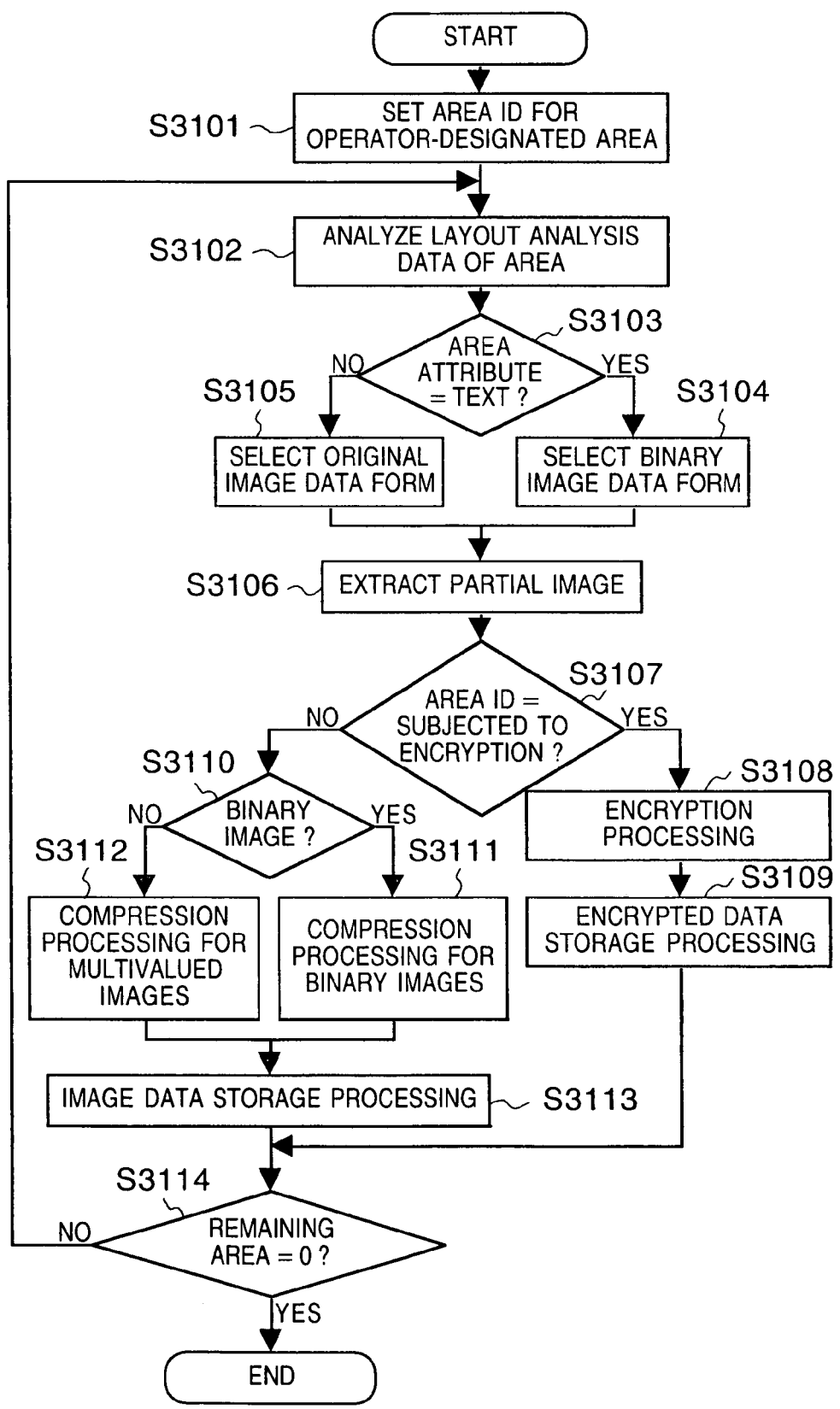
FIG. 25 is a flowchart showing document image comprehension data storage processing according to the seventh embodiment.

According to the seventh embodiment, when the document image comprehension data storage processing (step S2304) is started, an area ID of the area, designated by an operator, is set in step S3101 in FIG. 25. In step S3102, the layout analysis data of each area is analyzed to categorize the area attribute.

In step S3103, if the area attribute is "texts", a binary image is selected in step S3104 as the entire image to be extracted. In step S3106, the partial image is extracted by using coordinate data of the area represented by the layout analysis data.

In step S3103, if the area attribute is not "texts", the original image is selected in step S3105 as the entire image to be extracted, and the partial image is extracted in step S3106 by using coordinate data of the area represented by the layout analysis data.

In step S3107, the area ID is inspected to determine whether or not the area is subjected to encryption.

If the area is subjected to encryption, encryption processing is performed on the partial image in step S3108 and encrypted data is generated. In step S3109, the encrypted data is stored as document image comprehension data.

Validating (=1) an encryption flag indicates that the data is encrypted.

If the area is not subjected to encryption in step S3107, the type of extracted partial image is determined in step S3110. If it is a binary image type, compression processing for binary images (e.g., MMR or the like) is performed in step S3111. The compressed partial image is stored as document image comprehension data (FIGS. 27A to 27D) in step S3113.

At this step, by embedding information indicative of the compression method in the document image comprehension data, the compressed image can be decompressed in the document image comprehension data reproduction processing.

Meanwhile, if the extracted partial image is a multivalued image type (non-binary image, e.g., photograph image or the like) in step S3110, compression processing for multivalued images (e.g., JPEG or the like) is performed in step S3112. The compressed partial image is stored as document image comprehension data (FIGS. 27A to 27D) in step S3113.

As exemplified in FIGS. 27A to 27D, the document image comprehension data for an area includes partial image data comprising: an ID uniquely assigned to the area, the width of the extracted area, height of the extracted area, type of image, compression method employed, image size, and compressed extracted image. Herein, the assigned ID corresponds to the sequence of area extraction performed by the layout analyzing unit.

In step S3114, it is determined whether or not there is a remaining area to be processed. If there is a remaining area, the control returns to step S3102 for repeating the above-described processing with respect to the remaining area.

If there is no remaining area, the document image comprehension data storage processing ends. Then, the document image comprehension data is outputted in step S2305 in FIG. 19.

Eighth Embodiment

With respect to an area of a document image having a character-recognizable attribute, e.g., texts, character recognition data instead of image data may be stored, or both image data and character recognition data may be stored by using character recognition processing. In such case, it is possible to encrypt the character recognition data and image data and store the encrypted data.

Hereinafter, a specific example of this case is described as the eighth embodiment. With reference to FIGS. 18, 19, 26, 14, 15, and 27 to 29, descriptions are provided on an example of storing encrypted character recognition data for a "text" area, and storing image data for other areas.

In step S2301 in FIG. 19, a document image is inputted as multivalued image data by a scanner serving as the image input unit (2102 in FIG. 18).

In step S2302, a binary image is generated by the binary image output unit (2104 in FIG. 18). Based on the generated binary image, in step S2303, the layout analyzing unit (2106 in FIG. 18) divides the document image into various attribute areas, such as drawings, texts, charts or the like, and outputs layout data (FIGS. 15A and 15B).

In step S2304, based on the layout analysis data, document image comprehension data is generated from the multivalued image, representing the inputted original document image, and binary image, while adaptively changing the storage condition, and the generated data is stored in the document image comprehension data storage (2108 in FIG. 18).

At this step, encryption processing is also performed on the data of a predetermined specific area.

An example of document image comprehension data storage processing is described with reference to the flowchart in FIG. 26, and FIGS. 14, 15 and 27 to 29.

Figure 26:
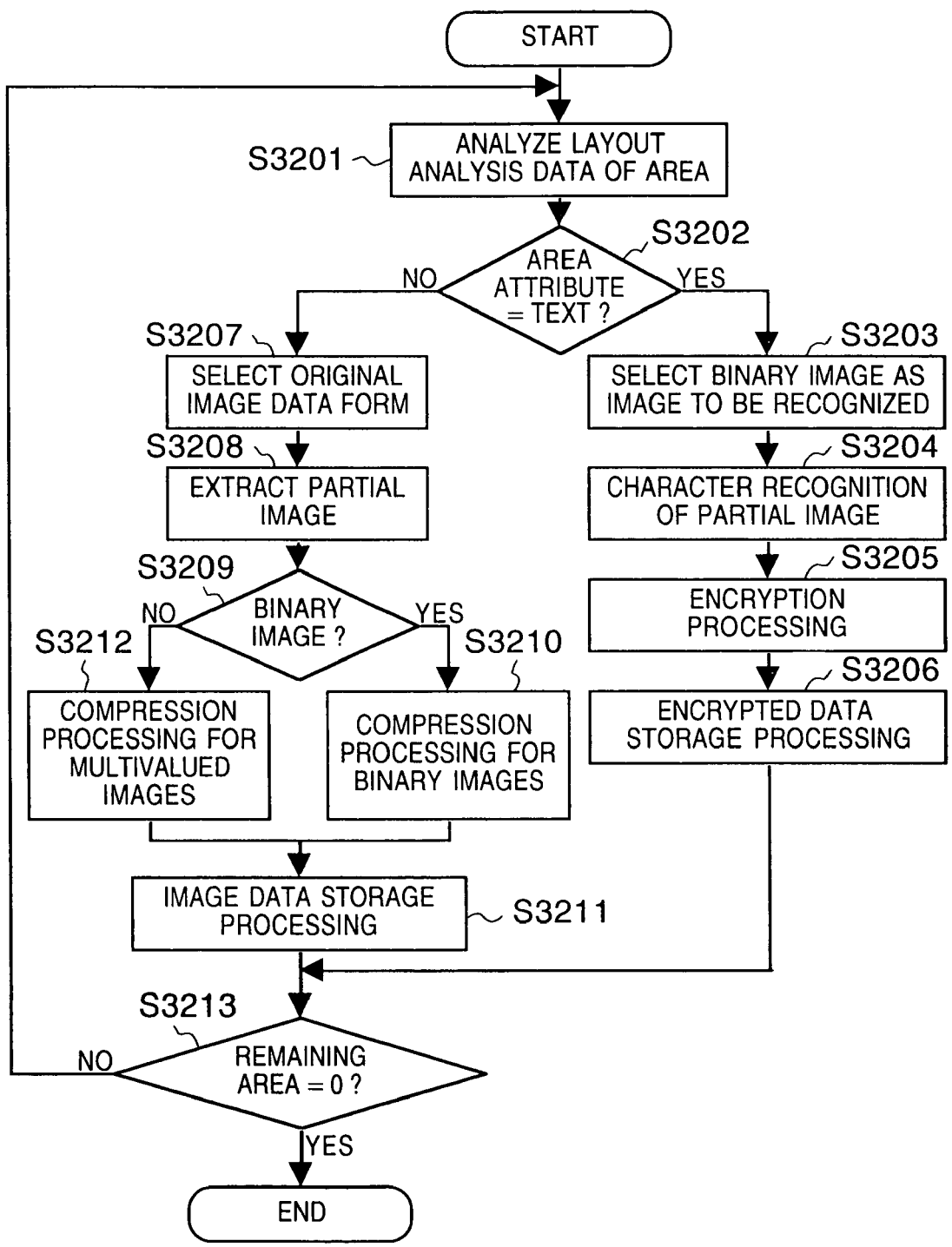
FIG. 26 is a flowchart showing document image comprehension data storage processing according to an eighth embodiment of the present invention.
Figures 27A, 27B, 27C, 27D:
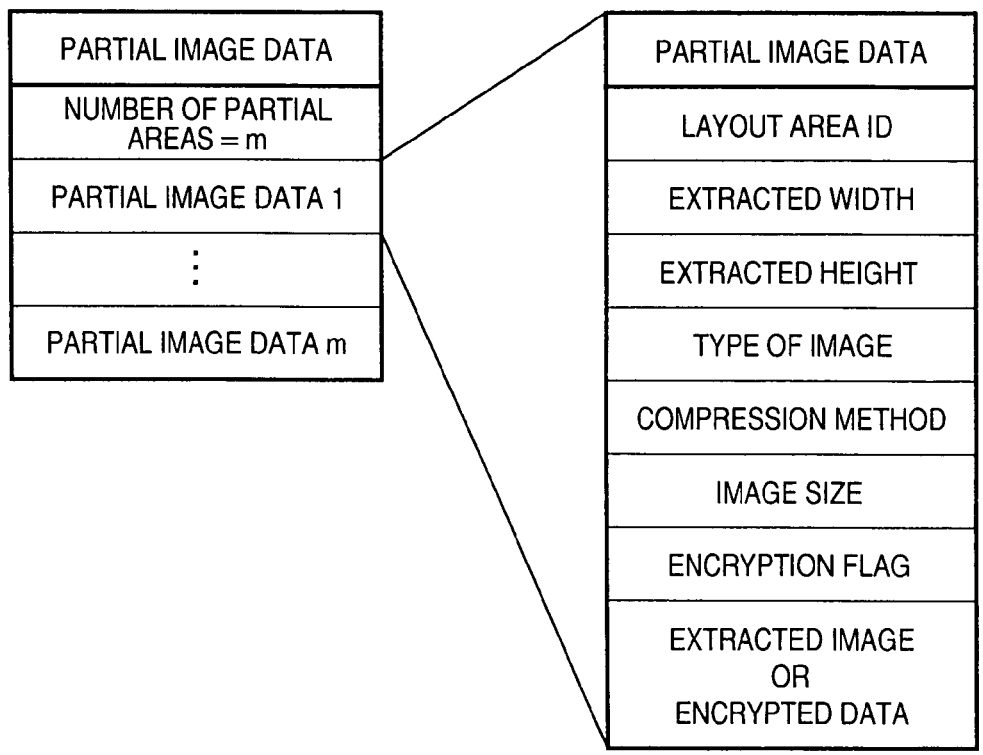
FIGS. 27A to 27D show a data structure of image data according to the fifth embodiment.
Figure 28:
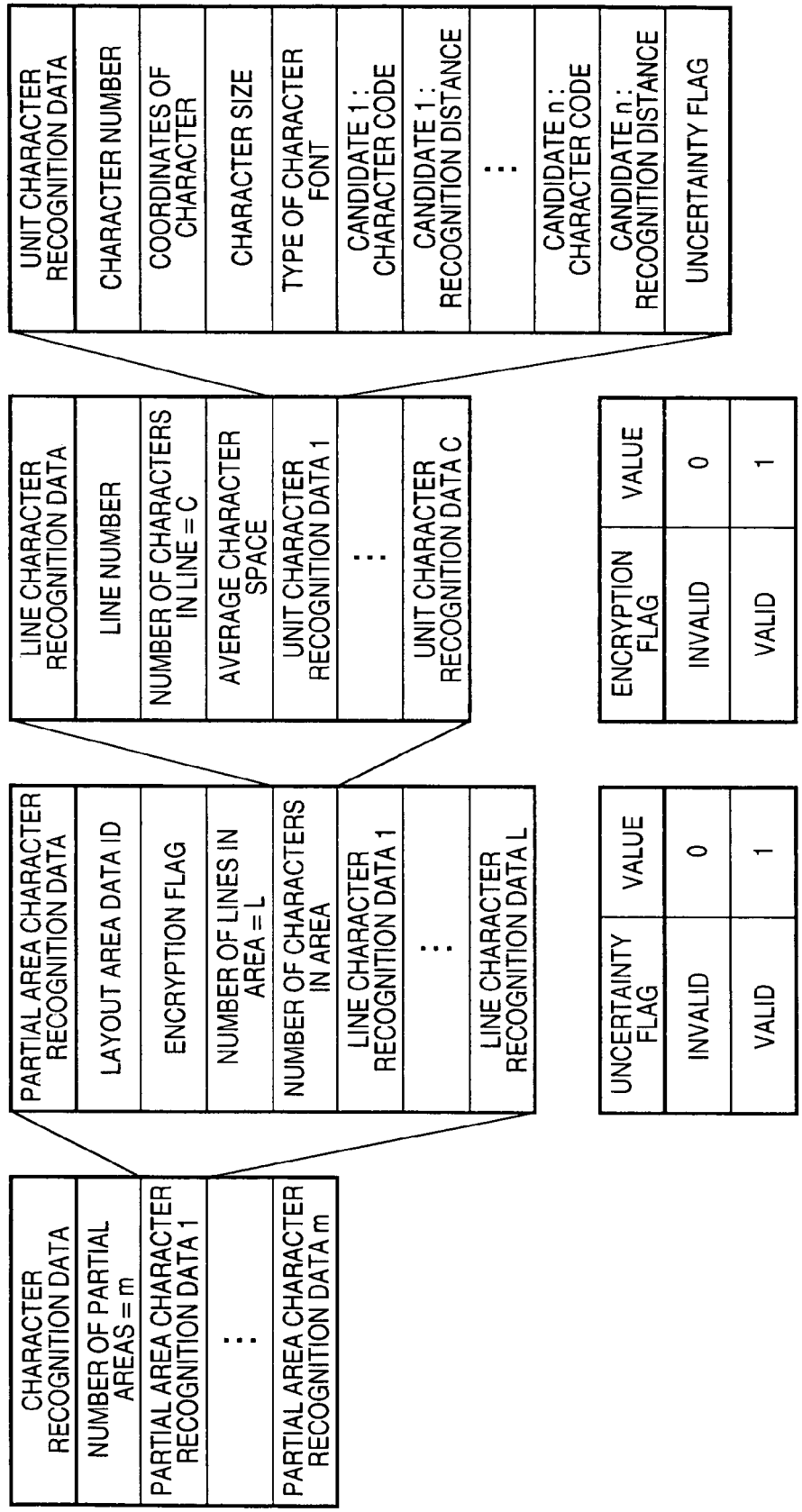
FIG. 28 shows a data structure of character recognition data according to the fifth embodiment.

According to the eighth embodiment, when the document image comprehension data storage processing (step S2304) is started, the layout analysis data of each area is analyzed to categorize the area attribute in step S3201 in FIG. 26. In step S3202, if the area attribute is "texts", a binary image is selected in step S3203 as the image to be recognized. In step S3204, character recognition processing is performed on the partial image by using coordinate data of the area represented by the layout analysis data.

Figure 29:
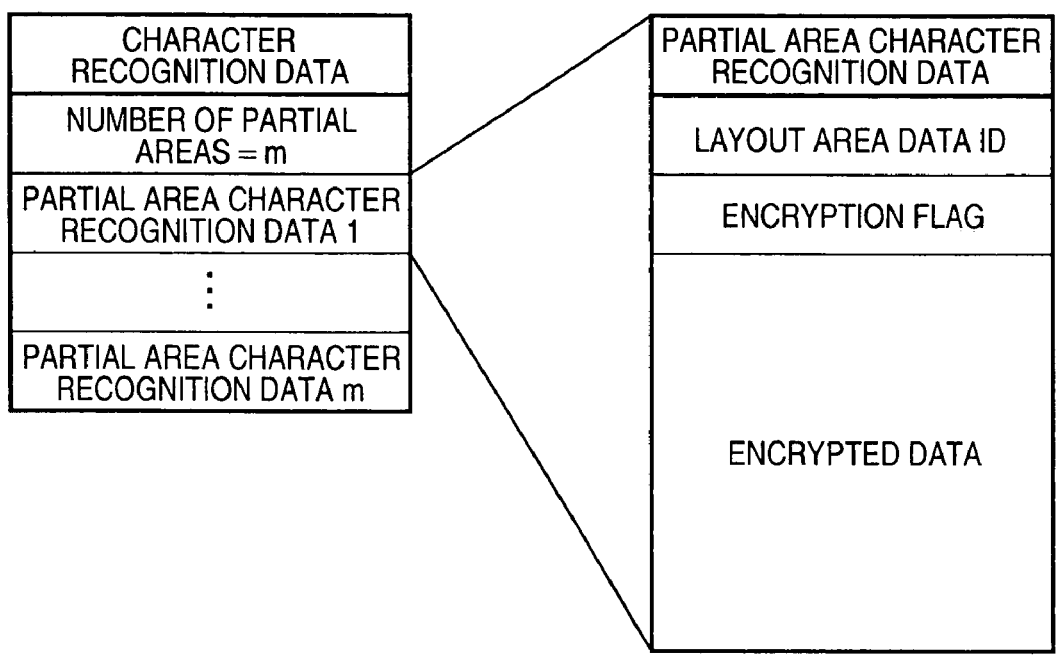
FIG. 29 shows a data structure of encrypted character recognition data according to the fifth embodiment.

The character recognition data, obtained by the character recognition processing, is encrypted in step S3205 and encrypted data is generated. In step S3206, the encrypted data is stored as document image comprehension data (FIG. 29). Herein, validating (=1) an encryption flag indicates that the data is encrypted.

In step S3202, if the area attribute is not "texts", the original image is selected in step S3207 as the entire image to be extracted, and the partial image is extracted in step S3208 by using coordinate data of the area represented by the layout analysis data.

The type of extracted partial image is determined in step S3209. If it is a binary image type, compression processing for binary images (e.g., MMR or the like) is performed in step S3210. The compressed partial image is stored as document image comprehension data (FIGS. 27A to 27D) in step S3211.

At this step, by embedding information indicative of the compression method in the document image comprehension data, the compressed image can be decompressed in the document image comprehension data reproduction processing.

Meanwhile, if the extracted partial image is a multivalued image type in step S3209, compression processing for multivalued images (e.g., JPEG or the like) is performed in step S3212. The compressed partial image is stored as document image comprehension data (FIGS. 27A to 27D) in step S3211.

As exemplified in FIGS. 27A to 27D, the document image comprehension data for an area includes partial image data comprising: an ID uniquely assigned to the area, the width of the extracted area, height of the extracted area, type of image, compression method employed, image size, and compressed extracted image. Herein, the assigned ID corresponds to the sequence of area extraction performed by the layout analyzing unit.

In step S3213, it is determined whether or not there is a remaining area to be processed. If there is a remaining area, the control returns to step S3201 for repeating the above-described processing with respect to the remaining area. If there is no remaining area, the document image comprehension data storage processing ends. Then, the document image comprehension data is outputted in step S2305 in FIG. 19.

Note, further to the above-described processing, the inputted multivalued image may be displayed to enable a user to specify an area for encryption, and with respect to texts in the specified area, both the text image and character recognition result may be encrypted. For unauthorized users (who cannot input a decryption code), a message such as "Text Encrypted. Not Displayable" is presented. When a user points at the encrypted area with a mouse or the like, a decryption-key-input dialogue box is displayed to demand decryption key input. When the inputted key coincides with a set number key, the encrypted texts are displayed. In the case of performing printing for this area, decryption processing is also required.

As has been set forth above, according to the fifth to eighth embodiments, the following effects are attained:

(1) The amount of data is reduced when a document image is stored;

(2) The load imposed on network traffic is reduced when a document image is transmitted;

(3) High quality of a document image suitable for reuse can be maintained when storing or transmitting the document image;

(4) Image quality deterioration or data omission can be prevented when outputting a document image;

(5) Electronic use of the document, such as desktop publishing (DTP), is facilitated; and (6) Security is improved in storage and transmission of document images.

Ninth Embodiment

The ninth embodiment includes an additional function of translating texts of a document image into another language.

Figure 32:
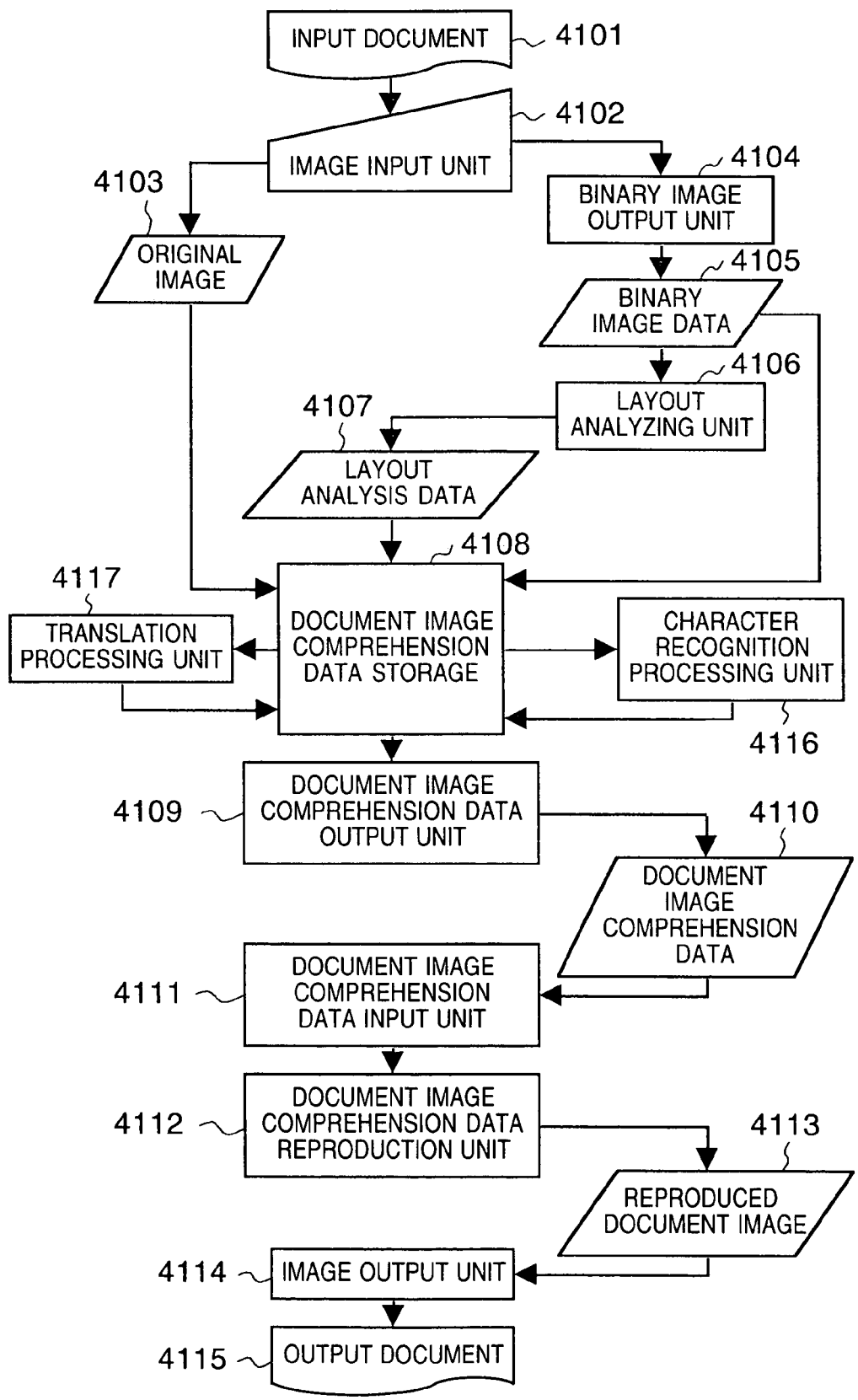
FIG. 32 is a block diagram showing data flow according to a ninth embodiment of the present invention.

FIG. 32 is a block diagram showing the structural concept and data flow according to the ninth embodiment.

In FIG. 32, reference numeral 4101 denotes an input document including printing materials subjected to be inputted or image data processed by a computer; 4102, an image input unit for inputting a document as image data; 4103, original image data inputted from the image input unit 4102; 4104, a binary image output unit for generating a binary image from the inputted document image; 4105, generated binary image data; 4106, a layout analyzing unit for generating and outputting layout analysis data, obtained by dividing the document image into areas having various attributes, such as drawings, texts, charts or the like, based on the binary image data 4105; 4107, layout analysis data; and 4108, a document image comprehension data storage for storing image data, character recognition data, and translated data as document image comprehension data, generated from the inputted original document image and binary image based on the layout analysis data while adaptively changing the storage condition.

Reference numeral 4109 denotes a document image comprehension data output unit for outputting document image comprehension data; 4110, document image comprehension data; 4111, a document image comprehension data input unit for inputting the document image comprehension data; 4112, a document image comprehension data reproduction unit for generating a reproduced document image from the document image comprehension data while adaptively changing the reproduction condition; 4113, a reproduced document image; and 4114, an image output unit for outputting the reproduced document image. Reference numeral 4115 denotes an output document; 4116, a character recognition processing unit for recognizing characters of an arbitrary area and outputting code data or the like as character recognition data; and 4117, a translation processing unit (including dictionaries or the like for analyzing various syntax for translation) for translating data in an arbitrary language into another arbitrary language and outputting the translated data.

Since the system construction is the same as that shown in FIG. 2, description thereof is omitted.

Next, the processing flow is described with reference to the flowcharts in FIGS. 19, 4, 33 and 10, and FIGS. 32, 2, 40, 15 to 17, and 41.

The ninth embodiment describes an image comprehension data processing system in which 24-bit multivalued image data is inputted by a scanner (203 or 206), automatic translation processing is performed with regard to an area having the "text" attribute, then the translated data is stored, transmitted through a network, and outputted to a monochrome printer (208, 211, 205) at the transmitted destination.

First, in step S2301 in FIG. 19, a document image is inputted as multivalued image data by a scanner serving as the image input unit (4102 in FIG. 32).

In step S2302, a binary image is generated by the binary image output unit (4104 in FIG. 32). Based on the generated binary image, in step S2303, the layout analyzing unit (4106 in FIG. 32) divides the document image into various attribute areas, such as drawings, texts, charts or the like, and outputs layout data (FIGS. 15A and 15B).

In step S2304, based on the layout analysis data, document image comprehension data is generated from the multivalued image, representing the inputted original document image, and binary image, while adaptively changing the storage condition, and the generated data is stored in the document image comprehension data storage (4108 in FIG. 32). At this step, character recognition processing and translation processing are also performed on the data of a predetermined specific area.

The ninth embodiment describes an example of performing character recognition and translation processing (Japanese into English) on image data of the "text" area.

An example of document image comprehension data storage processing is described with reference to the flowchart in FIG. 33, and FIGS. 40, 15 and 16.

Figure 33:
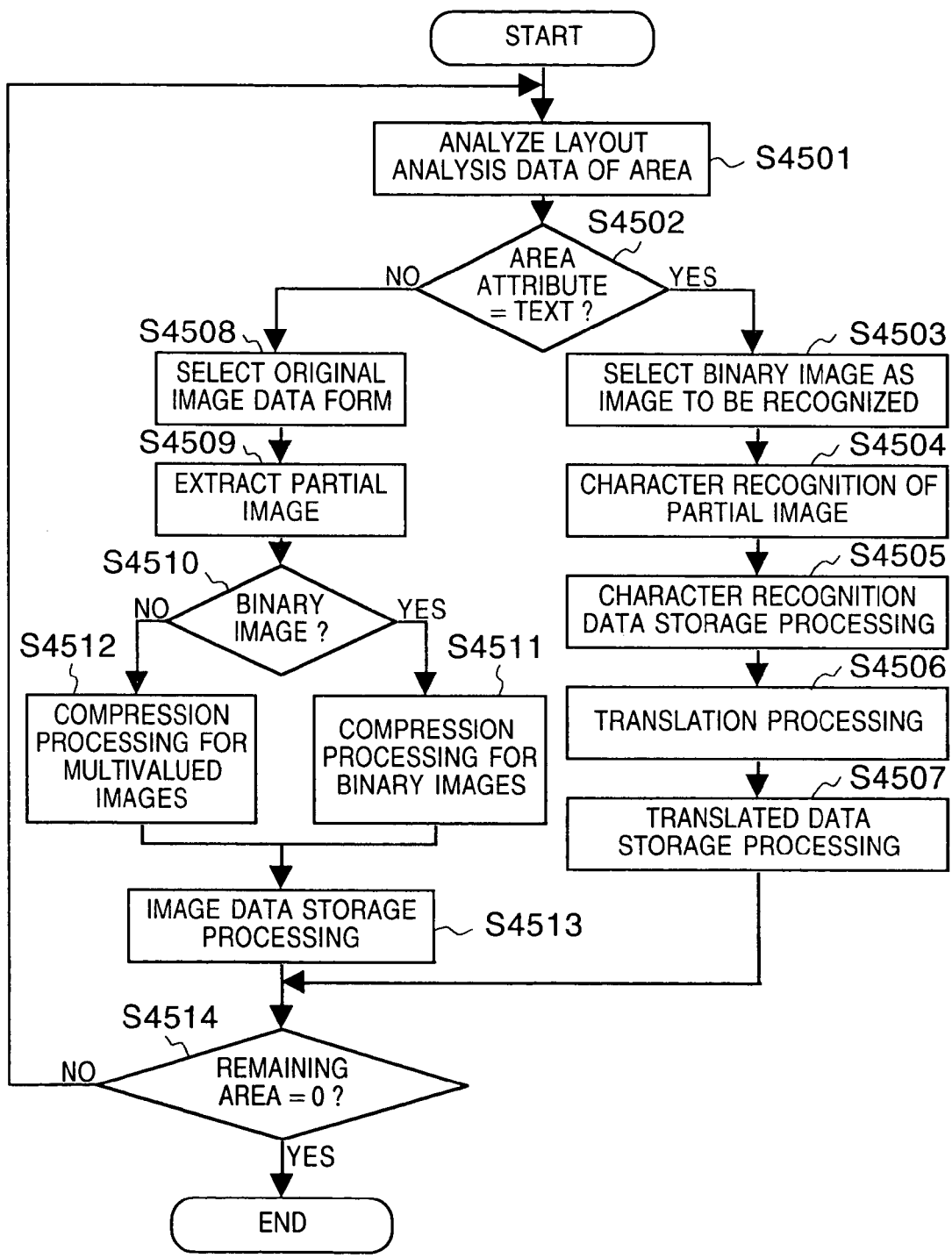
FIG. 33 is a flowchart showing document image comprehension data storage processing according to the ninth embodiment.

According to the ninth embodiment, when the document image comprehension data storage processing (step S2304 in FIG. 19) is started, the layout analysis data of each area is analyzed to categorize the area attribute in step S4501 In FIG. 33.

In step S4502, if the area attribute is "texts", a binary image is selected in step S4503 as the image to be recognized. In step S4504, character recognition processing of the partial image is performed by using coordinate data of the area represented by the layout analysis data.

The character recognition data, obtained by the character recognition processing, is stored as document image comprehension data (FIGS. 16A to 16C) in step S4505.

Figure 41:
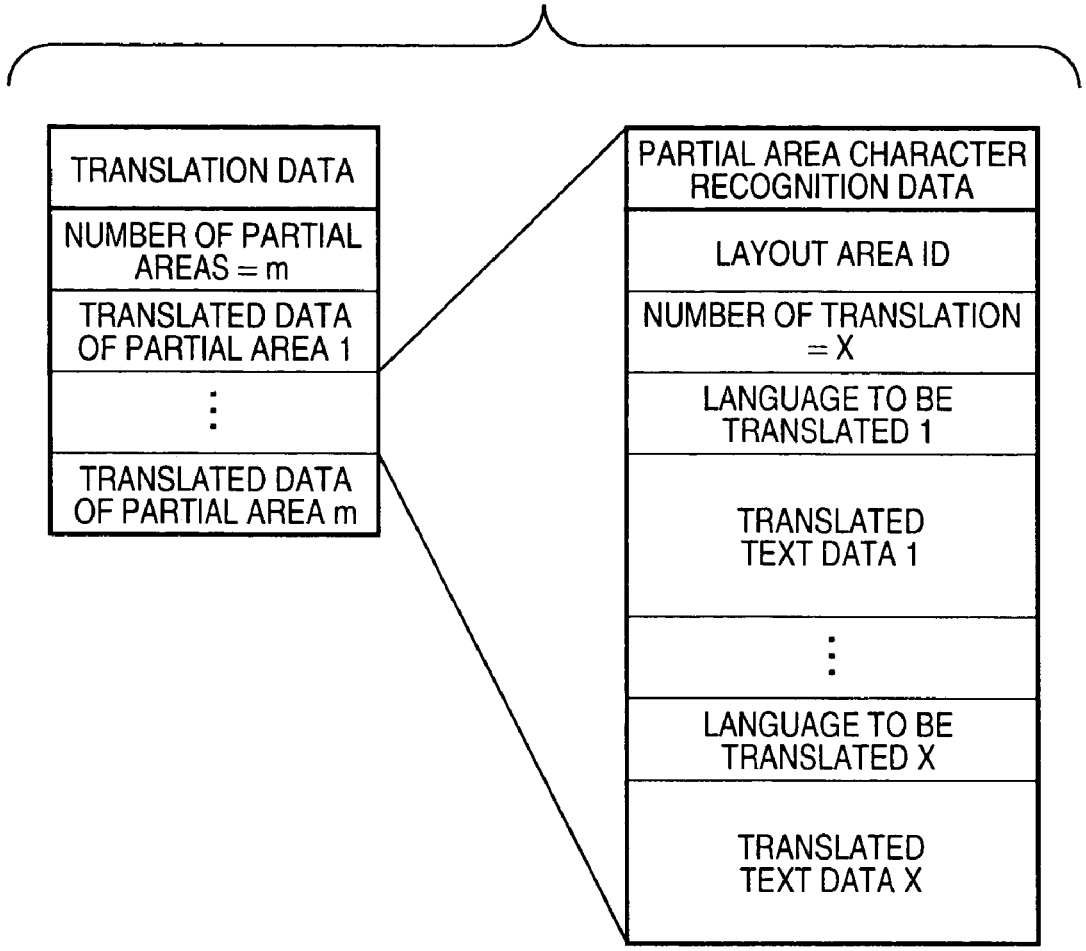
FIG. 41 shows a data structure of translated data according to the ninth embodiment.

In step S4506, translation processing is performed on the character recognition data, obtained as a result of character recognition, and translated data is generated. In step S4507, the translated data is also stored as document image comprehension data (FIG. 41).

In step S4502, if the area attribute is not "texts", the original image is selected in step S4508 as the entire image to be extracted, and the partial image is extracted in step S4509 by using coordinate data of the area represented by the layout analysis data.

The type of extracted partial image is determined in step S4510. If it is a binary image type, compression processing for binary images (e.g., MMR or the like) is performed in step S4511. The compressed partial image is stored as document image comprehension data (FIGS. 16A to 16C) in step S4513.

At this step, by embedding information indicative of the compression method in the document image comprehension data, the compressed image can be decompressed in the document image comprehension data reproduction processing.

Meanwhile, if the extracted partial image is a multivalued image type in step S4510, compression processing for multivalued images (e.g., JPEG or the like) is performed in step S4512. The compressed partial image is stored as document image comprehension data (FIGS. 16A to 16C) in step S4513.

As exemplified in FIGS. 16A to 16C, the document image comprehension data for an area includes partial image data comprising: an ID uniquely assigned to the area, the width of the extracted area, height of the extracted area, type of image, compression method employed, image size, and compressed extracted image. Herein, the assigned ID corresponds to the sequence of area extraction performed by the layout analyzing unit.

In step S4514, it is determined whether or not there is a remaining area to be processed. If there is a remaining area, the control returns to step S4501 for repeating the above-described processing with respect to the remaining area. If there is no remaining area, the document image comprehension data storage processing ends. Then, the document image comprehension data is outputted in step S2305 in FIG. 19.

According to the ninth embodiment, the document image comprehension data, generated and stored by the document image comprehension data storage (4108), is outputted to a network and transmitted to users through the network by the document image comprehension data output unit (4109).

In the user side (clients), as described in the first embodiment, processing is performed according to the flowchart shown in FIG. 4.

More specifically, the document image comprehension data is inputted by the document image comprehension data input unit (4111) in step S401, and the document image is reproduced in step S402 from the document image comprehension data while adaptively changing a reproduction condition.

The document image comprehension data reproduction processing (step S402) according to the ninth embodiment is described with reference to FIGS. 34 and 10.

The ninth embodiment describes an example where document image comprehension data includes translated data of a predetermined language, and where the translated data is automatically extracted and reproduced.

Figure 34:
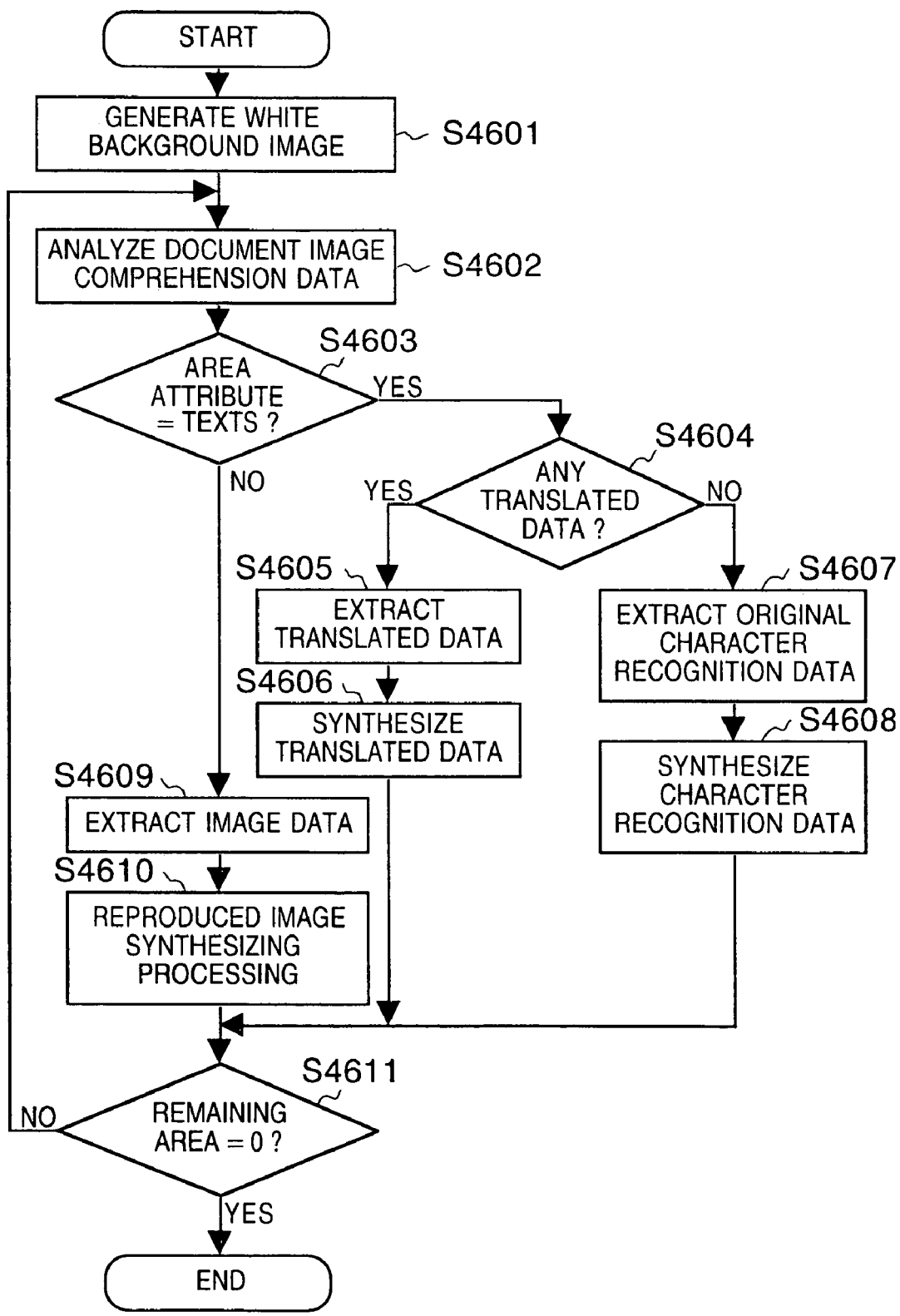
FIG. 34 is a flowchart showing document image comprehension data reproduction processing according to the ninth embodiment.

In step S4601 in FIG. 34, a white background image is generated to be used as a background of the reproduced document image.

In step S4602, document image comprehension data is analyzed. In step S4603, if the attribute of the partial area is "texts", it is determined in step S4604 whether or not document image comprehension data includes translated data.

If translated data is found in step S4604, the translated data is extracted from the document image comprehension data in step S4605. Then in step S4606, a font pattern corresponding to a character code constituting the translated sentence is synthesized with the white background image, reproducing the image.

If translated data is not found in step S4604, character recognition data of the original text is extracted from the document image comprehension data in step S4607.

In step S4608, the extracted original text is synthesized with the white background image, generating a reproduced image.

In step S4603, in a case where the attribute of the partial area is not "texts", image data is extracted from the document image comprehension data in step S4609. Then in step S4610, based on the extracted partial image and coordinate data thereof, the partial image is synthesized with the white background image, reproducing the image.

The reproduction image synthesizing processing (step S4610) is performed according to the flowchart in FIG. 10, which is described in the first embodiment. More specifically, the type of partial image is extracted from the document image comprehension data in step S1001. If it is determined in step S1002 that the type of image is the "binary image type", pseudo 24-bit conversion is performed in step S1003 by respectively converting black and white pixels of the binary image to black and white pixels of a 24-bit multivalued image.

In the ninth embodiment, assume that a black pixel of the binary image is expressed by 1, and a white pixel of the binary image is expressed by 0. A black pixel of the 24-bit multivalued image is expressed by R=0, G=0, B=0, and a white pixel of the 24-bit multivalued image is expressed by R=255, G=255, B=255 (R: red component; G: green component; B: blue component, each having 8-bit value).

In step S1002, if it is determined that the type of image is the "24-bit multivalued image type", the partial image without being processed is used for synthesizing processing.

In step S1004, logical operation is performed on each pixel of the partial image with respect to the background image and partial image so as to generate a synthesized image.

When the reproduction image synthesizing processing (step S4606, S4608, S4610) for one partial image is completed in the foregoing manner, whether or not there is a remaining partial area is determined in step S4611. If there is a remaining area, the control returns to step S4602 for repeating the above-described processing with respect to the remaining area, whereas if there is no remaining area, the document image comprehension data reproduction processing ends.

Then, the reproduced image is outputted as an output document in step S403 in FIG. 4 by a monochrome printer serving as the image output unit (4114).

Tenth Embodiment

According to the tenth embodiment, an operator can confirm an inputted image and layout analysis results, and as a result of analyzing them, the operator can designate translation of a desired area by specifying the area.

A specific example is described with reference to FIGS. 19 (described in the fifth embodiment), 35 and 36.

Figure 35:
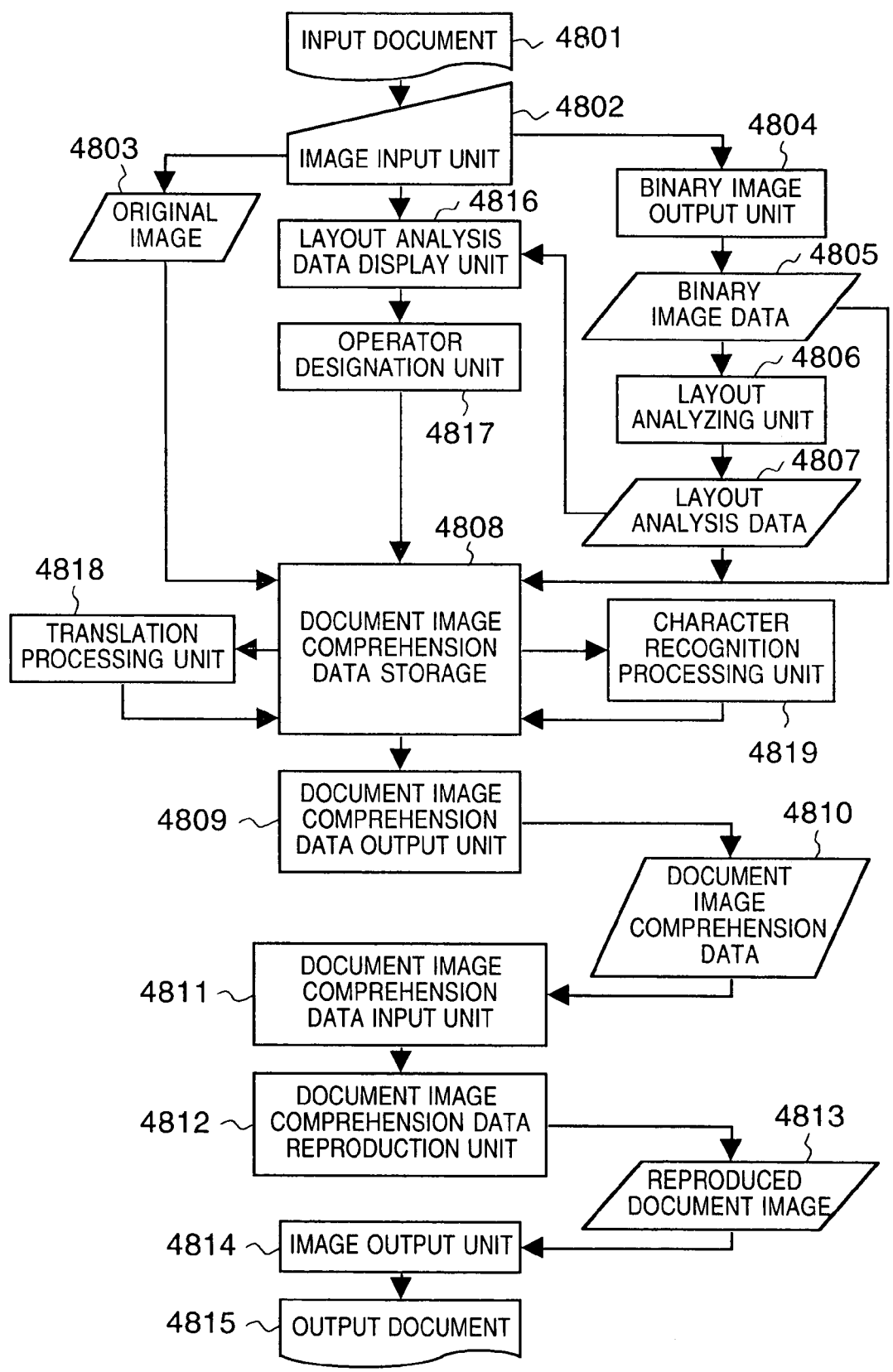
FIG. 35 is a block diagram showing data flow according to a tenth embodiment of the present invention.

In step S2301 in FIG. 19, a document image is inputted as multivalued image data by a scanner serving as the image input unit (4802 in FIG. 35).

In step S2302, a binary image is generated by the binary image output unit (4804 in FIG. 35). Based on the generated binary image, in step S2303, the layout analyzing unit (4806 in FIG. 35) divides the document image into various attribute areas, such as drawings, texts, charts or the like, and outputs layout data (FIGS. 15A and 15B).

Figure 38:
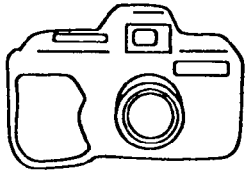
FIG. 38 shows an example of graphic user interface (GUI) according to the tenth embodiment.

The layout data is superimposed with the inputted image and displayed by the layout analysis data display unit (4816 in FIG. 35). By this, an operator is able to designate an area to be translated from an operator designation unit (4817 in FIG. 35) with a pointing device or the like. FIG. 38 shows an operation screen for designating an area to be translated. In FIG. 38, the upper part of the second column is set as an area subjected to translation (translation area designation is "ON").

In step S2304, based on the layout analysis data and operator's designation, document image comprehension data is generated from the multivalued image, representing the inputted original document image, and binary image, while adaptively changing the storage condition, and the generated data is stored in the document image comprehension data storage (4808 in FIG. 35).

An example of document image comprehension data storage processing is described with reference to the flowchart in FIG. 36, and FIGS. 40, 15 and 16.

Figure 36:
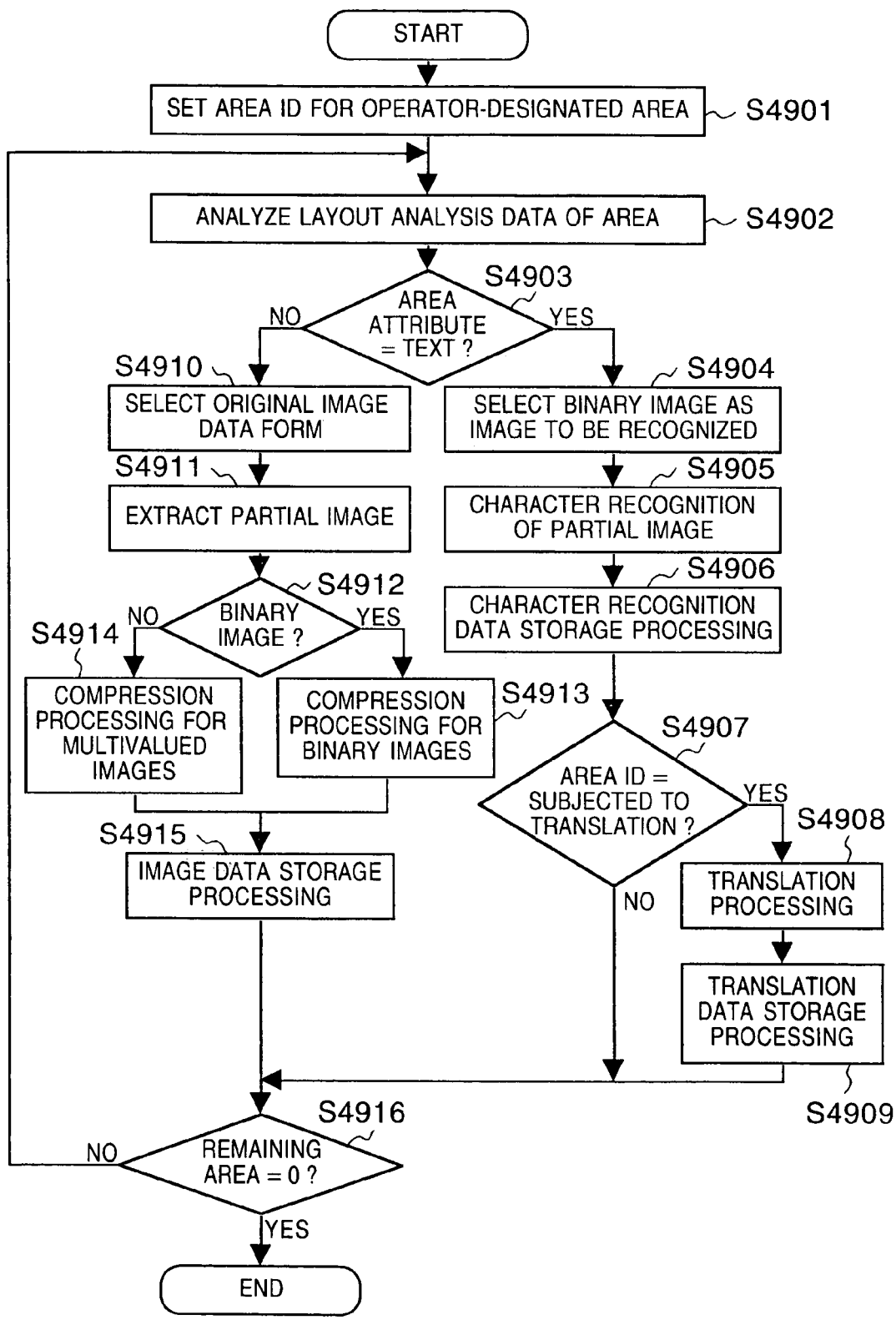
FIG. 36 is a flowchart showing document image comprehension data storage processing according to an eleventh embodiment of the present invention.

According to the tenth embodiment, when the document image comprehension data storage processing (step S2304) is started, an area ID of the area, designated by an operator, is set in step S4901 in FIG. 36.

In step S4902, the layout analysis data of each area is analyzed to categorize the area attribute. In step S4903, if the area attribute is "texts", a binary image is selected in step S4904 as the image to be recognized. In step S4905, character recognition processing is performed on the partial image by using coordinate data of the area represented by the layout analysis data. In step S4906, the character recognition data is stored as document image comprehension data. Note with regard to images not including texts, e.g., photograph images or the like, it is so set that translation is not performed. Thus, problems do not arise in such areas.

In step S4907, the area ID of the partial area is inspected to determine whether or not the area is subjected to translation.

If the area is not a translation-subjected area, character recognition data of the original text is stored, and the processing for this area ends.

If the area is a translation-subjected area, translation processing is performed in step S4908. In step S4909, the translated data is stored as document image comprehension data.

Meanwhile in step S4903, if the area attribute is not a translation-subjected category, i.e., if texts are not included, the original image is selected in step S4910 as the entire image to be extracted, and the partial image is extracted in step S4911 by using coordinate data of the area represented by the layout analysis data.

In step S4912, the type of extracted partial image is determined. If it is a binary image type, compression processing for binary images (e.g., MMR or the like) is performed in step S4913. The compressed partial image is stored as document image comprehension data (FIGS. 16A to 16C) in step S4915.

At this step, by embedding information indicative of the compression method in the document image comprehension data, the compressed image can be decompressed in the document image comprehension data reproduction processing.

Meanwhile, if the extracted partial image is a multivalued image type in step S4912, compression processing for multivalued images (e.g., JPEG or the like) is performed in step S4914. The compressed partial image is stored as document image comprehension data (FIGS. 16A to 16C) in step S4915.

As exemplified in FIGS. 16A to 16C, the document image comprehension data for an area includes partial image data comprising: an ID uniquely assigned to the area, the width of the extracted area, height of the extracted area, type of image, compression method employed, image size, and compressed extracted image. Herein, the assigned ID corresponds to the sequence of area extraction performed by the layout analyzing unit.

In step S4916, it is determined whether or not there is a remaining area to be processed. If there is a remaining area, the control returns to step S4902 for repeating the above-described processing with respect to the remaining area.

If there is no remaining area, the document image comprehension data storage processing ends. Then, the document image comprehension data is outputted in step S2305 in FIG. 19.

Eleventh Embodiment

According to the eleventh embodiment, which can be a variation of previous embodiments, such as the eighth and ninth embodiments, translation means for a plurality of languages can be provided so that character recognition data of an original document can include translation data in plural languages.

Twelfth Embodiment

According to the twelfth embodiment, language to be translated can be selected by an operator from a plurality of languages.

A specific example is described with reference to FIGS. 19, 35 and 37.

In step S2301 in FIG. 19, a document image is inputted as multivalued image data by a scanner serving as the image input unit (4802 in FIG. 35).

Next, a language to be translated is designated from the operator designation unit (4817 in FIG. 35).

Assume herein that the operator designates "Japanese" as the language to be translated from an original English-text document. Although one language is designated in this embodiment, a plurality of languages may be designated.

In step S2302, a binary image is generated by the binary image output unit (4804 in FIG. 35). Based on the generated binary image, in step S2303, the layout analyzing unit (4806 in FIG. 35) divides the document image into various attribute areas, such as drawings, texts, charts or the like, and outputs layout data (FIGS. 15A and 15B).

In step S2304, based on the layout analysis data and operator's designation, document image comprehension data is generated from the multivalued image, representing the inputted original document image, and binary image, while adaptively changing the storage condition, and the generated data is stored in the document image comprehension data storage (4808 in FIG. 35).

Figure 39:
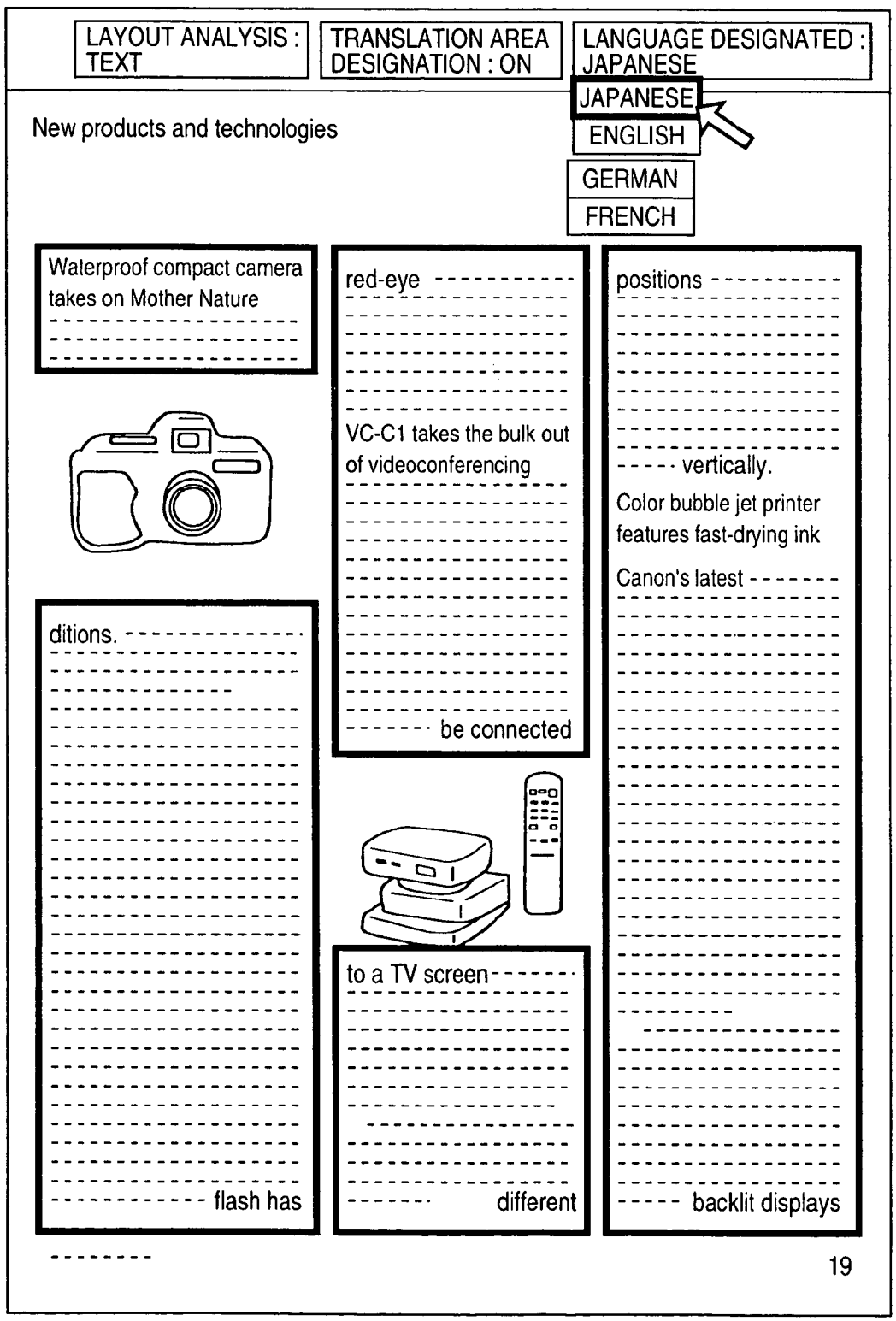
FIG. 39 shows an example of graphic user interface (GUI) according to the eleventh embodiment.
Figure 40:
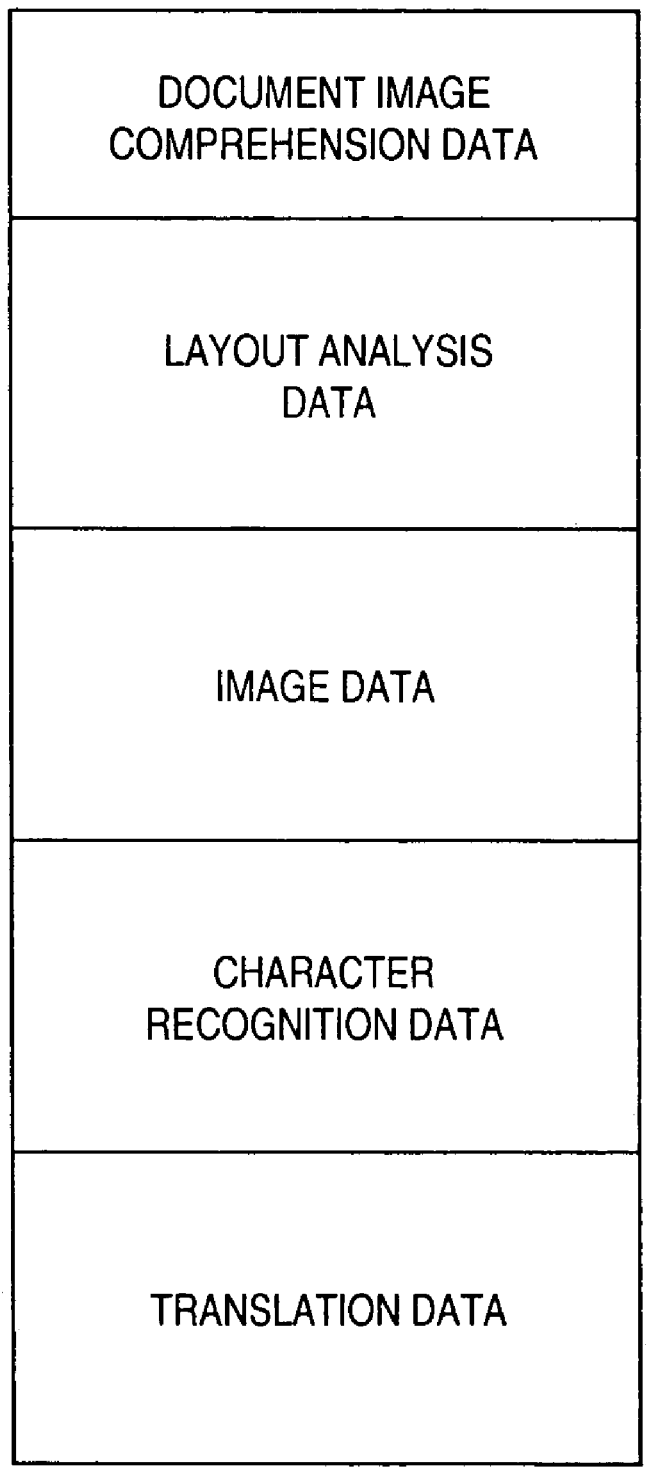
FIG. 40 shows a data structure of document image comprehension data according to the ninth embodiment.

The operator's designation herein is made by selecting a language to be translated from a display screen shown in FIG. 39, which shows contents of the layout analysis. In the twelfth embodiment, although the area subjected to translation is a text area, other areas including characters, e.g., charts or the like, may be subjected to translation.

An example of document image comprehension data storage processing is described with reference to the flowchart in FIG. 37, and FIGS. 40, 15 to 17, and 41.

Figure 37:
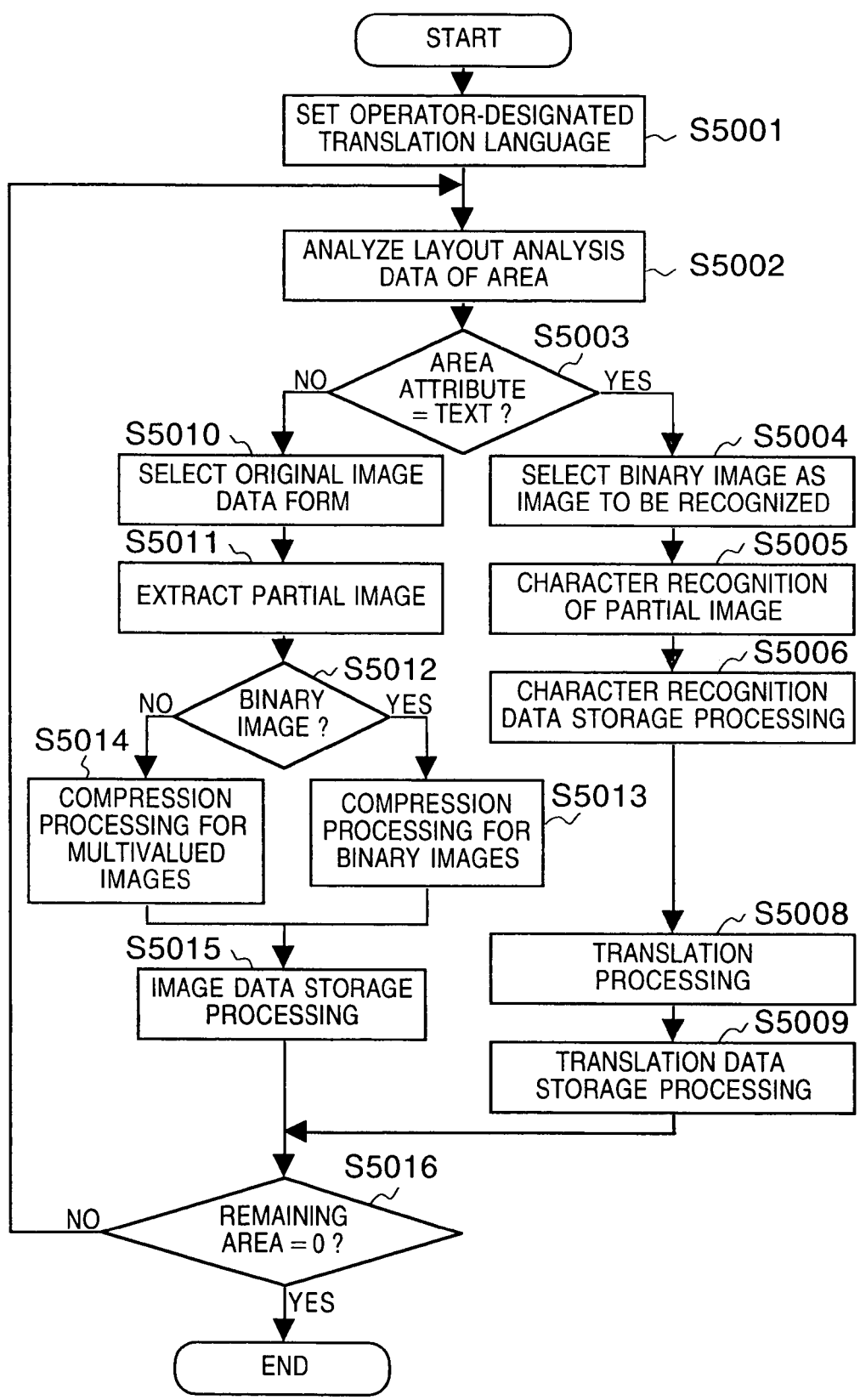
FIG. 37 is a flowchart showing document image comprehension data storage processing according to the eleventh embodiment.

According to the twelfth embodiment, when the document image comprehension data storage processing (step S2304) is started, the translation language designated by an operator is set in step S5001 in FIG. 37 to prepare for the translation processing.

In step S5002, the layout analysis data of each area is analyzed to categorize the area attribute.

In step S5003, it is determined if the area attribute is "texts". If so, in step S5004, a binary image is selected as the image to be recognized. In step S5005, character recognition processing of the partial image is performed by using coordinate data of the area represented by the layout analysis data. In step S5006, the character recognition data is stored as document image comprehension data. In step S5008, translation processing is performed. Then in step S5009, the translated result is stored (FIG. 41).

Meanwhile in step S5003, if the area attribute is not "texts", the original image is selected in step S5010 as the entire image to be extracted, and the partial image is extracted in step S5011 by using coordinate data of the area represented by the layout analysis data.

In step S5012, the type of extracted partial image is determined. If it is a binary image type, compression processing for binary images (e.g., MMR or the like) is performed in step S5013. The compressed partial image is stored as document image comprehension data (FIGS. 16A to 16C) in step S5015.

At this step, by embedding information indicative of the compression method in the document image comprehension data, the compressed image can be decompressed in the document image comprehension data reproduction processing.

Meanwhile, if the extracted partial image is a multivalued image type in step S5012, compression processing for multivalued images (e.g., JPEG or the like) is performed in step S5014. The compressed partial image is stored as document image comprehension data (FIGS. 16A to 16C) in step S5015.

As exemplified in FIGS. 16A 16C, the document image comprehension (non-text image) according to the twelfth embodiment includes partial image data comprising: an ID uniquely assigned to the area, the width of the extracted area, height of the extracted area, type of image, compression method employed, image size, and compressed extracted image. Herein, the assigned ID corresponds to the sequence of area extraction performed by the layout analyzing unit.

In step S5016, it is determined whether or not there is a remaining area to be processed. If there is a remaining area, the control returns to step S5002 for repeating the above-described processing with respect to the remaining area. If there is no remaining area, the document image comprehension data storage processing ends. Then, the document image comprehension data is outputted in step S2305 in FIG. 19.

As has been set forth above, according to the ninth to twelfth embodiments, the following effects are attained:

(1) The amount of data is reduced when a document image is stored;

(2) The load imposed on network traffic is reduced when a document image is transmitted;

(3) High quality of a document image suitable for reuse can be maintained when storing or transmitting the document image;

(4) Image quality deterioration or data omission can be prevented when outputting a document image;

(5) Electronic use of the document, such as desktop publishing (DTP), is facilitated; and (6) Improved convenience in worldwide transmission of document images.

Note that although FIG. 2 shows data transmission/reception through a network, the Internet may be used as the network. The form of network does not limit the present invention.

Also note that the above-described embodiments can be roughly categorized into first to fourth embodiments, fifth to eighth embodiments, and ninth to twelfth embodiments. However, each of these embodiments can be combined in any ways.

As has been set forth above, according to the above embodiments, the amount of data of an original document can be reduced while maintaining the layout of the original document, and image quality deterioration can be prevented at the time of reproducing a document image.

Furthermore, improved security is achieved when transmitting document images.

Still further, natural language discrepancies in the texts of an image can be accommodated. Therefore, information can be shared on a worldwide basis.

Thirteenth Embodiment

Figure 42:
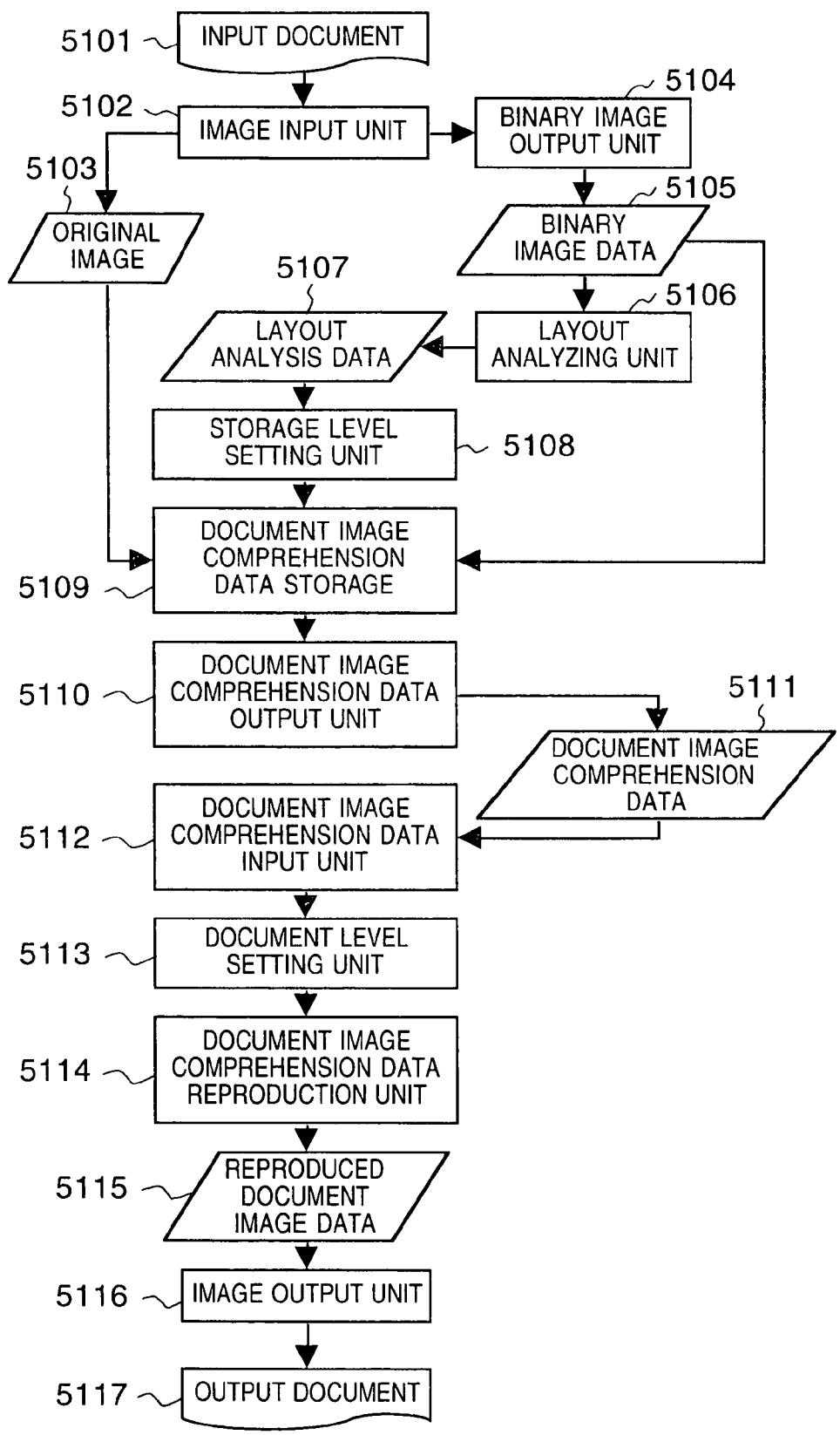
FIG. 42 is a block diagram showing a functional configuration of an image processing system according to a thirteenth embodiment of the present invention.

FIG. 42 is a block diagram showing a functional configuration of an image processing system according to the thirteenth embodiment of the present invention.

In FIG. 42, reference numeral 5101 denotes an input original document including printing materials or image data processed by a computer; 5102, an image input unit including, e.g., image scanner or the like, for reading the original document 5101 and inputting the data as image signals; 5103, original image data inputted from the image input unit 5102; 5104, a binary image output unit for generating binary image data 5105 from the image signals of the inputted document 5101; and 5106, a layout analyzing unit for generating and outputting layout analysis data 5107, obtained by dividing the inputted document image into areas having various attributes, such as drawings, texts, charts or the like, based on the binary image data 5105. Reference numeral 5108 denotes a storage level setting unit for analyzing and comprehending the inputted document image, and setting a storage level serving as a parameter to obtain document image comprehension data 5111; 5109, a document image comprehension data storage for storing document image comprehension data generated from the inputted original image data 5103 and binary image data 5105 while adaptively changing the storage condition; 5110, a document image comprehension data output unit for outputting document image comprehension data 5111 by reading the data stored in the document image comprehension data storage 5109; and 5112, a document image comprehension data input unit for inputting the document image comprehension data 5111 which is outputted from the document image comprehension data output unit 5110. The document image comprehension data output unit 5110 and document image comprehension data input unit 5112 may be connected through a network 5212 which will be described later. Reference numeral 5113 denotes a reproduction level setting unit for setting a parameter to reproduce the original document image based on the document image comprehension data 5111; 5114, a document image comprehension data reproduction unit for generating a reproduced document image from the document image comprehension data 5111 while adaptively changing the reproduction condition; 5115, reproduced document image data; 5116, an image output unit for outputting the reproduced document image 5115; and 5117, an output document.

The construction of an image processing system according to the thirteenth embodiment is the same as that shown in FIG. 2. Thus, detailed description thereof is omitted herein.

Next, the processing flow of the image processing system according to the thirteenth embodiment is described.

Figure 43:
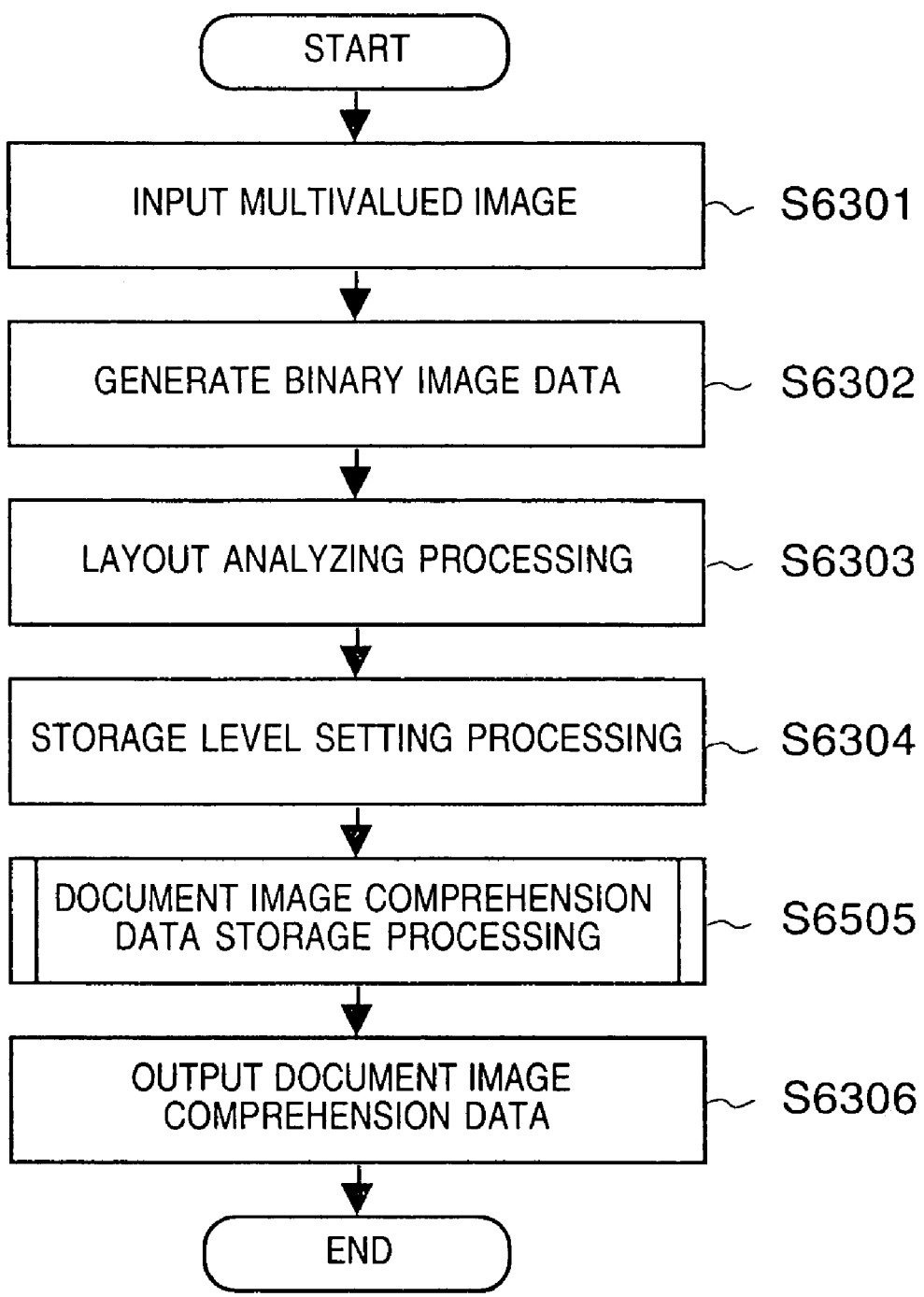
FIG. 43 is a flowchart showing the processing steps from inputting an image to outputting document image comprehension data by the image processing system according to the thirteenth embodiment.

FIG. 43 is a flowchart showing the processing steps of the image processing system according to the thirteenth embodiment.

The thirteenth embodiment describes the image processing system in which 24-bit multivalued image data is inputted by the scanner 203 or copy machine 206, then transmitted through the network 212, and outputted to the monochrome printer 208 or copy machine 211 or facsimile apparatus 205 at the transmitted destination.

First in step S6301 in FIG. 43, a document image is inputted as multivalued image data by the scanner 203 serving as the image input unit 5102. In step S6302, the multivalued image data is converted to binary image data 5105 by the binary image output unit 5104. In step S6303, based on the generated binary image data 5105, the layout analyzing unit 5106 divides the document image into various attribute areas, such as drawings, texts, charts or the like, and outputs layout data 5107 (FIGS. 15A and 15B).

As shown in FIGS. 15A and 15B, layout analysis data 5107 includes the number of divided areas n, X and Y coordinates, width, height and attribute (texts=1, line drawings=2, pictures and photographs=3, charts=4) of each area.

Next in step S6304, the storage level is set by the storage level setting unit 5108. According to the thirteenth embodiment, an operator can set any of "level 1" to "level 3". The operator's storage-level setting is performed by an input operation from a keyboard or touch panel of the terminal in the system shown in FIG. 2. The storage level, once set, may be stored until the next time the storage level is changed, and may repeatedly be used for different input images. In step S6305, based on the layout analysis data 5107 and set storage level, document image comprehension data 5111 is generated from the multivalued image data 5103 representing the inputted original document image and binary image data 5105, while adaptively changing the storage condition, and the generated data is stored in the document image comprehension data storage 5109. In step S6306, the document image comprehension data 5111 is outputted. At this step, a tag indicative of the storage level, set in step S6304 and processed in step S6305, is attached to the document image comprehension data 5111.

Hereinafter, each of the above-described processing is described in detail.

FIGS. 44 to 47 are flowcharts showing document image comprehension data storage processing in step S6305 in FIG. 43, executed in accordance with the set storage level.

Figure 44:
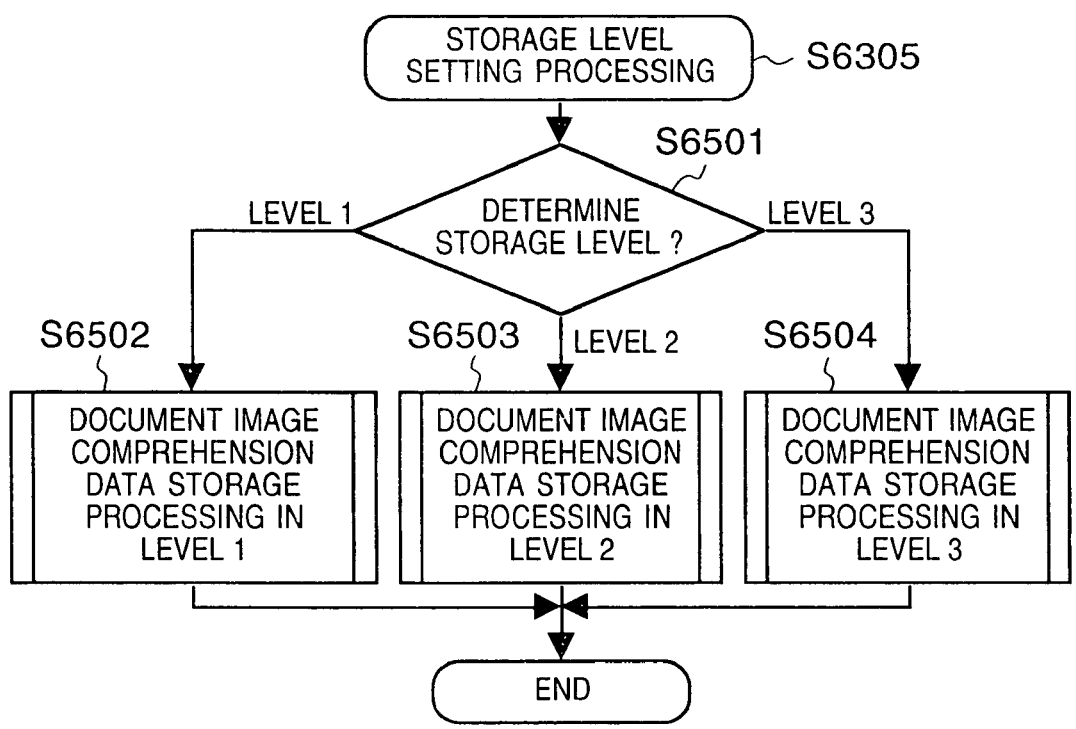
FIG. 44 is a flowchart showing document image comprehension data storage processing according to the thirteenth embodiment.

Referring to FIG. 44, the storage level set in step S6304 is determined in step S6501, and document image comprehension data storage processing according to respective storage levels are performed (step S6502, S6503, S6504).

Figure 45:
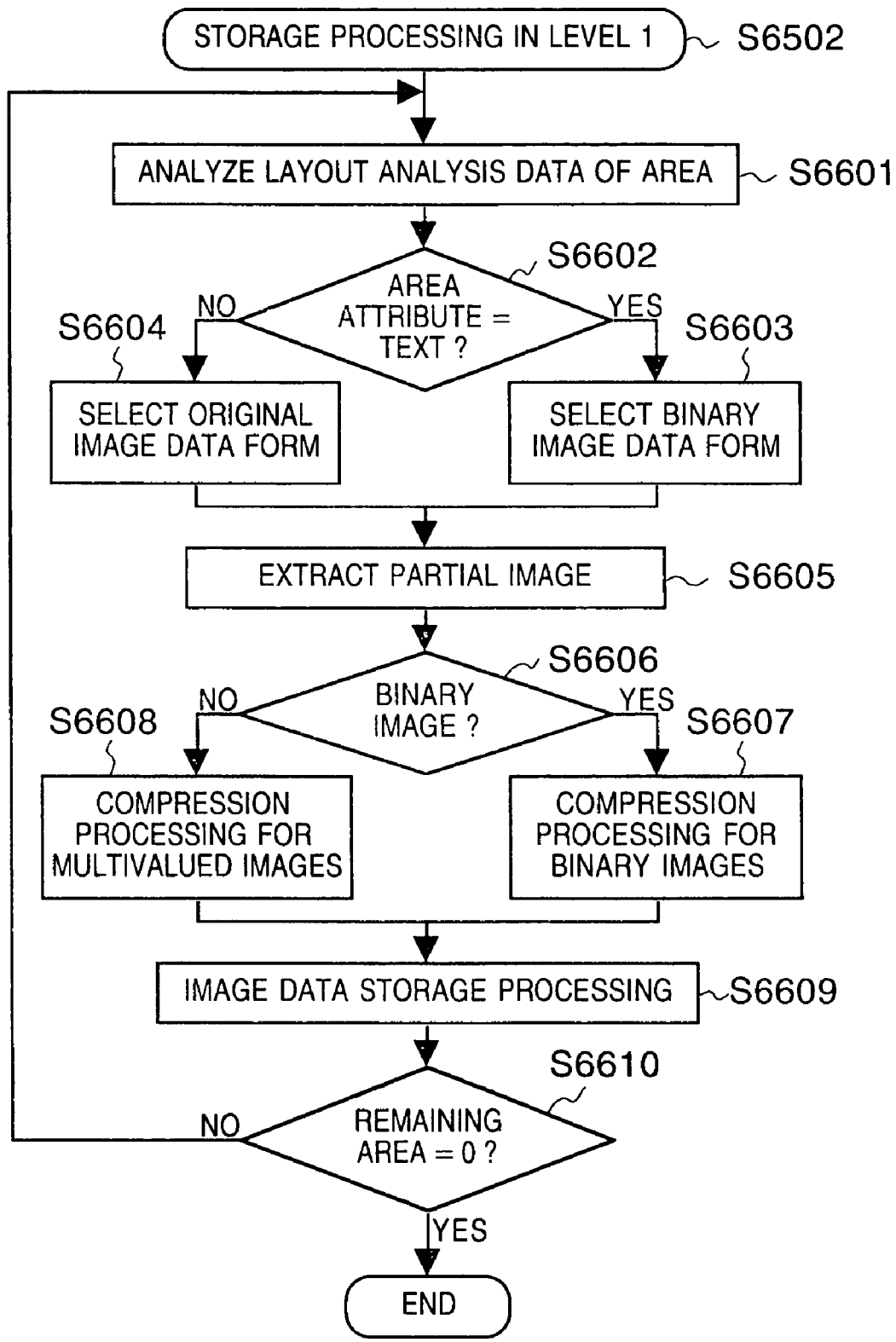
FIG. 45 is a flowchart showing document image comprehension data storage processing in the storage level 1 according to the thirteenth embodiment.

When the determined storage level is "level 1", the processing shown in the flowchart in FIG. 45 is executed in step S6502.

In step S6601 in FIG. 45, the layout analysis data of each area is analyzed to obtain the area attribute. In step S6602, if the area attribute is "texts", a binary image is selected in step S6603 to be extracted. Then in step S6605, the partial image is extracted by using coordinate data (X, Y), width, and height of the area represented by the layout analysis data 5107.

If the area attribute is not "texts" in step S6602, a multivalued image which is the original image data 5103 is selected in step S6604. Then in step S6605, the partial image is extracted by using coordinate data, width, and height of the area represented by the layout analysis data 5107.

In step S6606, the type of extracted partial image is determined. If it is a binary image type, compression processing for binary images (e.g., MMR or the like) is performed in step S6607. The compressed partial image is stored as document image comprehension data 5111 (FIG. 48) in step S6609. At this step, by embedding information indicative of the compression method in the document image comprehension data 5111, the compressed image can be decompressed by the document image comprehension data reproduction unit 5114.

Meanwhile, if the extracted partial image is a multivalued image type in step S6606, compression processing for multivalued images (e.g., JPEG or the like) is performed in step S6608. The compressed partial image is stored as document image comprehension data (FIG. 48) in step S6609.

Figure 48:
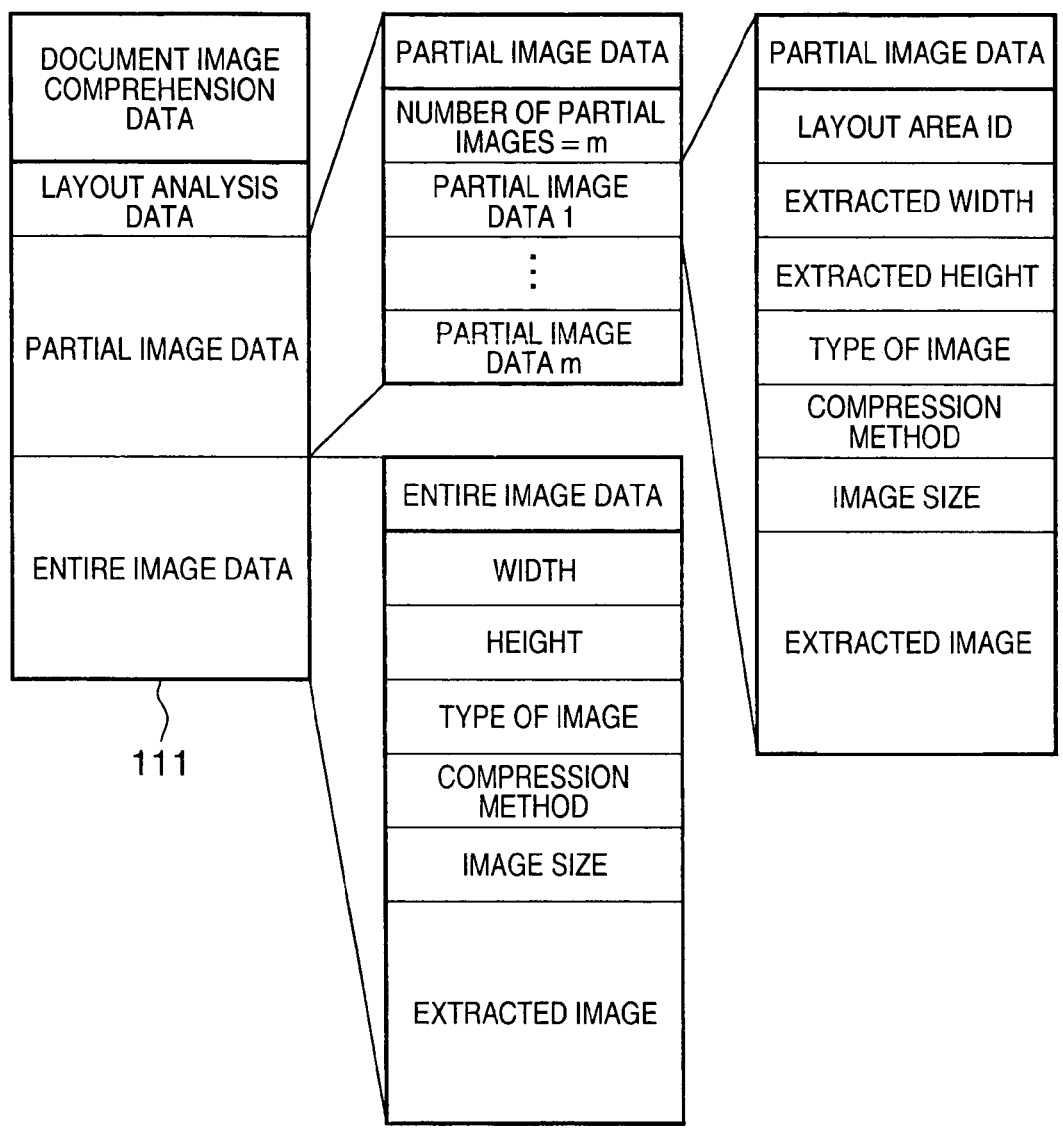
FIG. 48 shows a data structure of document image comprehension data according to the thirteenth embodiment.

FIG. 48 shows a data structure of the document image comprehension data 5111 according to the thirteenth embodiment.

As exemplified in FIG. 48, partial image data comprises: an ID uniquely assigned to the area, the width of the extracted area, height of the extracted area, type of image, compression method employed, image size, and compressed extracted image. Herein, the assigned ID corresponds to the sequence of area extraction performed by the layout analyzing unit.

FIG. 49A is a table showing identification numbers for the type of image, and FIG. 49B is a table showing identification numbers for compression methods.

Referring back to FIG. 45, the control proceeds to step S6610 for determining whether or not there is a remaining area to be processed. If there is a remaining area, the control returns to step S6601 for repeating the above-described processing with respect to the remaining area, whereas if there is no remaining area in step S6610, the document image comprehension data storage processing ends.

Figure 46:
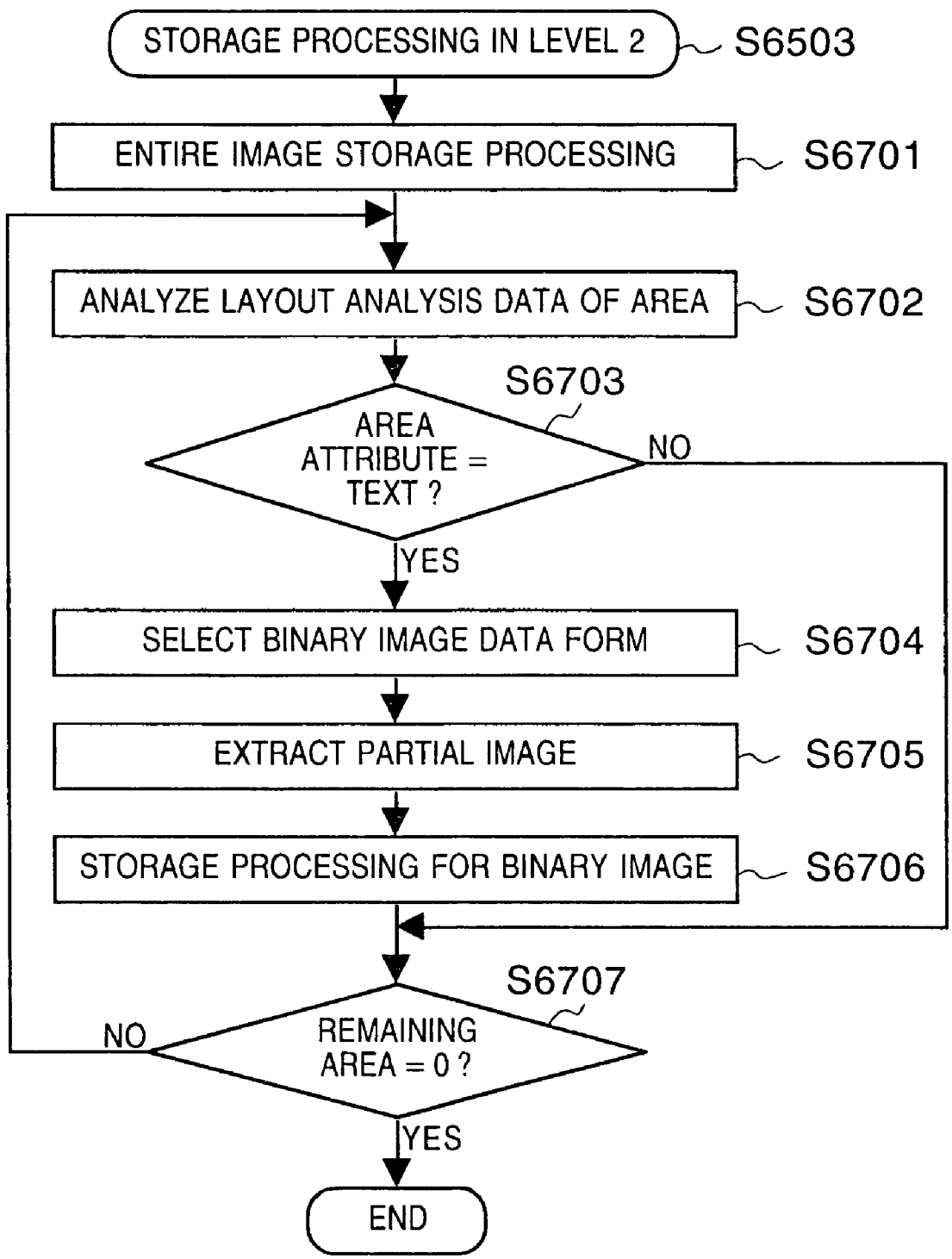
FIG. 46 is a flowchart showing document image comprehension data storage processing in the storage level 2 according to the thirteenth embodiment.

When the storage level determined in step S6501 in FIG. 44 is "level 2", storage processing according to the flowchart in FIG. 46 is performed.

In step S6701, the entire image is stored as image data. At this step, according to the thirteenth embodiment, since the entire image inputted in step S6301 is multivalued image data, the data is stored with a compression method for multivalued images (e.g., JPEG or the like). A specific example of document image comprehension data in the case of the entire image data is shown in FIG. 48. More specifically, the entire image data includes: the width, height, type of image, compression method, image size, and compressed image.

In step S6702, the layout analysis data 5107 of each area is analyzed to obtain the area attribute. In step S6703, if the area attribute is "texts", the binary image 5105 is selected in step S6704 as an entire image to be extracted. Then in step S6705, the partial image is extracted by using coordinate data, width, and height of the area represented by the layout analysis data 5107. In step S6706, compression processing for binary images (e.g., MMR or the like) is performed, and the compressed partial image is stored as document image comprehension data 5111 (FIG. 48).

If the area attribute is not "texts" in step S6703, the control proceeds to step S6707 and storage processing of the partial image is not performed with respect to this area. Subsequent to steps S6706 or S6703, the control proceeds to step S6707 for determining whether or not there is a remaining area to be processed. If there is a remaining area, the control returns to step S6702 for repeating the above-described processing with respect to the remaining area, whereas if there is no remaining area, the storage processing of the document image comprehension data 5111 ends.

Figure 47:
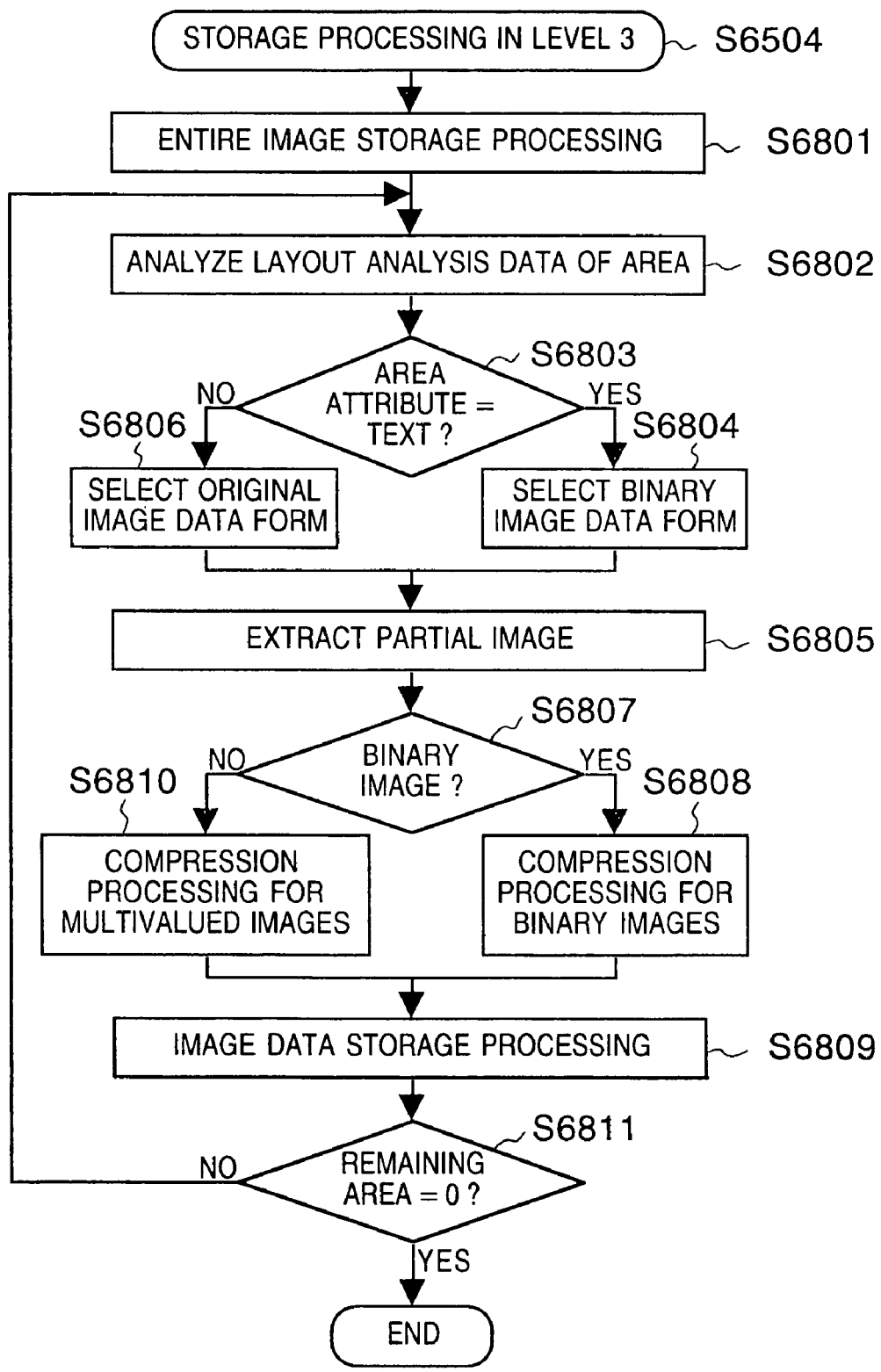
FIG. 47 is a flowchart showing document image comprehension data storage processing in the storage level 3 according to the thirteenth embodiment.

When the storage level determined in step S6501 in FIG. 44 is "level 3", storage processing according to the flowchart in FIG. 47 is performed.

In step S6801 in FIG. 47, the entire image is stored as image data. In step S6802, the layout analysis data 5107 of each area is analyzed to obtain the area attribute. In step S6803, if the area attribute is "texts", the binary image 5105 is selected in step S6804 as the entire image to be extracted. Then in step S6805, the partial image is extracted by using coordinate data, the width, and height of the area represented by the layout analysis data 5107.

If the area attribute is not "texts" in step S6803, a multivalued image which is the original image data 5103 is selected in step S6806 as the entire image to be extracted. Then in step S6805, the partial image is extracted by using the coordinate data, width, and height of the area represented by the layout analysis data 5107.

In step S6807, the type of extracted partial image is determined. If it is a binary image type, compression processing for binary images (e.g., MMR or the like) is performed in step S6808. The compressed partial image is stored as document image comprehension data (FIG. 48) in step S6809. At this step, by embedding information indicative of the compression method in the document image comprehension data, the compressed image can be decompressed in the document image comprehension data reproduction processing.

Meanwhile, if the extracted partial image is a multivalued image type in step S6807, compression processing for multivalued images (e.g., JPEG or the like) is performed in step S6810. The compressed partial image is stored as document image comprehension data (FIG. 48) in step S6809. Then in step S6811, it is determined whether or not there is a remaining area to be processed. If there is a remaining area, the control returns to step S6802 for repeating the above-described processing with respect to the remaining area, whereas if there is no remaining area in step S6811, the document image comprehension data storage processing ends.

Further, according to the thirteenth embodiment, the document image comprehension data 5111, generated and stored by the document image comprehension data storage 5109, is outputted to the network 5212 and transmitted to users through the network 5212.

In the user side that receives the data, a reproduced image is outputted according to the processing shown in the flowchart in FIG. 50.

In step S6401 in FIG. 50, document image comprehension data 5111 is inputted by the document image comprehension data input unit 5112. In step S6402, the reproduction level setting unit 5113 sets the reproduction level of the document image. According to the thirteenth embodiment, an operator can set any of the three parameters, "level 1" to "level 3". The operator's reproduction-level setting is performed by input means, e.g., a keyboard or touch panel or the like, of the terminal in the system shown in FIG. 2 as similar to step S6304. However, in the case of reproduction-level setting, a selectable reproduction level is limited depending on the storage level at which the inputted document image comprehension data is stored. Thus, a selectable reproduction level is determined based on the storage level indicated by the tag attached to the document image comprehension data 5111, and the obtained reproduction level may be displayed on a display screen to be presented to the operator. Then in step S6403, based on the layout analysis data 5107 and reproduction level set in step S6402, the document image comprehension data reproduction unit 5114 generates reproduced document image data 5115 from the document image comprehension data 5111 while adaptively changing a reproduction condition.

Figure 51:
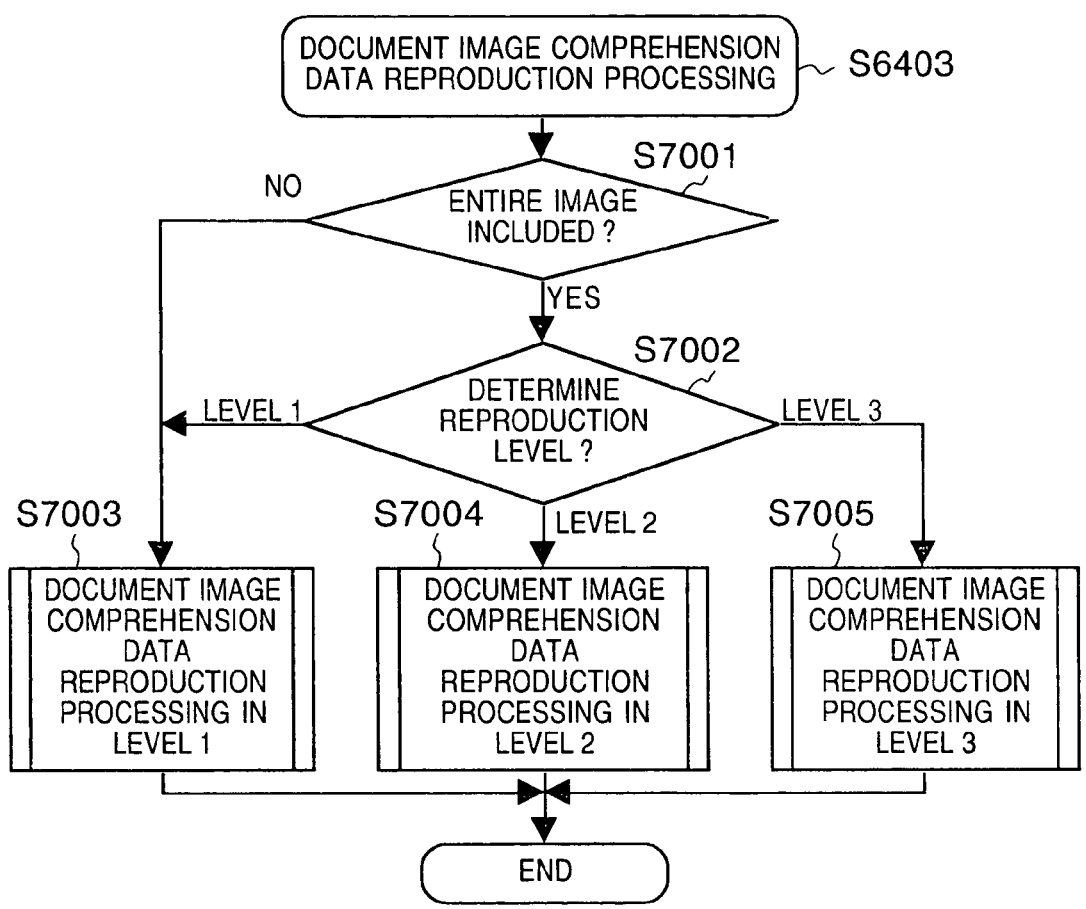
FIG. 51 is a flowchart showing document image comprehension data reproduction processing according to the thirteenth embodiment.

FIG. 51 is a flowchart showing image reproduction processing based on the document image comprehension data 5111, which is performed in step S6403 in FIG. 50.

In step S7001 in FIG. 51, it is determined whether or not the entire image data is included in the document image comprehension data 5111. If the entire image data is not included, the control proceeds to step S7003 where document image comprehension data reproduction processing is forcefully performed in "level 1". If the entire image data is included, the control proceeds to step S7002 where the reproduction level set in step S6402 is determined. Then, the control branches to reproduction processing (S7003 to S7005) of the document image comprehension data according to respective levels.

Figure 52:
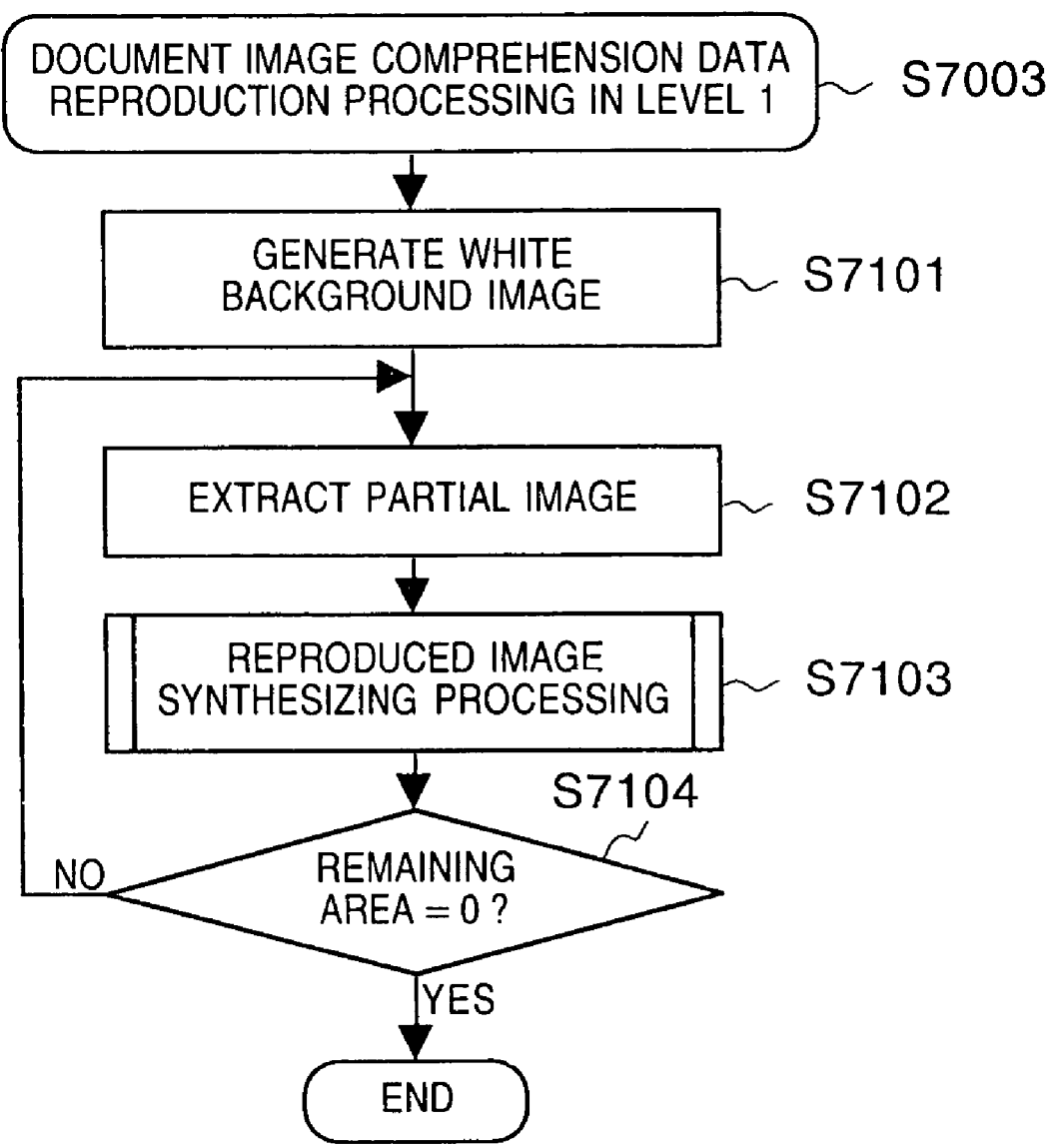
FIG. 52 is a flowchart showing document image comprehension data reproduction processing in the reproduction level 1 according to the thirteenth embodiment.

FIG. 52 is a flowchart showing the reproduction processing (S7003) in level 1.

In step S7101 in FIG. 52, a white background image is generated to be used as a background of the reproduced document image. In step S7102, the partial image data is extracted from the document image comprehension data 5111. Based on the extracted partial image data and coordinate data thereof, in step S7103, the partial image is synthesized with the white background image, thereby reproducing the image.

An example of reproduction image synthesizing processing in step S7103 is described with reference to the flowchart in FIG. 55.

Figure 55:
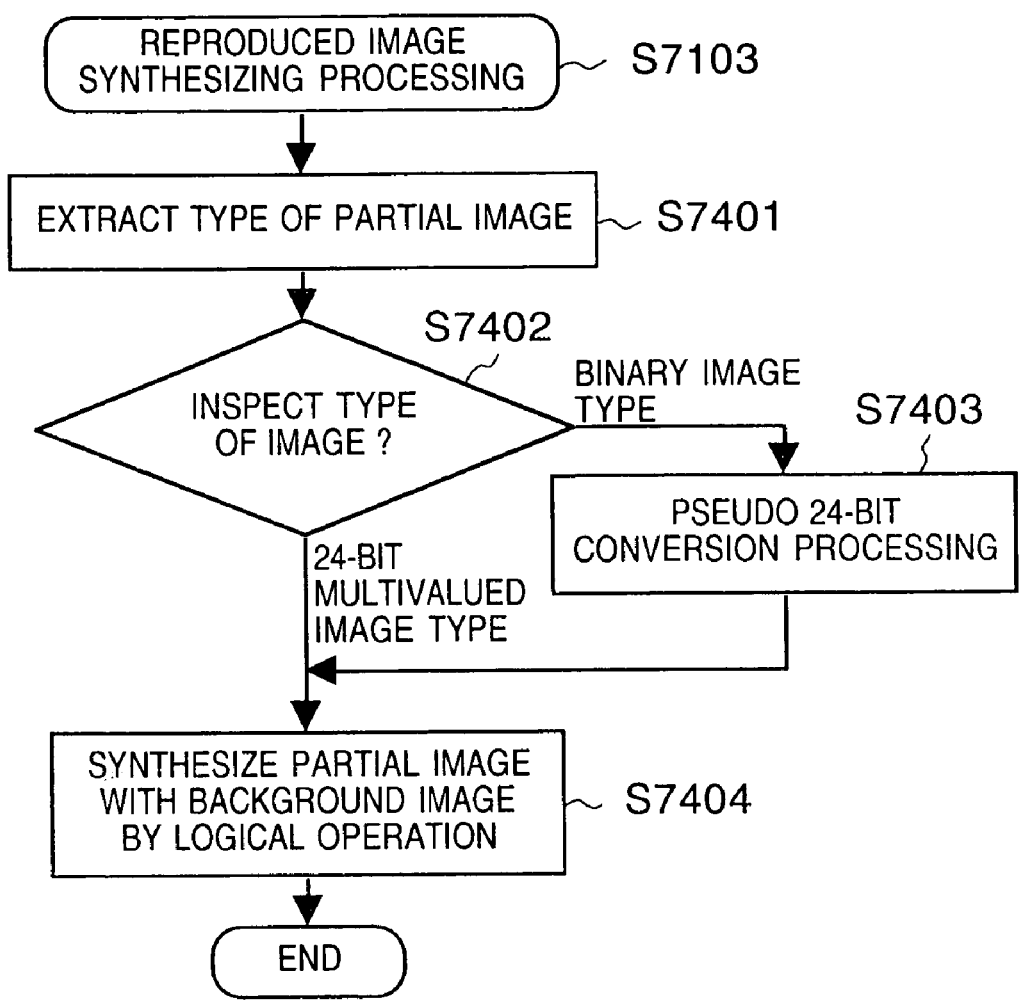
FIG. 55 is a flowchart showing reproduction image synthesizing processing according to the thirteenth embodiment.

In step S7401 in FIG. 55, the type of partial image is extracted from the document image comprehension data 5111. If it is determined in step S7402 that the type of image is the "binary image type", pseudo 24-bit conversion is performed in step S7403 by respectively converting black and white pixels of the binary image to black and white pixels of a 24-bit multivalued image.

In the thirteenth embodiment, assume that a black pixel of the binary image is expressed by 1, and a white pixel of the binary image is expressed by 0. A black pixel of the 24-bit multivalued image is expressed by R=0, G=0, B=0, and a white pixel of the 24-bit multivalued image is expressed by R=255, G=255, B=255 (R: red component; G: green component; B: blue component, each having 8-bit value).

In step S7402, if it is determined that the type of image is the "24-bit multivalued image type", the partial image without being processed is used for synthesizing processing. In step S7404, logical operation is performed on each pixel of the partial image with respect to the background image and partial image so as to generate a synthesized image.

In the thirteenth embodiment, logical operation is performed such that a white pixel (R=255, G=255, B=255) of the background image, which is synthesized with a black pixel of the partial image (R=0, G=0, B=0), forms a black pixel (R=0, G=0, B=0).

When the reproduction image synthesizing processing (step S7103 in FIG. 52) for one partial image is completed in the foregoing manner, whether or not there is a remaining area is determined in step S7104. If there is a remaining area, the control returns to step S7102 for repeating the above-described processing with respect to the remaining area, whereas if there is no remaining area, the document image comprehension data reproduction processing ends.

Referring back to FIG. 50, after reproduction processing is performed in the above-described manner, the reproduced image is outputted in step S6404 by the monochrome printer 208, 211 or the like serving as the image output unit 5116.

Figure 53:
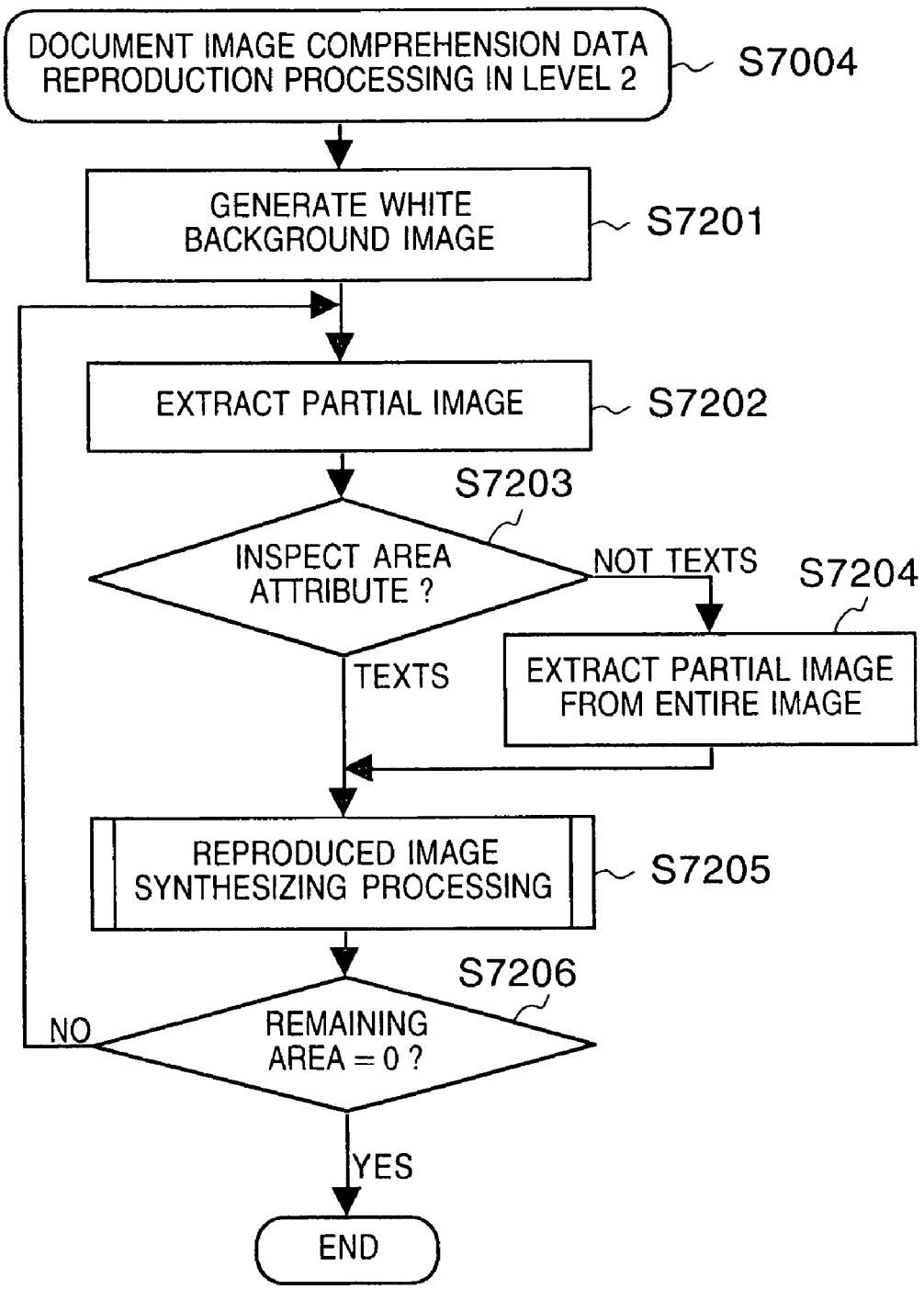
FIG. 53 is a flowchart showing document image comprehension data reproduction processing in the reproduction level 2 according to the thirteenth embodiment.

Meanwhile, in step S7002 in FIG. 51, if it is determined that the reproduction level is "level 2", the control proceeds to step S7004 for performing document image comprehension data reproduction processing according to the flowchart in FIG. 53.

In step S7201 in FIG. 53, as similar to the foregoing "reproduction level 1", a white background image is generated to be used as a background of the reproduced document image. In step S7202, the partial image data is extracted from the document image comprehension data 5111. In step S7203, the layout analysis data 5107 of each area is analyzed to obtain an area attribute for each area. If the area attribute is "texts", the partial image is synthesized with the white background image in step S7205 based on the extracted partial image data and coordinate data thereof, thereby reproducing the image. If the area attribute is not "texts", the control proceeds to step S7204 where the partial image is extracted from the entire image, by using the coordinate data. Then in step S7205, the partial image is synthesized with the white background image, thereby reproducing the image.

When the reproduction image synthesizing processing (step S7205 in FIG. 53) for one partial image is completed in the foregoing manner, whether or not there is a remaining area is determined in step S7206. If there is a remaining area, the control returns to step S7202 for repeating the above-described processing with respect to the remaining area, whereas if there is no remaining area, the document image comprehension data reproduction processing ends.

Referring back to FIG. 50, after reproduction processing is performed in the above-described manner, the reproduced image is outputted in step S6404 by a monochrome printer serving as the image output unit 5116.

Figure 54:
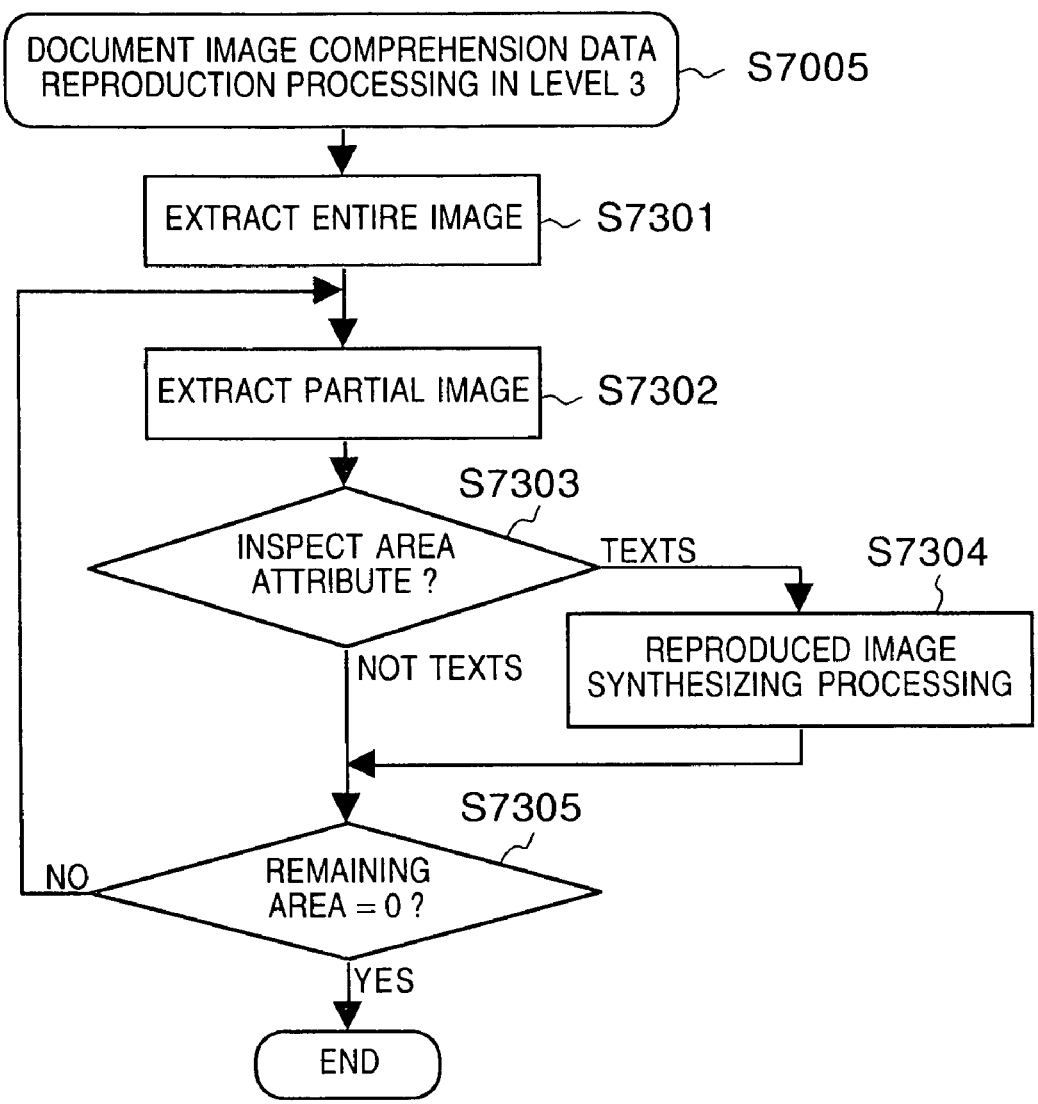
FIG. 54 is a flowchart showing document image comprehension data reproduction processing in the reproduction level 3 according to the thirteenth embodiment.

Meanwhile, in step S7002 in FIG. 51, if it is determined that the reproduction level is "level 3", the control proceeds to step S7005 for performing document image comprehension data reproduction processing according to the flowchart in FIG. 54.

In step S7301 in FIG. 54, the entire image data is extracted to be used as a background of the reproduced document image. In step S7302, partial image data is extracted from the document image comprehension data 5111. In step S7303, the layout analysis data 5107 of each area is analyzed to obtain an area attribute for each area. If the area attribute is "texts", the partial image is synthesized with the background image in step S7304 based on the extracted partial image data and coordinate data thereof, thereby reproducing the image. If the area attribute is not "texts", the control proceeds to step S7305 and synthesizing processing of the partial image is not performed with respect to this area.

When the reproduction image synthesizing processing (step S7304 in FIG. 54) for one partial image is completed in the foregoing manner, whether or not there is a remaining area is determined in step S7305. If there is a remaining area, the control returns to step S7302 for repeating the above-described processing with respect to the remaining area, whereas if there is no remaining area, the document image comprehension data reproduction processing ends.

Referring back to FIG. 50, after reproduction processing is performed in the above-described manner, the reproduced image is outputted in step S6404 by a monochrome printer serving as the image output unit 5116.

As has been set forth above, according to the thirteenth embodiment, since an inputted document image is divided into partial images, stored and reproduced in accordance with image attributes of the document image, the amount of data of the stored document image can be reduced, and high quality can be achieved in reproduced images.

Fourteenth Embodiment

Next, the fourteenth embodiment of the present invention is described. In the above-describe thirteenth embodiment, the storage-level setting processing (S6304 in FIG. 43) or reproduction-level setting processing (S6402 in FIG. 50) are performed based on setting operation of an operator. However, according to the fourteenth embodiment, these processings are automatically performed.

Figure 56:
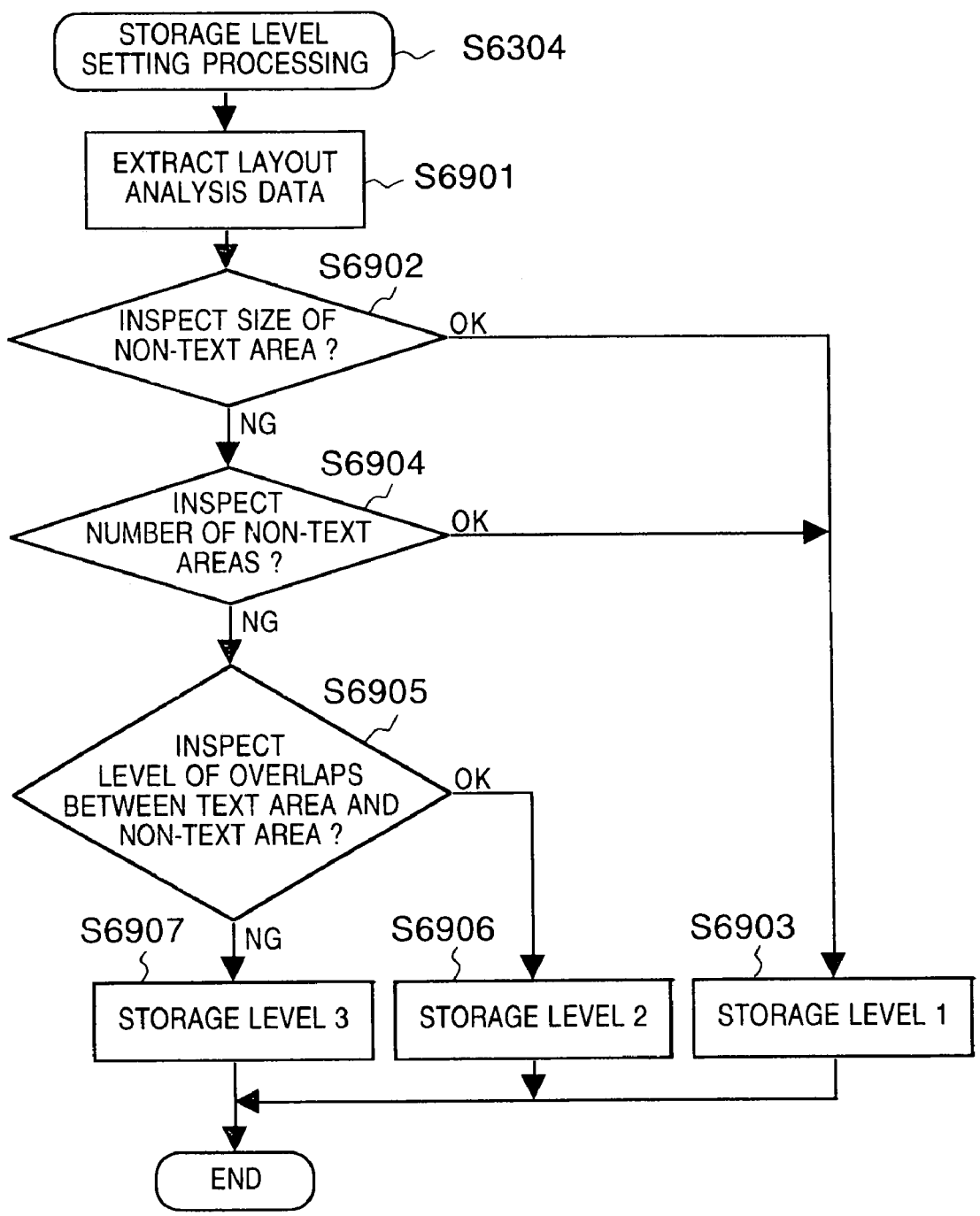
FIG. 56 is a flowchart showing automatic storage-level setting processing according to a fourteenth embodiment of the present invention.

Hereinafter, processing steps of the automatic storage-level setting processing are described with reference to the flowchart in FIG. 56.

According to the fourteenth embodiment, when the storage-level setting processing (S6304) is started, the layout analysis data 5107 of each area is extracted in step S6901. Next in step S6902, the size of non-text area is inspected.

In the fourteenth embodiment, in a case where the height (h) of the area is larger than a threshold value (Th), or where the width (w) of the area is larger than a threshold value (Tw), or where the area (s) is larger than a threshold value (Ts), the inspection result is determined as "NG", otherwise, the inspection result is determined as "OK". When the inspection result in step S6902 is "OK", the control proceeds to step S6903 where "storage level 1" is set. If the inspection result in step S6902 is "NG", the control proceeds to step S6904 for executing another inspection. In step S6904, the number of non-text areas is inspected.

In step S6904, in a case where the number (n) of the non-text areas is larger than a threshold value (Tn), the inspection result is determined as "NG", otherwise, the inspection result is determined as "OK". When the inspection result in step S6904 is "OK", "storage level 1" is set in step S6903. If the inspection result in step S6904 is "NG", inspection in step S6905 is executed. In step S6905, the level of overlaps between a text area and non-text area is inspected.

In step S6905, in a case where an overlapping area (d) between the text area and non-text area is larger than a threshold value (Td), the inspection result is determined as "NG", otherwise, the inspection result is determined as "OK". When the inspection result in step S6905 is "OK", the control proceeds to step S6906 where "storage level 2" is set. If the inspection result in step S6905 is "NG", the control proceeds to step S6907 where "storage level 3" is set, and the automatic storage-level setting processing ends.

The present invention can be applied to a system constituted by a plurality of devices (e.g., host computer, interface, reader, printer) or to an apparatus comprising a single device (e.g., copying machine, facsimile machine).

Further, the objects of the present invention can also be achieved by providing a storage medium (or recording medium), storing program codes of software realizing the functions according to the first to fourteenth embodiments, to a computer system or apparatus, reading the program codes, by a CPU or MPU of the computer system or apparatus, from the storage medium, then executing the program. In this case, the program codes read from the storage medium realize the functions according to the above-described embodiments, and the storage medium storing the program codes constitutes the present invention. Furthermore, besides aforesaid functions according to the above embodiments are realized by executing the program codes which are read by a computer, the present invention includes a case where an OS (operating system) or the like working on the computer performs a part or the entire processes in accordance with designations of the program codes and realizes functions according to the above embodiments.

Furthermore, the present invention also includes a case where, after the program codes read from the storage medium are written in a function expansion card which is inserted into the computer or in a memory provided in a function expansion unit which is connected to the computer, CPU or the like contained in the function expansion card or unit performs a part or the entire process in accordance with designations of the program codes and realizes functions of the above embodiments.

As has been set forth above, according to the thirteenth and fourteenth embodiments, the following effects are attained;

(1) The amount of data is reduced when a document image is stored;

(2) The load imposed on network traffic is reduced when a document image is transmitted;

(3) High quality of a document image suitable for reuse can be maintained when storing or transmitting the document image;

(4) Image quality deterioration or data omission can be prevented when outputting a document image; and (5) Electronic use of documents, such as desktop publishing (DTP), is facilitated.

In addition, the amount of data of an inputted document image can be reduced when storing the data, and the stored data can be read and reproduced with high quality.

The present invention is not limited to the above embodiments and various changes and modifications can be made within the spirit and scope of the present invention. Therefore, to apprise the public of the scope of the present invention, the following claims are made.

What is claimed is:

1. An image processing apparatus comprising:

image input means for inputting a multi-valued document image;

binary image generation means for generating binary image data from the inputted multi-valued document image inputted by said image input means;

layout analysis means for dividing the inputted multi-valued document image into a plurality of partial images based on the binary image data generated by said binary image generation means, and generating layout analysis data which includes information of an image attribute of each partial image and information of a layout of each partial image;

storage-level setting means for setting a storage level of the document image, the set storage level being selected from a plurality of predetermined storage levels based on an operation of a user; and storage means for selectively compressing and storing, as image comprehension data for the inputted multi-valued document image, a combination of (i) partial images having a text attribute, (ii) partial images having a second attribute different from the text attribute, and (iii) the entire inputted multi-valued document image, based on the set storage level, without storing the uncompressed inputted multi-valued document image, wherein said storage means comprises:

first storage means for, when said storage-level setting means sets a first storage level, extracting partial images having a text attribute from the binary image data based on the layout analysis data, extracting partial images having a second attribute different from the text attribute from the multi-valued document image based on the layout analysis data, compressing the extracted partial images having the text attribute using a compression processing for binary images, compressing the extracted partial images having the second attribute using a compression processing for multi-valued images, and storing image comprehension data which includes the compressed partial images having the text attribute and the compressed partial images having the second attribute;

second storage means for, when said storage-level setting means sets a second storage level, extracting partial images having a text attribute from the binary image data based on the layout analysis data, compressing the extracted partial images having the text attribute by using a compression processing for binary images, compressing the inputted multi-valued document image by using a compression processing for multi-valued images, and storing image comprehension data which includes the compressed partial images having the text attribute and the compressed inputted multi-valued document image; and third storage means for, when said storage-level setting means sets a third storage level, extracting partial images having a text attribute from the binary image data based on the layout analysis data, extracting partial images having second attribute different from the text attribute from the multi-valued document image based on the layout analysis data, compressing the extracted partial images having the text attribute using a compression processing for binary images, compressing the extracted partial images having the second attribute using a compression processing for multi-valued images, compressing the inputted multi-valued document image using a compression processing for multi-valued images, and storing image comprehension data which includes the compressed partial images having the text attribute, the compressed partial images having the second attribute and the compressed inputted multi-valued document image.

2. The image processing apparatus according to claim 1, wherein the image comprehension data further includes information about the compression method of the compressed partial images.

3. The image processing apparatus according to claim 1, wherein said storage-level setting means sets the storage level in accordance with layout analysis data and the operation of the user.

4. The image processing apparatus according to claim 1, further comprising:

reproduction-level setting means for setting a reproduction parameter for reproducing the document image based on the image comprehension data stored by said storage means; and document image reproduction means for reproducing the document image in accordance with the image comprehension data based on the reproduction parameter set by said reproduction-level setting means.

5. The image processing apparatus according to claim 4, wherein said document image reproduction means separately processes a text area and a non-text area according to the reproduction parameter, and synthesizes the text area and non-text area for reproduction.

6. The image processing apparatus according to claim 4, further comprising means for automatically setting the reproduction parameter based on layout analysis data.

7. An image processing method comprising the steps of:

inputting a multi-valued document image;

generating binary image data from the inputted multi-valued document image inputted at said image input step;

dividing the inputted multi-valued document image into a plurality of partial images based on the binary image data generated at said binary image generation step, and generating layout analysis data which includes information of an image attribute of each partial image and information of a layout of each partial image;

setting a storage level of the document image inputted at said image, the set storage level being selected from a plurality of predetermined storage levels based on an operation of a user; and selectively compressing and storing, as image comprehension data for the inputted multi-valued document image, a combination of (i) partial images having a text attribute, (ii) partial images having a second attribute different from the text attribute, and (iii) the entire inputted multi-valued document image, based on the set storage level, without storing the uncompressed inputted multi-valued document image, wherein said storage step comprises:

a first storage step of, when said storage-level setting step sets a first storage level, extracting partial images having a text attribute from the binary image data based on the layout analysis data, extracting partial images having a second attribute different from the data attribute from the multi-valued document image based on the layout analysis data, compressing the extracted partial images having the text attribute using a compression processing for binary images, compressing the extracted partial images having the second attribute using a compression processing for multi-valued images, and storing image comprehension data which includes the compressed partial images having the text attribute and the compressed partial images having the second attribute;

a second storage step of, when said storage-level setting step sets a second storage level, extracting partial images having a text attribute from the binary image data based on the layout analysis data, compressing the extracted partial images having the text attribute using a compression processing for binary images, compressing the inputted multi-valued document image using a compression processing for multi-valued images, and storing image comprehension data which includes the compressed partial images having the text attribute and the compressed inputted multi-valued document image; and a third storage step of, when said storage-level setting step sets a third storage level, extracting partial images having a text attribute from the binary image data based on the layout analysis data, extracting partial images having a second attribute different from the text attribute from the multi-valued document image based on the layout analysis data, compressing the extracted partial images having the text attribute using a compression processing for binary images, compressing the extracted partial images having the second attribute using a compression processing for multi-valued images, compressing the inputted multi-valued document image by using a compression processing for multi-valued images, and storing image comprehension data which includes the compressed partial images having the text attribute, the compressed partial images having the second attribute and the compressed inputted multi-valued document image.

8. The image processing method according to claim 7, wherein the image comprehension data further includes information about the compression method of the compressed partial images.

9. The image processing method according to claim 7, wherein in said storage-level setting step, the storage level is set in accordance with layout analysis data and the operation of the user.

10. The image processing method according to claim 7, further comprising:

a reproduction-level setting step of setting a reproduction parameter for reproducing the document image based on the image comprehension data stored at said storing step; and a document image reproduction step of reproducing the document image in accordance with the image comprehension data based on the reproduction parameter set at said reproduction-level setting step.

11. The image processing method according to claim 10, wherein in said document image reproduction step, a text area and a non-text area are separately processed according to the reproduction parameter, and synthesized for reproduction.

12. The image processing method according to claim 10, further comprising the step of automatically setting the reproduction parameter based on layout analysis data.

13. A computer readable storage medium storing a program which executes an image processing method of storing an inputted document image and reproducing the image, the program having a plurality of program code modules comprising:

an image input storage step module for inputting a multi-valued document image;

a binary image generation storage step module for generating binary image data from the inputted multi-valued document image inputted by said image input step module;

a layout analysis storage step module for dividing the inputted multi-valued document image into a plurality of partial images based on the binary image data generated by said binary image generation step module, and generating layout analysis data which includes information of an image attribute of each partial image and information of a layout of each partial image;

a storage-level setting step module for setting a storage level of the document image, the set storage level being selected from a plurality of predetermined storage levels by the operation of a user; and a selective compression and storage step module for selectively compressing and storing, as image comprehension data for the inputted multi-valued document image, a combination of (i) partial images having a text attribute, (ii) partial images having a second attribute different from the text attribute, and (iii) the entire inputted multi-valued document image, based on the set storage level, without storing the uncompressed inputted multi-valued document image, wherein said selective compression and storage step module comprises:

a first storage step module for, when said storage-level setting step module sets a first storage level, extracting partial images having a text attribute from the binary image data based on the layout analysis data, extracting partial images having a second attribute different from the text attribute from the multi-valued document image based on the layout analysis data, compressing the extracted partial images having the text attribute using a compression processing for binary images, compressing the extracted partial images having the second attribute using a compression processing for multi-valued images, and storing image comprehension data which includes the compressed partial images having the text attribute and the compressed partial images having the second attribute;

a second storage module step for, when said storage-level setting step module sets a second storage level, extracting partial images having a text attribute from the binary image data based on the layout analysis data, compressing the extracted partial images having the text attribute using a compression processing for binary images, compressing the inputted multi-valued document image using a compression processing for multi-valued images, and storing image comprehension data which includes the compressed partial images having the text attribute and the compressed inputted multi-valued document image; and a third storage module step for, when said storage-level setting step module sets a third storage level, extracting partial images having a text attribute from the binary image data based on the layout analysis data, extracting partial images having a second attribute different from the text attribute from the multi-valued document image based on the layout analysis data, compressing the extracted partial images having the text attribute using a compression processing for binary images, compressing the extracted partial images having the second attribute using a compression processing for multi-valued images, compressing the inputted multi-valued document image using a compression processing for multi-valued images, and storing image comprehension data which includes the compressed partial images having the text attribute, the compressed partial images having the second attribute and the compressed inputted multi-valued document image.

14. The storage medium according to claim 13, wherein the image comprehension data further includes information about the compression method of the compressed partial images.

15. The storage medium according to claim 13, further comprising:

a reproduction-level setting step module for setting a reproduction parameter for reproducing the document image based on the image comprehension data stored in said storage step module; and a document image reproduction step module for reproducing the document image in accordance with the image comprehension data based on the reproduction parameter set by said reproduction-level setting step module.

16. The storage medium according to claim 15, wherein in said document image reproduction step module, a text area and a non-text area are separately processed according to the reproduction parameter, and synthesized for reproduction.

\* \* \* \* \*